US010576635B2

(12) United States Patent
Ogawa et al.

(10) Patent No.: US 10,576,635 B2
(45) Date of Patent: Mar. 3, 2020

(54) OBJECT HANDLING DEVICE AND CALIBRATION METHOD THEREOF

(71) Applicant: Kabushiki Kaisha Toshiba, Minato-ku (JP)

(72) Inventors: Akihito Ogawa, Fujisawa (JP); Atsushi Sugahara, Kawasaki (JP); Junya Tanaka, Ota (JP); Kazuma Komoda, Fuchu (JP); Haruna Eto, Arakawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 212 days.

(21) Appl. No.: 15/684,277

(22) Filed: Aug. 23, 2017

(65) Prior Publication Data

US 2018/0272535 A1  Sep. 27, 2018

(30) Foreign Application Priority Data

Mar. 22, 2017 (JP) ................................ 2017-055536

(51) Int. Cl.
| | |
|---|---|
| *B25J 13/00* | (2006.01) |
| *B25J 13/08* | (2006.01) |
| *B25J 19/02* | (2006.01) |
| *B25J 9/00* | (2006.01) |
| *B25J 9/16* | (2006.01) |
| *B25J 5/00* | (2006.01) |

(52) U.S. Cl.
CPC ............ *B25J 9/1692* (2013.01); *B25J 13/085* (2013.01); *B25J 19/023* (2013.01); *G05B 2219/39048* (2013.01)

(58) Field of Classification Search
CPC ...... B25J 9/1692; B25J 19/023; B25J 13/085; B25J 5/007; B25J 9/0009; B25J 9/161; B25J 13/00; G05B 2219/39048
See application file for complete search history.

(56) References Cited

U.S. PATENT DOCUMENTS

| 4,853,771 A | 8/1989 | Witriol et al. |
| 8,751,048 B2 | 6/2014 | Shimizu et al. |
| (Continued) | | |

FOREIGN PATENT DOCUMENTS

| JP | 10-264065 A | 10/1998 |
| JP | 2002-154080 A | 5/2002 |
| (Continued) | | |

*Primary Examiner* — Robert T Nguyen
(74) *Attorney, Agent, or Firm* — Oblon, McClelland, Maier & Neustadt, L.L.P.

(57) ABSTRACT

According to an embodiment, an object handling device includes a base, a manipulator, a first camera, a sensor, a manipulator control unit and a calibration unit. The manipulator is arranged on the base, and includes a movable part and an effector that is arranged on the movable part and acts on an object. The first camera and the sensor are arranged on the manipulator. The manipulator control unit controls the manipulator so that the movable part is moved to a position corresponding to a directed value. The calibration processing unit acquires a first error in a first direction based on an image photographed by the first camera, acquire a second error in a second direction intersecting with the first direction based on a detection result obtained by the sensor, and acquire a directed calibration value with respect to the directed value based on the first error and the second error.

10 Claims, 45 Drawing Sheets

(56) References Cited

U.S. PATENT DOCUMENTS

| | | | |
|---|---|---|---|
| 2002/0113520 A1 | 8/2002 | Kastinger et al. | |
| 2014/0100694 A1* | 4/2014 | Rueckl | B25J 9/1692 |
| | | | 700/254 |
| 2016/0059419 A1* | 3/2016 | Suzuki | B25J 9/1697 |
| | | | 700/114 |
| 2018/0065806 A1 | 3/2018 | Sugahara et al. | |
| 2018/0194008 A1* | 7/2018 | Namiki | B25J 9/1692 |

FOREIGN PATENT DOCUMENTS

| | | |
|---|---|---|
| JP | 2003-533162 A | 11/2003 |
| JP | 2005-334998 A | 12/2005 |
| JP | 2006-35329 A | 2/2006 |
| JP | 2010-76054 A | 4/2010 |
| JP | 2011-230257 A | 11/2011 |
| JP | 2013-22705 A | 2/2013 |
| JP | 5492168 B2 | 3/2014 |
| JP | 2015-93356 A | 5/2015 |
| JP | 2018-39668 A | 3/2018 |

* cited by examiner

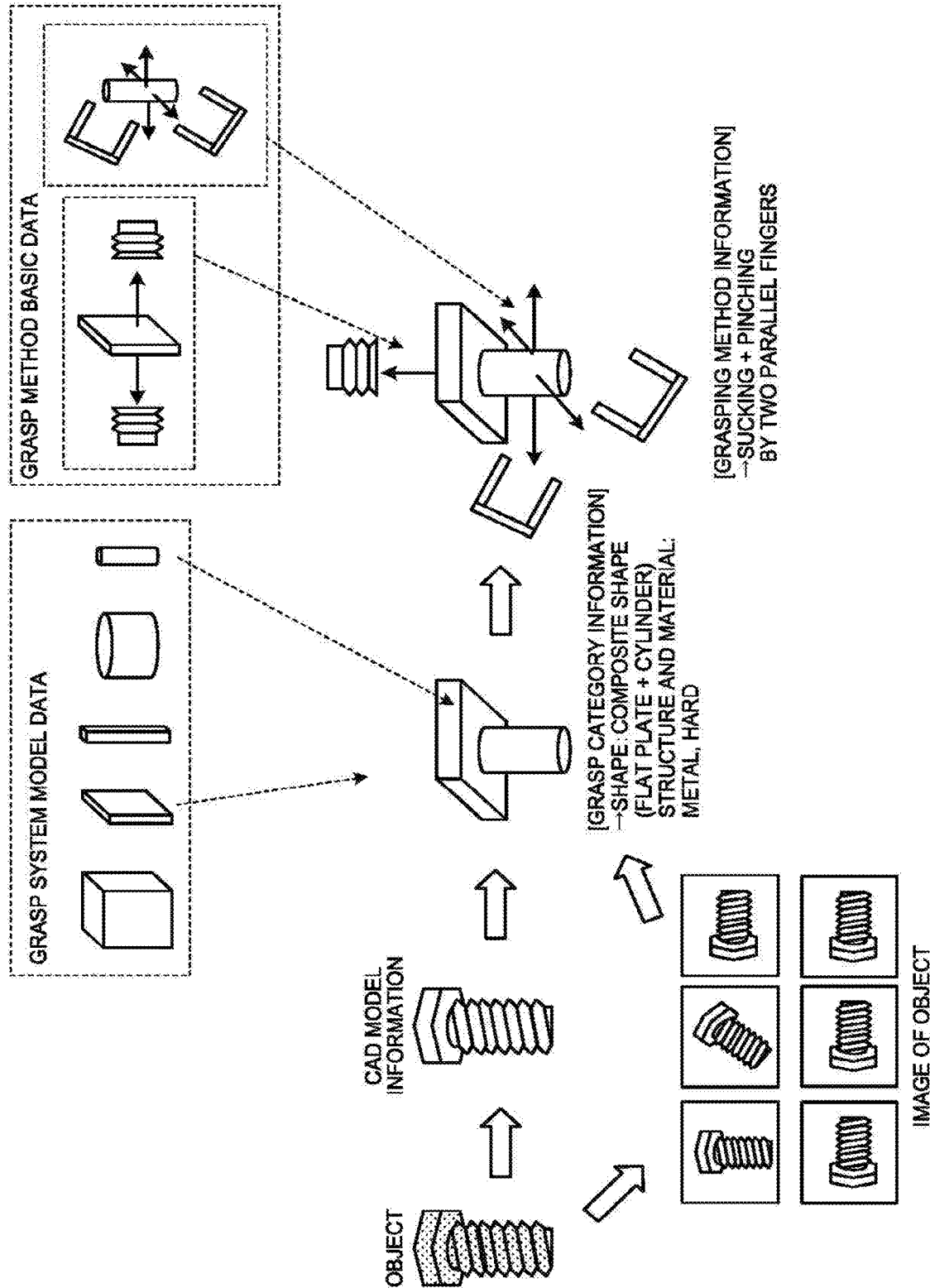

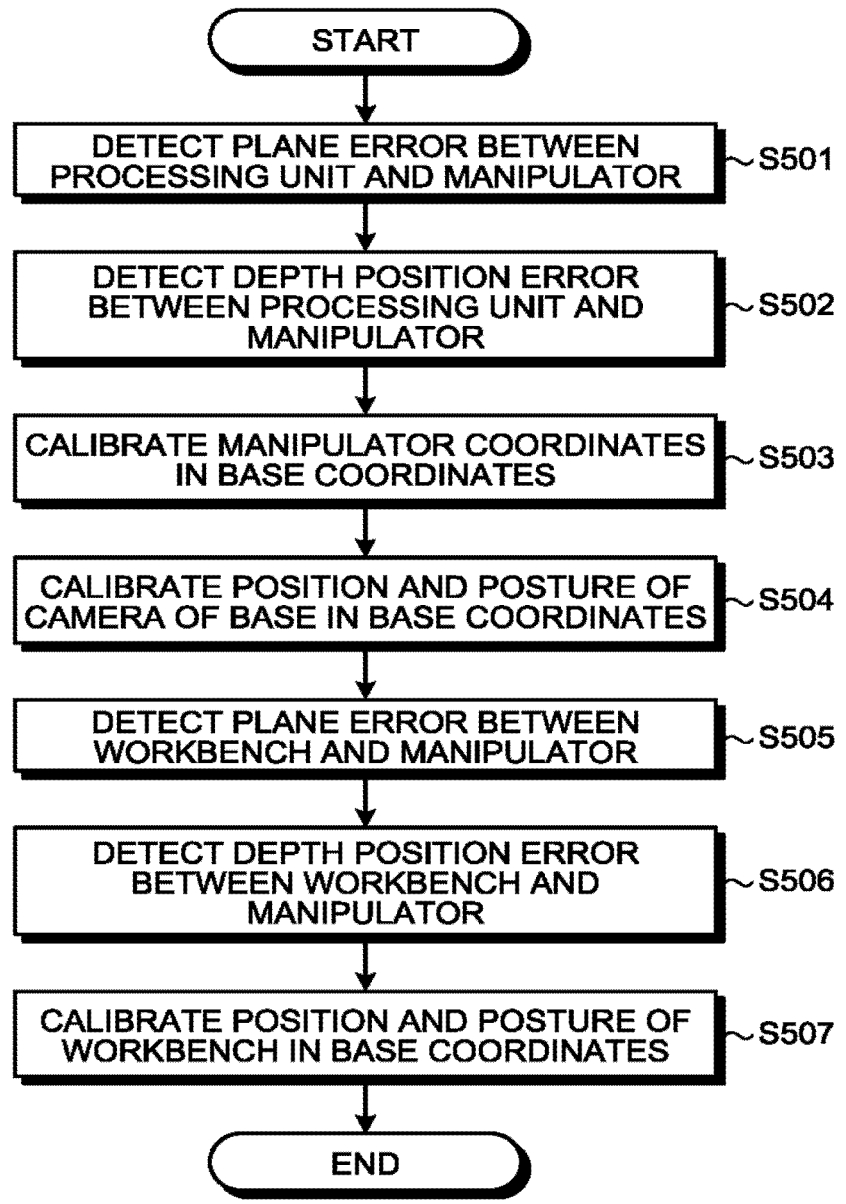

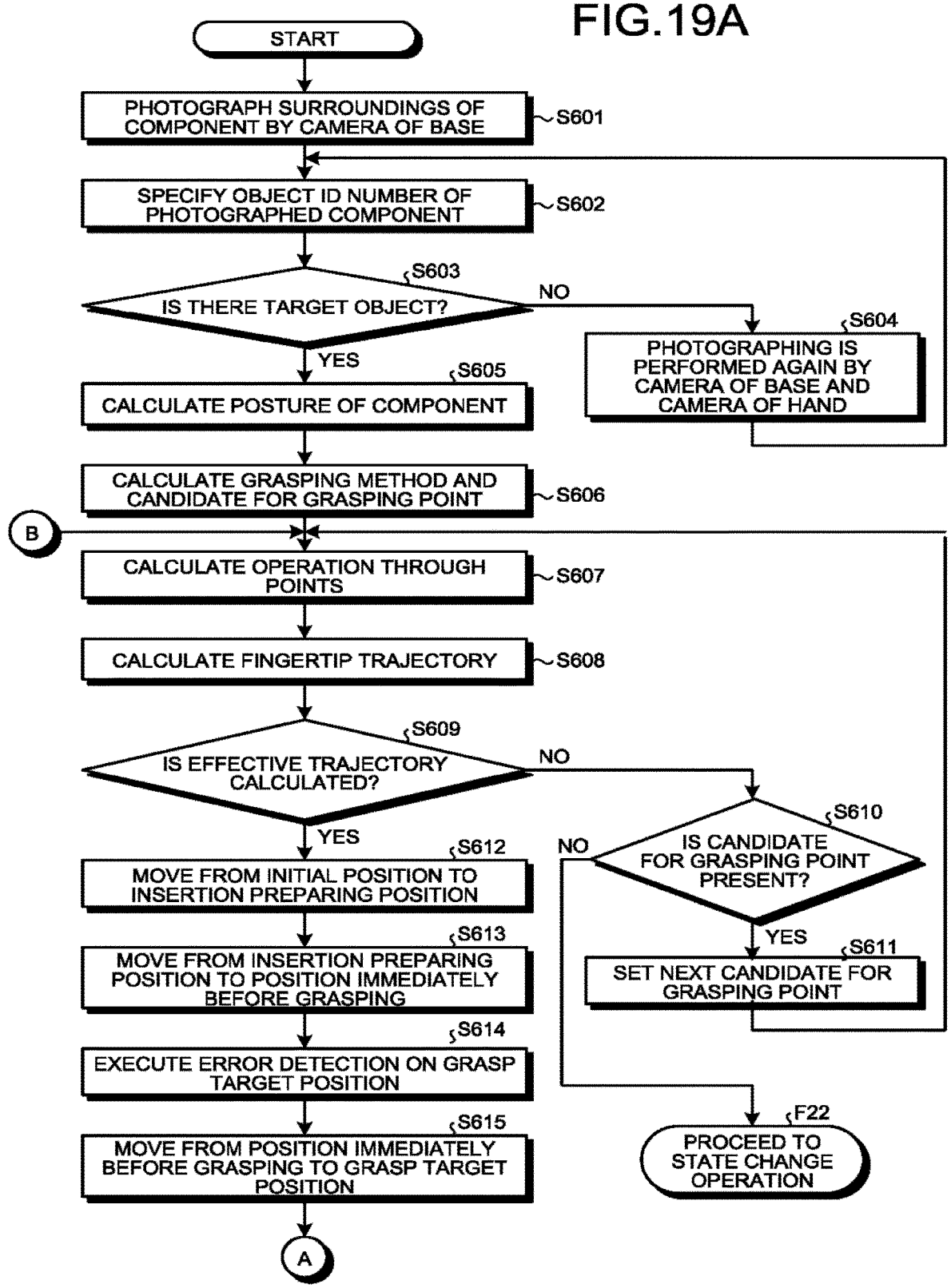

IMAGE FEATURE AMOUNT TARGET VALUE

FIG.31
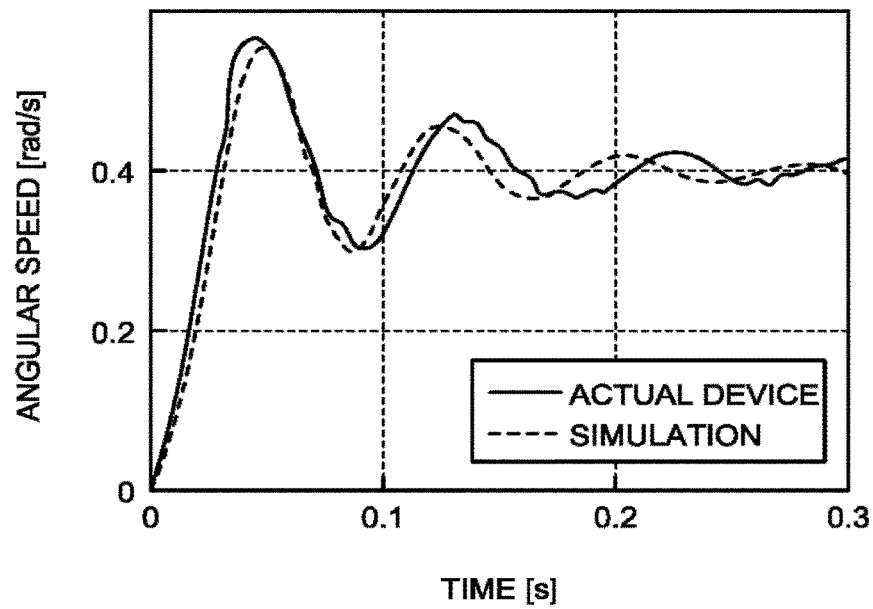
BEFORE OPTIMIZATION
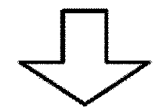
AFTER OPTIMIZATION
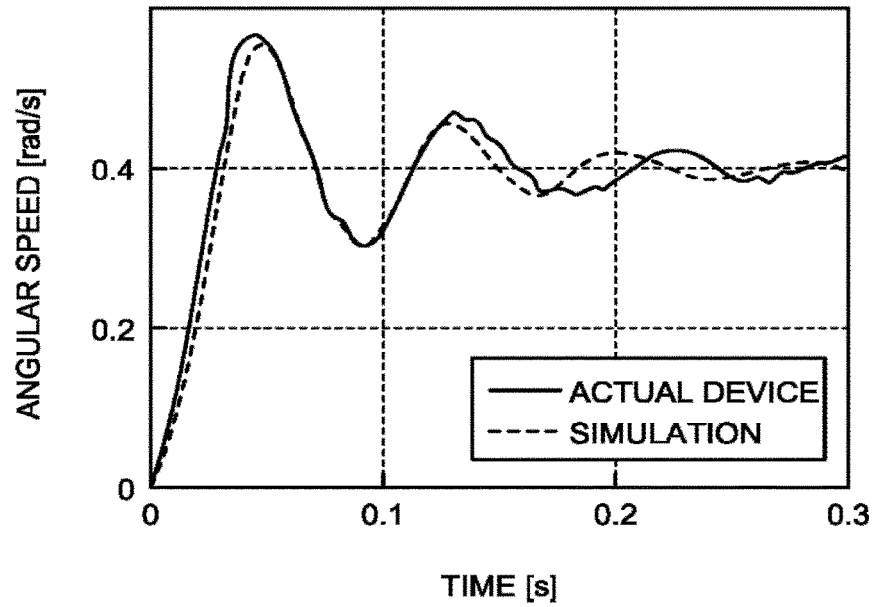

OBJECT HANDLING DEVICE AND CALIBRATION METHOD THEREOF

CROSS-REFERENCE TO RELATED APPLICATIONS

This application is based upon and claims the benefit of priority from Japanese Patent Application No. 2017-055536, filed on Mar. 22, 2017; the entire contents of which are incorporated herein by reference.

FIELD

Embodiments described herein relate generally to an object handling device and a calibration method thereof.

BACKGROUND

Conventionally, there is known an object handling device including a manipulator such as a robot arm having an effector.

For example, it is beneficial to obtain an object handling device including a manipulator having higher accuracy in access by an effector.

BRIEF DESCRIPTION OF THE DRAWINGS

FIG. 17 is a schematic diagram illustrating part of a procedure of automatically generating the grasp information performed by the information acquisition system according to the embodiment;

FIG. 18A is an exemplary flowchart illustrating a procedure of automatic calibration performed by the object handling device according to the embodiment;

FIG. 19A is an exemplary flowchart illustrating a procedure of handling by the hand based on the object database and the grasp database according to the embodiment;

FIG. 31 is a diagram illustrating an effect caused by fine-tuning of a physical parameter;

DETAILED DESCRIPTION

Figure 1:
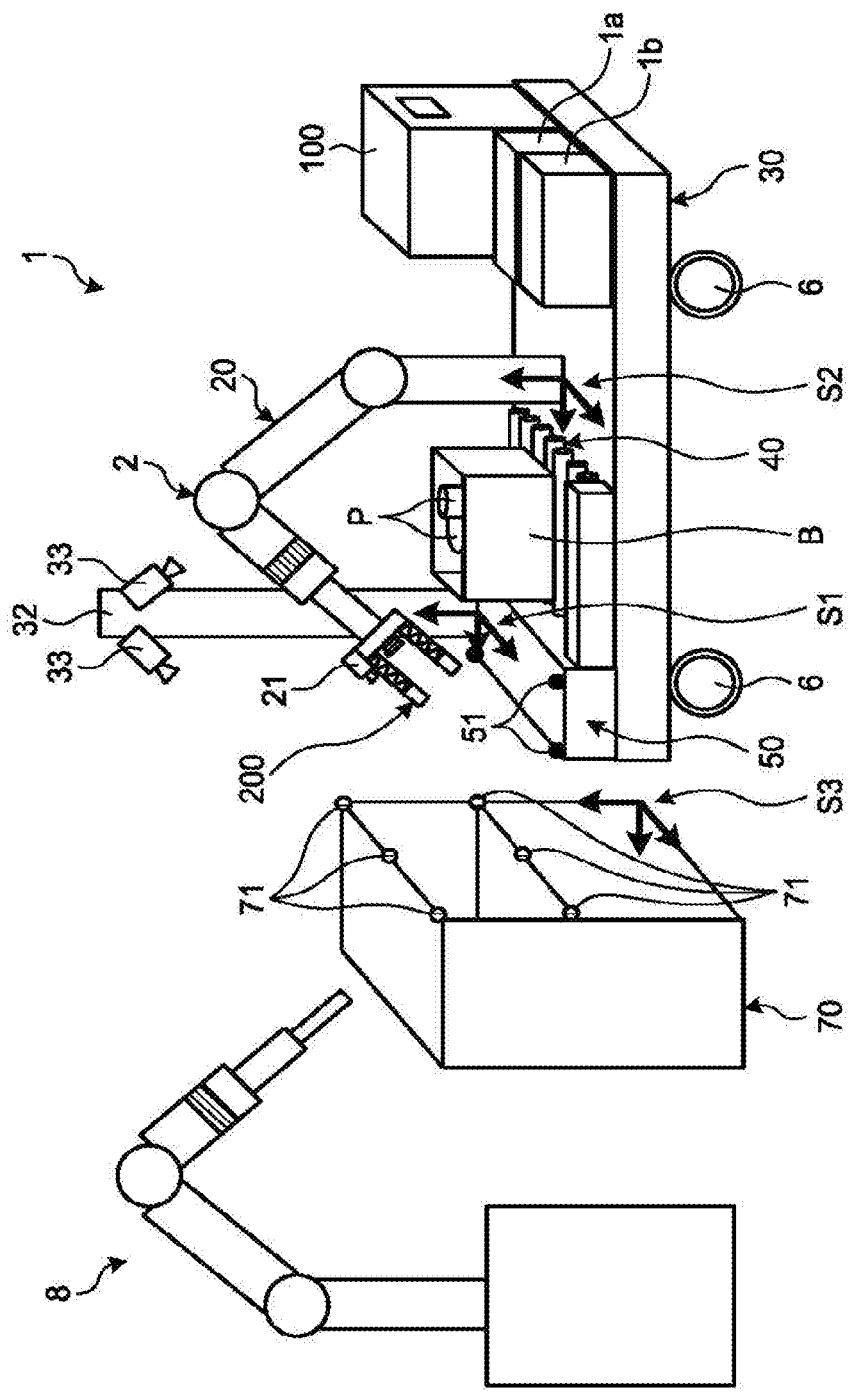
FIG. 1 is a schematic and exemplary perspective view of an object handling system including an object handling device according to an embodiment.

According to an embodiment, an object handling device includes a base, a manipulator, a first camera, a sensor, a manipulator control unit and a calibration unit. The manipulator is arranged on the base, and includes a movable part and an effector that is arranged on the movable part and acts on an object. The first camera and the sensor are arranged on the manipulator. The manipulator control unit controls the manipulator so that the movable part is moved to a position corresponding to a directed value. The calibration processing unit acquires a first error in a first direction based on an image photographed by the first camera, acquire a second error in a second direction intersecting with the first direction based on a detection result obtained by the sensor, and acquire a directed calibration value with respect to the directed value based on the first error and the second error.

The following discloses an exemplary embodiment of the present invention. A configuration or control (technical feature) of the embodiment described below, and an operation and a result (effect) caused by the configuration and the control are merely an example. A plurality of configurations and the like of the embodiment exemplified below include the same components. In the following description, the same components are denoted by the same reference numeral, and redundant description will not be repeated.

Configuration of System

FIG. 1 is a perspective view of an object handling system (robot handling system) including an object handling device 1 (handling robot) according to the embodiment.

The object handling device 1 is a device that conveys an object P. Examples of the object P include a commodity, an article, and a component, and specifications thereof such as a size and hardness are varied. The object P may also be referred to as a target object, a conveyance object, and the like.

As illustrated in FIG. 1, the object handling device 1 includes a controller 100, a manipulator 20, a base 30, a conveying mechanism 40, a processing unit 50, a moving mechanism 6, and the like. The base 30 is configured to be freely movable on a floor or the ground with the moving mechanism 6 including a multiple-direction movable wheel, a rotary wheel, a crawler, a driving motor, and the like. Accordingly, the base 30 can freely move on a floor or the ground integrally with the controller 100, the manipulator 20, the conveying mechanism 40, and the processing unit 50 that are fixed to the base 30.

The conveying mechanism 40 is a conveying device for the object P arranged separately from the manipulator 20. Specifically, the conveying mechanism 40 includes a roller, a belt conveyor, and the like, and can convey the object P between a predetermined position inside the object handling device 1 and a predetermined position outside the object handling device 1 when the controller 100 controls the operation of the conveying mechanism 40. For example, in a case in which the manipulator 20 carries the object P in the object handling device 1, after the object P is carried in, the conveying mechanism 40 can carry the object P out of the object handling device 1. On the other hand, in a case in which the manipulator 20 carries the object P out of the object handling device 1, before the object P is carried out, the conveying mechanism 40 can carry the object P in the object handling device 1. As illustrated in FIG. 1, the conveying mechanism 40 can convey the object P being accommodated in a case B, or in units of the case B.

The processing unit 50 is arranged on the base 30, and used for temporarily holding, placing, and keeping the object P, for example. The processing unit 50 may be referred to as a working place, a working space, a working area, a working table, a buffer, and the like. A plurality of marks 51 are arranged on the processing unit 50. The mark 51 is a target of photography by cameras 21 and 33, for example, and used for conveying the object P, for calibration described later, and the like. An RF-ID reader/writer, a bar code reader, various sensors, and the like (not illustrated) may be provided to the processing unit 50. The camera 21 is an example of a first camera, and the camera 33 is an example of a second camera. The processing unit 50 is an example of a placement unit, and the mark 51 is an example of a first mark.

A cylinder, a compressor, a user interface, a safety mechanism, and the like (not illustrated) may be mounted on the base 30 in addition to a vacuum pump 1a and a battery 1b. When the manipulator 20 sucks the object P, for example, the vacuum pump 1a generates negative pressure of air or gas for sucking. The battery 1b is, for example, an electric power source of a motor and the like in a case in which the vacuum pump 1a and the manipulator 20 are driven by the motor. The cylinder and the compressor may be used, for example, for generating positive pressure of air or gas in a case in which the manipulator 20 is driven by air pressure, for processing of releasing sucking, and for driving an electromagnetic valve. The cylinder and the compressor may also be used for generating negative pressure by being connected to an ejector. The user interface is, for example, an operation button, a switch, and a keyboard. The safety mechanism is, for example, a light curtain or a collision detector.

Figure 3A:
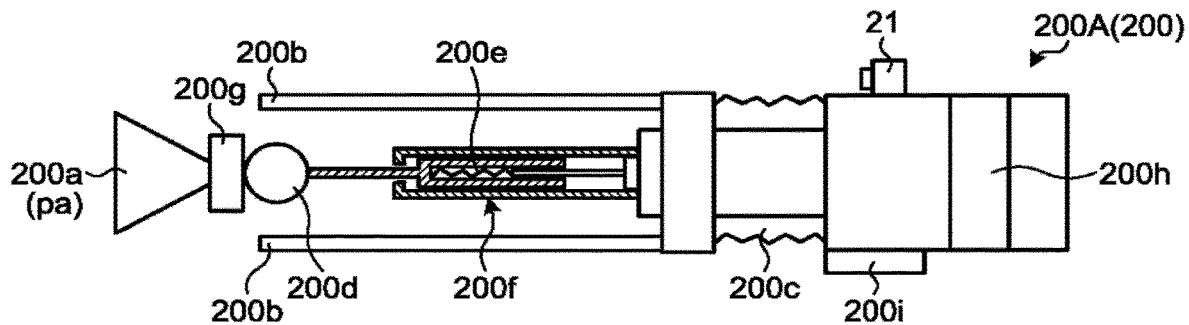
FIG. 3A is a schematic and exemplary side view (partial cross-sectional view) illustrating a configuration of a hand according to the embodiment, and illustrating a state in which a suction pad projects.

The manipulator 20 includes an arm 2 and a hand 200. The arm 2 is what is called an articulated or multi-axis robot arm, and is driven by a plurality of servomotors, for example. The arm 2 may be, for example, a robot of a type combining a plurality of a vertical articulated-type robot, a horizontal articulated-type robot, and a linear motion robot. Various sensors (not illustrated) such as a force sensor are provided to the arm 2. The hand 200 is, for example, a mechanism for grasping the object P (target object) with a multi-finger mechanism that performs sucking, jamming, pinching, and the like. The hand 200 may be referred to as a grasp mechanism, an effector, and an end effector. The hand 200 includes, for example, a small-sized actuator and an elastic mechanism 200e (an elastic part, refer to FIG. 3A, for example) for obtaining elasticity. The camera 21 and various sensors (not illustrated) such as a force sensor are provided to the hand 200. A detailed configuration of the hand 200 will be described later. The elastic mechanism 200e may also be referred to as an elastic articulation. The arm 2 and the hand 200 are examples of a movable part.

A workbench 70 is, for example, a rack, a shelf, and a table on which assembling work is performed, and provides a place as a conveyance destination or a conveyance source of the object P conveyed by the object handling device 1. A mark 71 is arranged on the workbench 70. The mark 71 is a target of photography by the cameras 21 and 33, and the like, and used for conveyance of the object P, calibration described later, and the like. The system may include a robot 8 and the like different from the object handling device 1. The mark 71 is an example of a second mark.

Configuration of Controller

Figure 2:
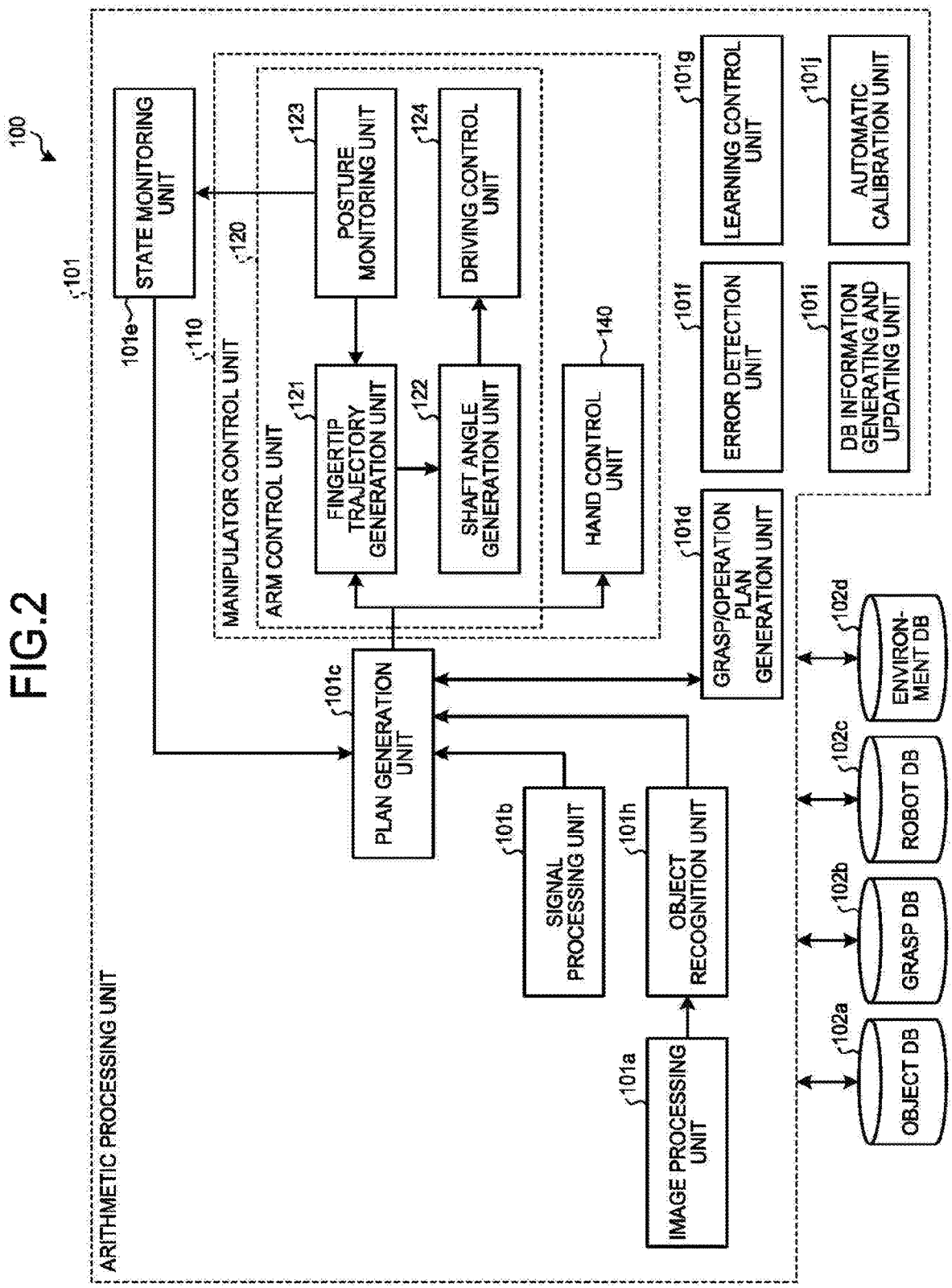
FIG. 2 is a schematic and exemplary block diagram of a controller according to the embodiment.

FIG. 2 is a block diagram of the controller 100. As illustrated in FIG. 2, the controller 100 includes an arithmetic processing unit 101, various databases, a main storage unit (not illustrated), an auxiliary storage unit (not illustrated), and the like. Examples of the database include an object database 102a (object DB), a grasp database 102b (grasp DB), a robot database 102c (robot DB), and an environment database 102d (environment DB). Examples of the main storage unit include a ROM and a RAM, and examples of the auxiliary storage unit include an HDD and an SSD. The databases may be part of the auxiliary storage unit.

The arithmetic processing unit 101 includes a manipulator control unit 110, an image processing unit 101a, a signal processing unit 101b, a plan generation unit 101c, a grasp/operation plan generation unit 101d, a state monitoring unit 101e, an error detection unit 101f, a learning control unit 101g, an object recognition unit 101h, and the like. The manipulator control unit 110 includes an arm control unit 120, a hand control unit 140, and the like.

The image processing unit 101a processes various pieces of image sensor information, and generates information required for an operation plan, an operation control, an error detection, and a learning.

The signal processing unit 101b performs, on various pieces of sensor information, signal processing such as signal amplification processing, analog-to-digital conversion processing, noise removal, extraction of feature information, and processing of determining a state change.

The plan generation unit 101c generates and manages a work plan for the object handling device 1 based on user input information, a state of the system, and various pieces of sensor information.

The grasp/operation plan generation unit 101d generates an operation plan related to an operation of grasping and transferring the object P performed by the manipulator 20. By way of example, in grasping the object P, performed is processing of calculating moving through points of the hand 200 from a current position of the hand 200 to a position where the hand 200 can grasp the object P without interfering with surrounding environment. In this case, the grasp/operation plan generation unit 101d may calculate an operation plan including positional information, time information, speed information, acceleration information, and the like.

The arm control unit 120 mainly controls an operation of the arm 2. The arm control unit 120 includes a fingertip trajectory generation unit 121, a shaft angle generation unit 122, a posture monitoring unit 123, a driving control unit 124, and the like.

The fingertip trajectory generation unit 121 generates fingertip trajectory information for controlling a motion trajectory of a fingertip of the manipulator 20 (hand 200).

The fingertip trajectory information is, for example, information about a trajectory of a fingertip that enables smooth movement without applying a load on the arm 2 as much as possible, and may include positional information, time information, speed information, acceleration information, and the like.

The shaft angle generation unit 122 generates angle information of a motor (not illustrated) that causes an angle of each articulation of the arm 2 to be changed so that the fingertip of the manipulator 20 (hand 200) moves in accordance with the fingertip trajectory information. The angle information may include, for example, angle information, time information, angular speed information, angular acceleration information, and the like.

The posture monitoring unit 123 monitors positions of a plurality of shaft driving units (not illustrated) included in the manipulator 20, and calculates a posture of the manipulator 20.

The driving control unit 124 controls an operation (a position) of the motor of the manipulator 20, and an operation (a position, a posture, and the like) of the manipulator 20 in accordance with the angle information generated by the shaft angle generation unit 122.

The state monitoring unit 101e generates operating state information indicating an operation state of the manipulator 20 such as "operating", "stopping", and "operation is completed", for example, based on posture information acquired from information that is obtained from the posture monitoring unit 123.

The error detection unit 101f measures a state of the object handling device 1, an execution state of the work plan, a driving control state, a grasping state of the object P, a conveyance state of the object P, and the like to detect an error.

The learning control unit 101g controls learning functions such as robot model learning for improving operation accuracy such as suppressing vibration of the manipulator 20, grasp control parameter learning for improving a grasp performance of the object P, grasp database learning, error detection learning for improving an execution performance of the work plan, and the like.

The object recognition unit 101h recognizes the object P based on an image processing result including an image of the object P obtained by the image processing unit 101a.

A database information generating and updating unit 101i (DB information generating and updating unit) generates and updates object information to be stored in the object database 102a and grasp information to be stored in the grasp database 102b. Processing of the database information generating and updating unit 101i will be described later in detail.

An automatic calibration unit 101j executes automatic calibration. Details about automatic calibration will be described later. The automatic calibration unit 101j is an example of a calibration processing unit.

The object database 102a stores therein attribute information of the object P. In the following description, the attribute information of the object P is referred to as object information. The grasp database 102b stores, for each object P, various pieces of information related to control for grasping the object. The object database 102a and the grasp database 102b will be described later in detail.

The robot database 102c stores therein a structure of the object handling device 1, specifications of each component (for example, dimensions, weight, and a moment of inertia), and performance specifications (for example, an operation range, speed, and a torque performance) of each driving unit (such as a motor).

The environment database 102d stores therein surrounding environment information such as information about the workbench 70 corresponding to the object handling device 1, an operation range of the object handling device 1, and a surrounding interference object.

First Configuration Example of Hand

FIGS. 3A to 3D are side views (partial cross-sectional views) illustrating a configuration example of a hand 200A (200). The hand 200A illustrated in FIGS. 3A to 3D includes a plurality of grasp mechanisms such as a suction pad 200a and a finger 200b. The suction pad 200a may be configured with a jamming mechanism and the like. That is, the hand 200A can grasp the object P using a plurality of different grasping methods. In grasping the object P, the hand control unit 140 of the controller 100 can select and use a grasp mechanism suitable for the object P. The finger 200b is a multi-finger or an articulated finger that moves in parallel.

Figure 3B:
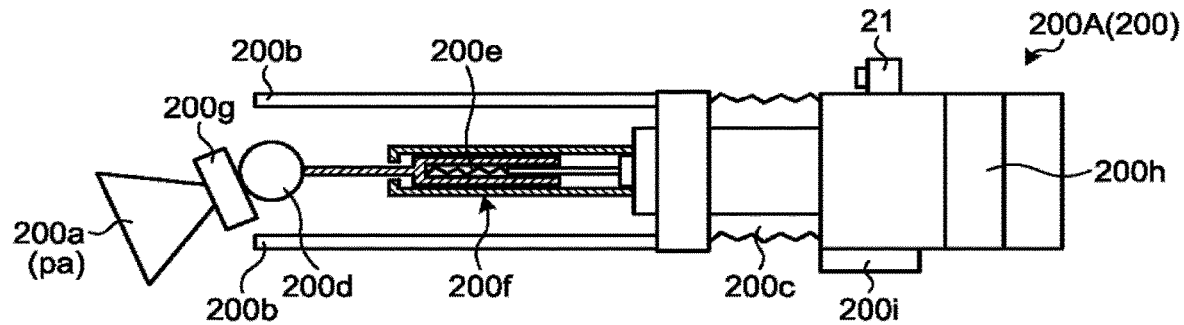
FIG. 3B is a schematic and exemplary side view (partial cross-sectional view) illustrating the configuration of the hand according to the embodiment, and illustrating a state in which the suction pad projects and inclines.

As illustrated in FIG. 3B, the hand 200A is configured such that the hand control unit 140 of the controller 100 can control a posture variable mechanism 200d to change a posture (angle) of the suction pad 200a. Thus, the hand 200A can grasp the object P more securely.

The hand 200A includes an elastic mechanism 200e and a jamming unit 200c. The elastic mechanism 200e and the jamming unit 200c suppress force applied to the object P from the hand 200A. The hand 200A includes a clutch 200f that switches between an elastically deformable state and an elastically undeformable state of the elastic mechanism 200e. Accordingly, by limiting a relative displacement between two positions that can be relatively displaced in the elastic mechanism 200e by the clutch 200f in a state in which the object P is grasped and conveyed, vibration of the hand 200A caused by elasticity of the elastic mechanism 200e can be suppressed. The jamming unit 200c is, for example, arranged to cover an elastic expansion/contraction mechanism, and can limit a relative displacement of an expansion/contraction unit and suppress vibration of the hand 200A caused by elasticity by fixing the state by jamming, similarly to the clutch 200f.

A contact sensor 200g, a force sensor 200h, and a displacement sensor 200i (for example, a noncontact laser displacement meter) are provided to the hand 200A. The camera 21 arranged on the hand 200A is, for example, a camera that can detect distance information (for example, an RGBD sensor). Thus, when the arm control unit 120 or the hand control unit 140 of the controller 100 controls a control target such as a motor based on a detection result obtained by the sensor or the camera, force applied to the object P from the hand 200 may be further suppressed.

Figure 3C:
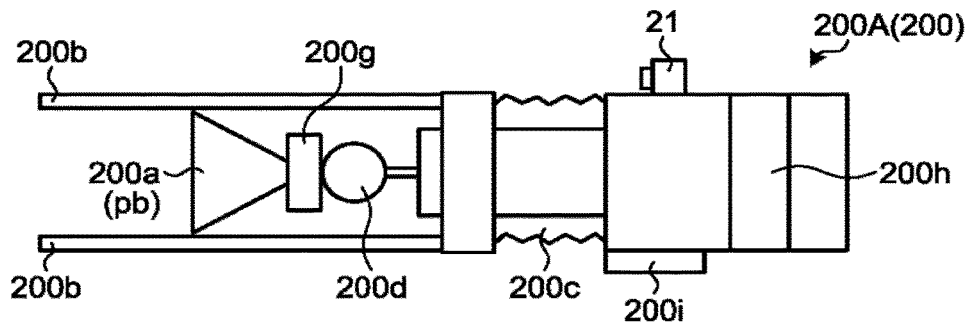
FIG. 3C is a schematic and exemplary side view (partial cross-sectional view) illustrating the configuration of the hand according to the embodiment, and illustrating a state in which the suction pad is stored.
Figure 3D:
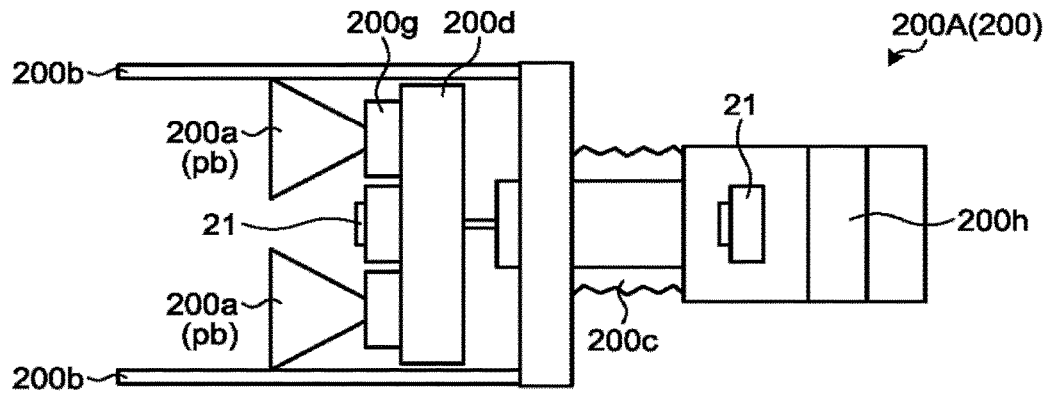
FIG. 3D is a schematic and exemplary side view (partial cross-sectional view) viewed from a direction orthogonal to a line of sight in FIG. 3C, illustrating the configuration of the hand according to the embodiment, and illustrating a state in which the suction pad is stored.

By configuring the suction pad 200a to be movable between a projecting position pa (FIG. 3A and FIG. 3B) and a stored position pb (FIG. 3C and FIG. 3D), the state can be switched between a state in which the suction pad 200a can grasp the object P (FIG. 3A and FIG. 3B) and a state in which the finger 200b can grasp the object P (FIG. 3C and FIG. 3D).

Second Configuration Example of Hand

Figure 4:
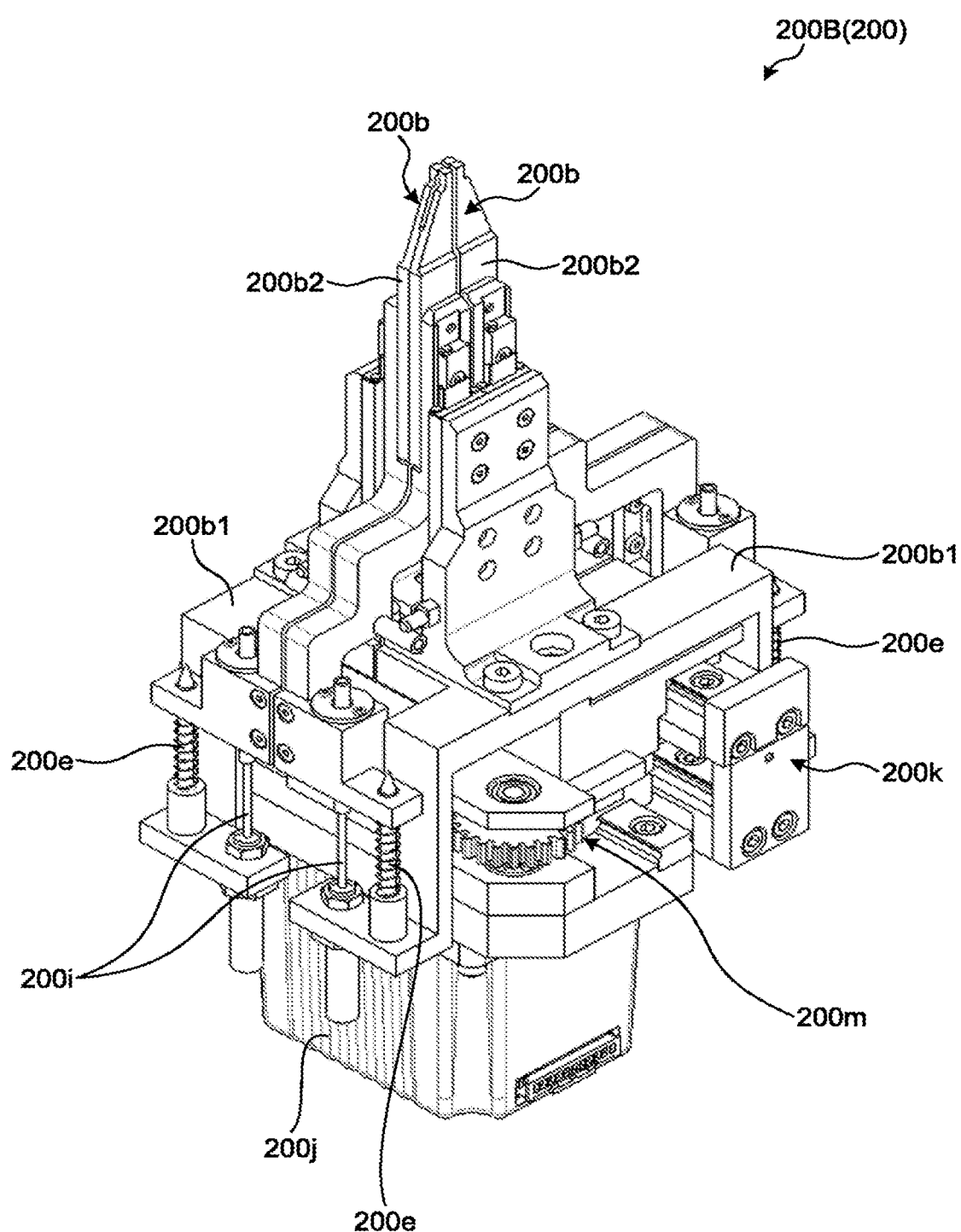
FIG. 4 is a schematic and exemplary perspective view of another hand according to the embodiment illustrating a state in which a finger is closed.
Figure 5A:
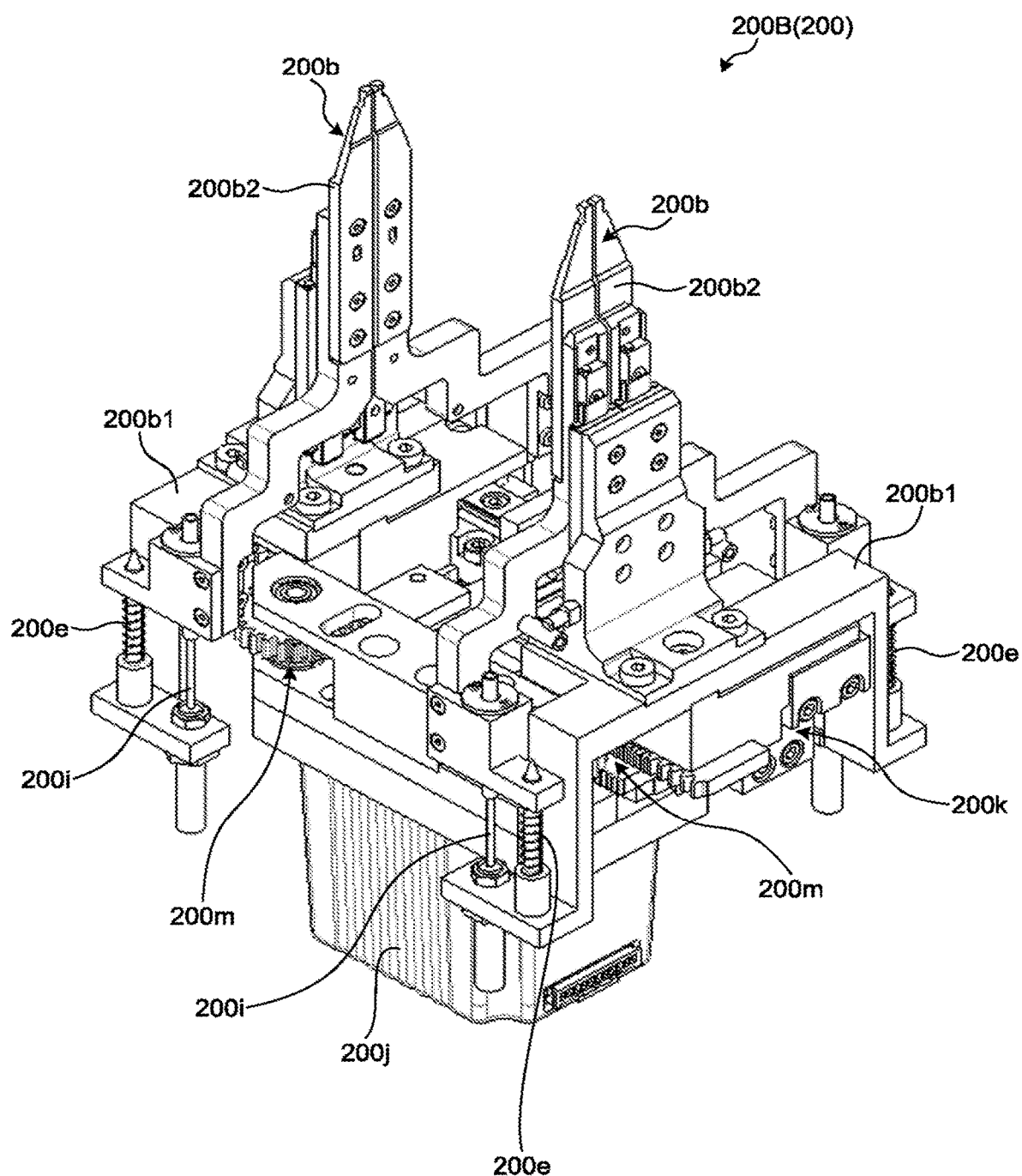
FIG. 5A is a diagram illustrating a state in which the finger of FIG. 4 is opened.
Figure 5B:
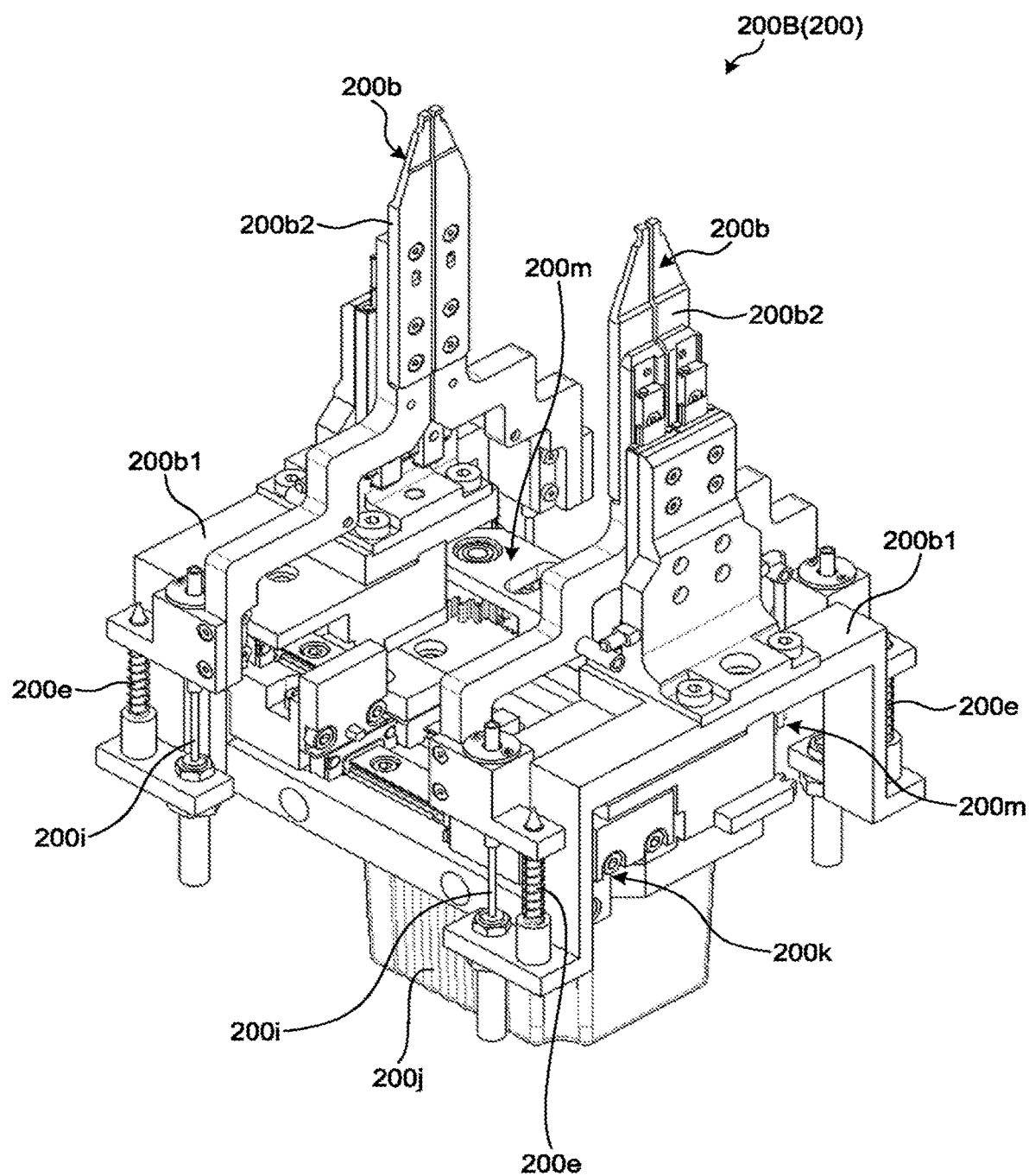
FIG. 5B is a diagram illustrating a state in which the finger of FIG. 4 is opened, viewed from a direction different from that of FIG. 5A.

FIGS. 4, 5A, and 5B are perspective views illustrating a configuration example of a hand 200B (200). FIG. 4 illustrates a state in which fingers 200b are closed, and FIGS. 5A and 5B illustrate a state in which the fingers 200b are opened. FIG. 5B is a diagram viewed from a direction different from that of FIG. 5A.

The hand 200B includes two fingers 200b that are each arranged on a base 200j to be movable in parallel via a guide 200k. The guide 200k includes, for example, a rail and a slider. The guide 200k can guide the finger 200b to be movable along a linear trajectory, and position the finger 200b at a plurality of positions on the trajectory. With such a configuration, a distance (gap) between a plurality of fingers 200b can be varied. A guide direction of the finger 200b by the guide 200k is a direction intersecting with a longitudinal direction (orthogonal direction) at a distal end portion of the arm 2.

The hand 200B includes a rotation/linear motion converting mechanism 200m. The rotation/linear motion converting mechanism 200m is a mechanism for converting rotation of a motor (not illustrated) housed in the base 200j into linear motion, for example, a rack and pinion. With such a configuration, the position of the finger 200b, that is, a distance (gap) between the two fingers 200b can be controlled by controlling the motor with the hand control unit 140 of the controller 100. In the present embodiment, the rotation/linear motion converting mechanism 200m is arranged to correspond to each of the fingers 200b. However, the rotation/linear motion converting mechanism 200m is not limited thereto, and various configurations and methods may be employed. By way of example, the rotation/linear motion converting mechanism 200m may have a configuration including a pinion rotating together with the motor and two parallel racks engaging with the pinion, the configuration in which each rack causes the finger 200b to move in parallel along the guide 200k. As another example, the rotation/linear motion converting mechanism 200m may be a screw mechanism including a female screw nut rotated by the motor and a male screw shaft that linearly moves while being prevented from rotating by the base 200j. A deceleration mechanism, a rotational direction converting mechanism, and the like may be interposed between the motor and the rotation/linear motion converting mechanism 200m.

The finger 200b has a floating structure (elastic expansion/contraction structure) in which a distal end 200b2 is supported to be elastically expansible/contractible by a movable base 200b1 guided along the guide 200k. The distal end 200b2 is supported to be movable in an extending direction of the finger 200b by the movable base 200b1 via the elastic mechanism 200e. A moving direction of the distal end 200b2 with respect to the movable base 200b1 is a longitudinal direction of the distal end portion of the arm 2. The displacement sensor 200i measures a relative displacement between the movable base 200b1 and the distal end 200b2. The displacement sensor 200i may be an encoder, an ultrasonic sensor, variable resistance, a capacitance sensor, a pulse coder, a fiber sensor, and the like. In the present embodiment, the finger 200b has a tapered plate shape, and the elastic mechanism 200e and the displacement sensor 200i are arranged to be distant from the distal end of the finger 200b. With such a configuration, the finger 200b can easily enter a narrow gap and the like.

Figure 6:
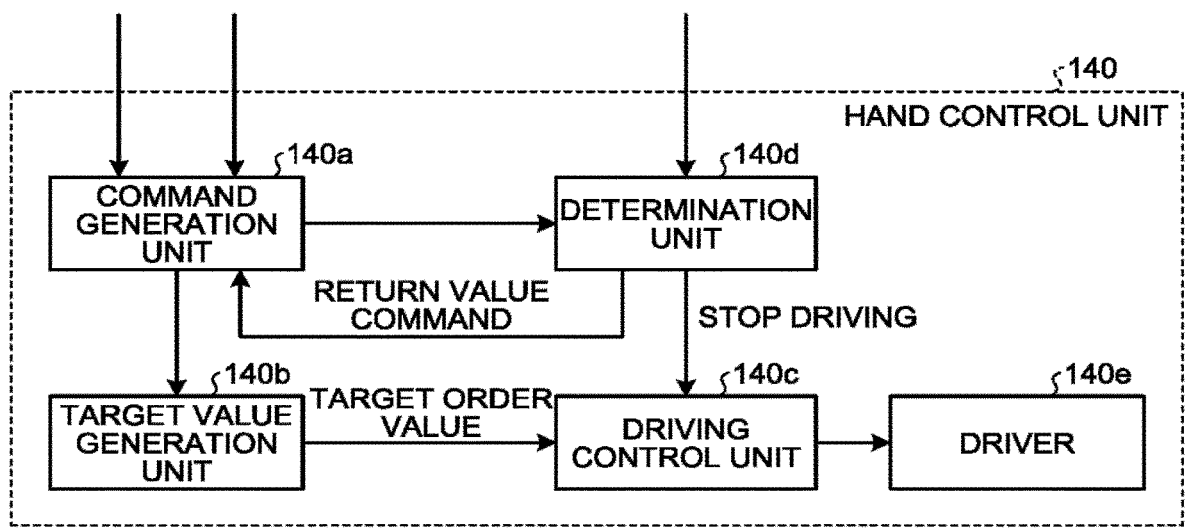
FIG. 6 is a block diagram of a hand control unit according to the embodiment.

FIG. 6 is a block diagram of the hand control unit 140. The hand control unit 140 includes a command generation unit 140a, a target value generation unit 140b, a driving control unit 140c, a determination unit 140d, and a driver 140e.

The command generation unit 140a generates an operation procedure required for each work process as an operation command in response to an operation instruction input from the grasp/operation plan generation unit 101d (FIG. 2) via the plan generation unit 101c (FIG. 2). The grasp/operation plan generation unit 101d, the plan generation unit 101c, and the command generation unit 140a can refer to the object database 102a and the grasp database 102b in performing arithmetic processing. The use of the object database 102a and the grasp database 102b will be described later in detail. The operation instruction is an instruction related to a series of operations of the arm 2 and the hand 200 of the manipulator 20, and held as a computer program, for example. The operation instruction may be given by touching an instruction command displayed in a user interface (not illustrated) by an operator, or given by a voice direction of the operator.

The target value generation unit 140b receives an order of the operation command with respect to a driving unit (movable unit) such as a motor from the command generation unit 140a. The target value generation unit 140b calculates a target value of the driving unit, and generates a target order value related to driving of the driving unit.

The driving control unit 140c receives the target order value of the driving unit from the target value generation unit 140b, and generates a driving direction for driving the driving unit in accordance with the target order value.

The determination unit 140d receives detection results obtained by various sensors from the signal processing unit 101b, and receives the operation command from the command generation unit 140a. The determination unit 140d can determine whether a situation is such that an operation corresponding to the operation command is obtained based on the detection results obtained by the various sensors and the operation command, and can give a return value command (correction order) to the command generation unit 140a depending on the situation. The determination unit 140d can give a driving stop order to the driving control unit 140c depending on the situation.

The driver 140e receives a driving order of the driving unit from the driving control unit 140c, and generates a drive output of the driving unit. That is, the driving unit is driven by the driver 140e.

Operation Example of Hand

Figure 7A:
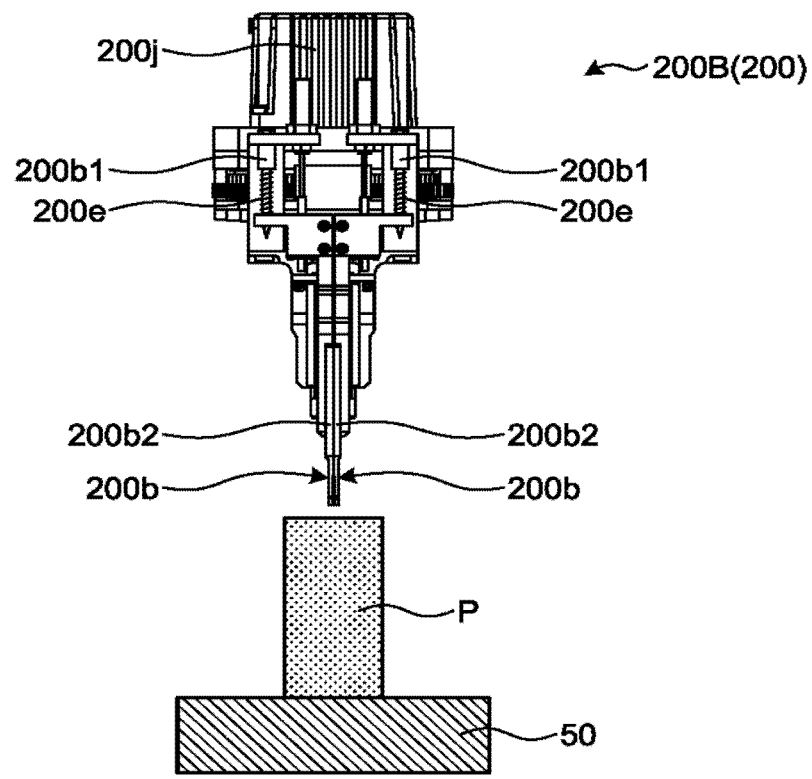
FIG. 7A is a schematic and exemplary side view illustrating an example of an operation procedure of the hand of FIG. 4.

FIGS. 7A to 7E are schematic diagrams illustrating an example of an operation procedure of the hand 200B. As illustrated in FIG. 7A, the hand 200B arranged at the distal end of the arm 2 descends from above the object P to a predetermined position in accordance with the operation of the arm 2 controlled by the arm control unit 120. At this point, the two fingers 200b of the hand 200B are in a closed state.

In this case, as illustrated in FIG. 7A, the arm control unit 120 controls the driving unit of the arm 2 based on a plan planned by the plan generation unit 101c, an image photographed by the camera 21, detection results obtained by various sensors, and the like, and can stop the descent of the manipulator 20 at a predetermined position separated upward from the object P.

Figure 7B:
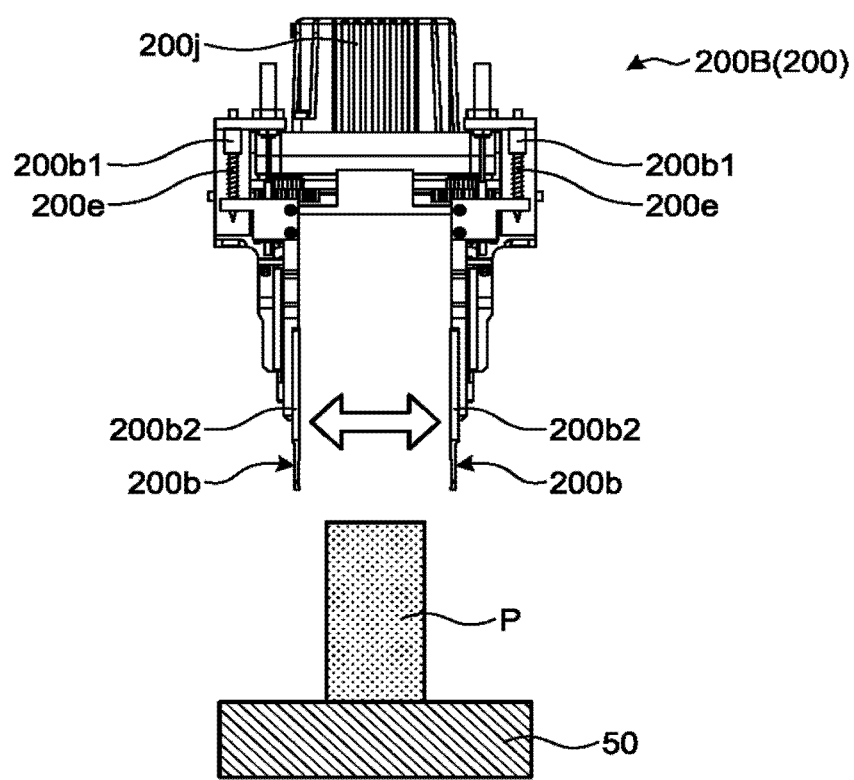
FIG. 7B is a schematic and exemplary side view illustrating an example of the operation procedure of the hand of FIG. 4, and illustrating a step subsequent to FIG. 7A.

Next, as illustrated in FIG. 7B, the hand control unit 140 controls the driving unit of the hand 200B so that a gap between the two fingers 200b becomes slightly larger than the width of the object P based on the plan planned by the plan generation unit 101c, the image photographed by the camera 21, the detection results obtained by the various sensors, and the like.

Figure 7C:
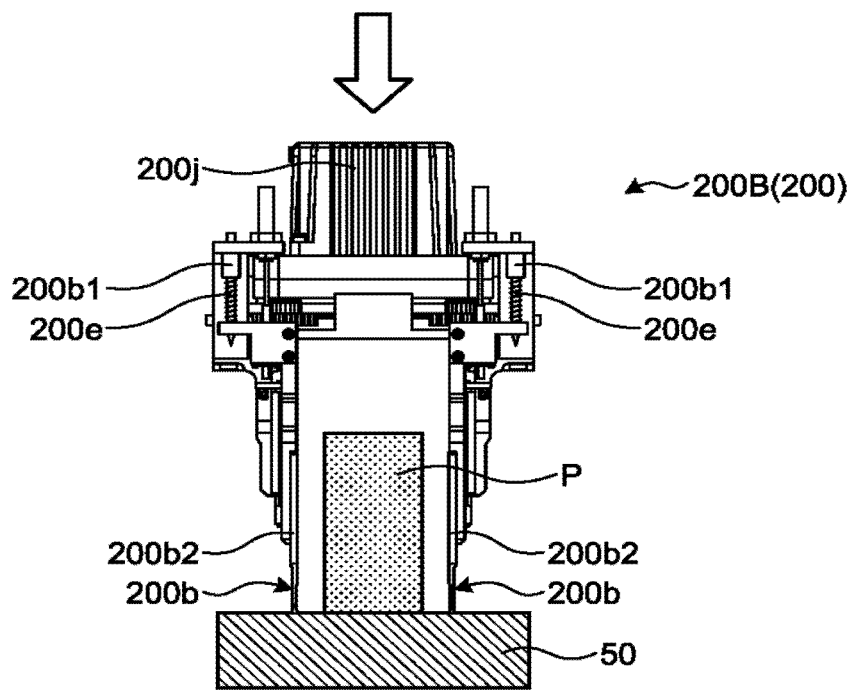
FIG. 7C is a schematic and exemplary side view illustrating an example of the operation procedure of the hand of FIG. 4, and illustrating a step subsequent to FIG. 7B.

Next, as illustrated in FIG. 7C, the arm control unit 120 controls the driving unit of the arm 2 so that the hand 200B descends to a predetermined position for grasping the object P (grasping position) based on the plan planned by the plan generation unit 101c, the image photographed by the camera 21, the detection results obtained by the various sensors, and the like.

Figure 7D:
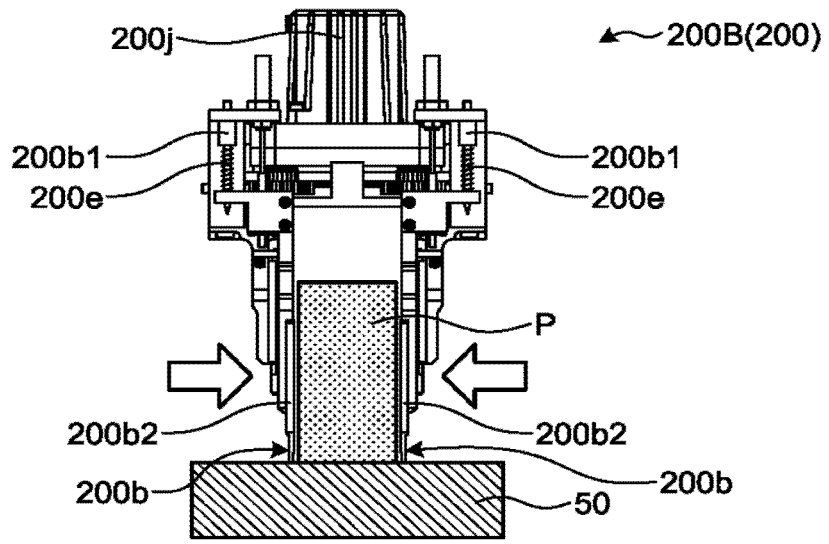
FIG. 7D is a schematic and exemplary side view illustrating an example of the operation procedure of the hand of FIG. 4, and illustrating a step subsequent to FIG. 7C.

Next, as illustrated in FIG. 7D, the hand control unit 140 controls the driving unit of the hand 200B so that the gap between the two fingers 200b is narrowed and the two fingers 200b grasp the object P based on the plan planned by the plan generation unit 101c, the image photographed by the camera 21, the detection results obtained by the various sensors, and the like.

Figure 7E:
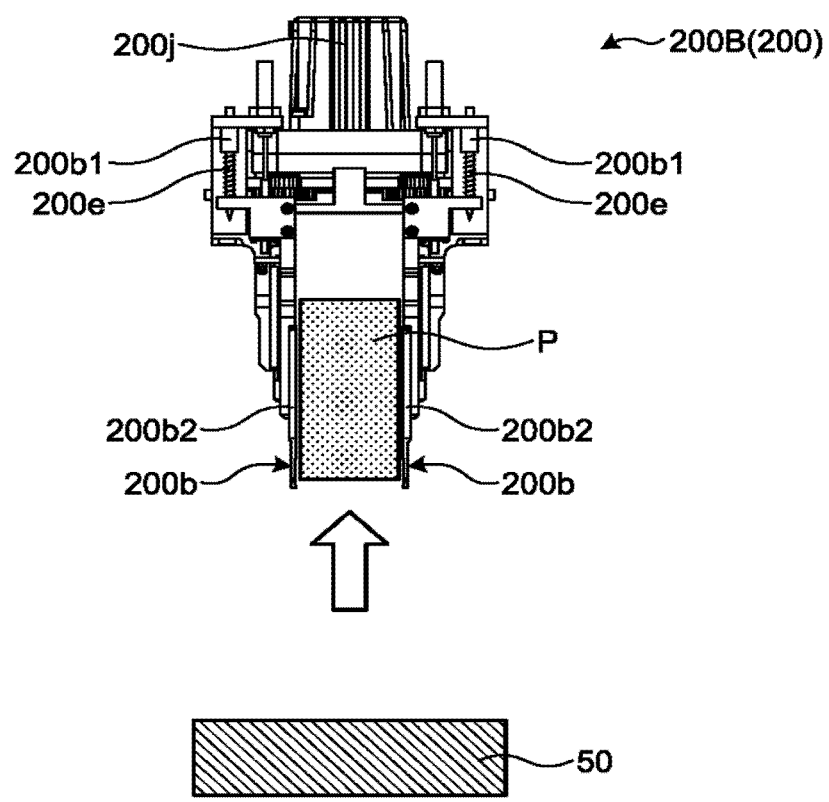
FIG. 7E is a schematic and exemplary side view illustrating an example of the operation procedure of the hand of FIG. 4, and illustrating a step subsequent to FIG. 7D.

Next, as illustrated in FIG. 7E, the arm control unit 120 controls the driving unit of the arm 2 so that the hand 200B ascends to a predetermined position upper than the grasping position while grasping the object P, based on the plan planned by the plan generation unit 101c, the image photographed by the camera 21, the detection results obtained by the various sensors, and the like.

The arm control unit 120 and the hand control unit 140 can execute a series of operations of the arm 2 and the hand 200B in accordance with the plan that is planned in advance by the plan generation unit 101c. The arm control unit 120 and the hand control unit 140 may appropriately control the arm 2 and the hand 200B in accordance with a result obtained by the camera, the sensor, and the like such that, when it is determined that the hand 200B is brought into contact with the object P or the processing unit 50 based on the image photographed by the camera 21 and the detection result of the sensor, for example, the descent of the arm 2 is stopped at the contact position and the arm 2 is slightly moved upward. A series of operations of the hand 200B including descent, grasp, and ascent may be executed irrespective of a grasping form of the object P.

Third Configuration Example of Hand

Figure 8:
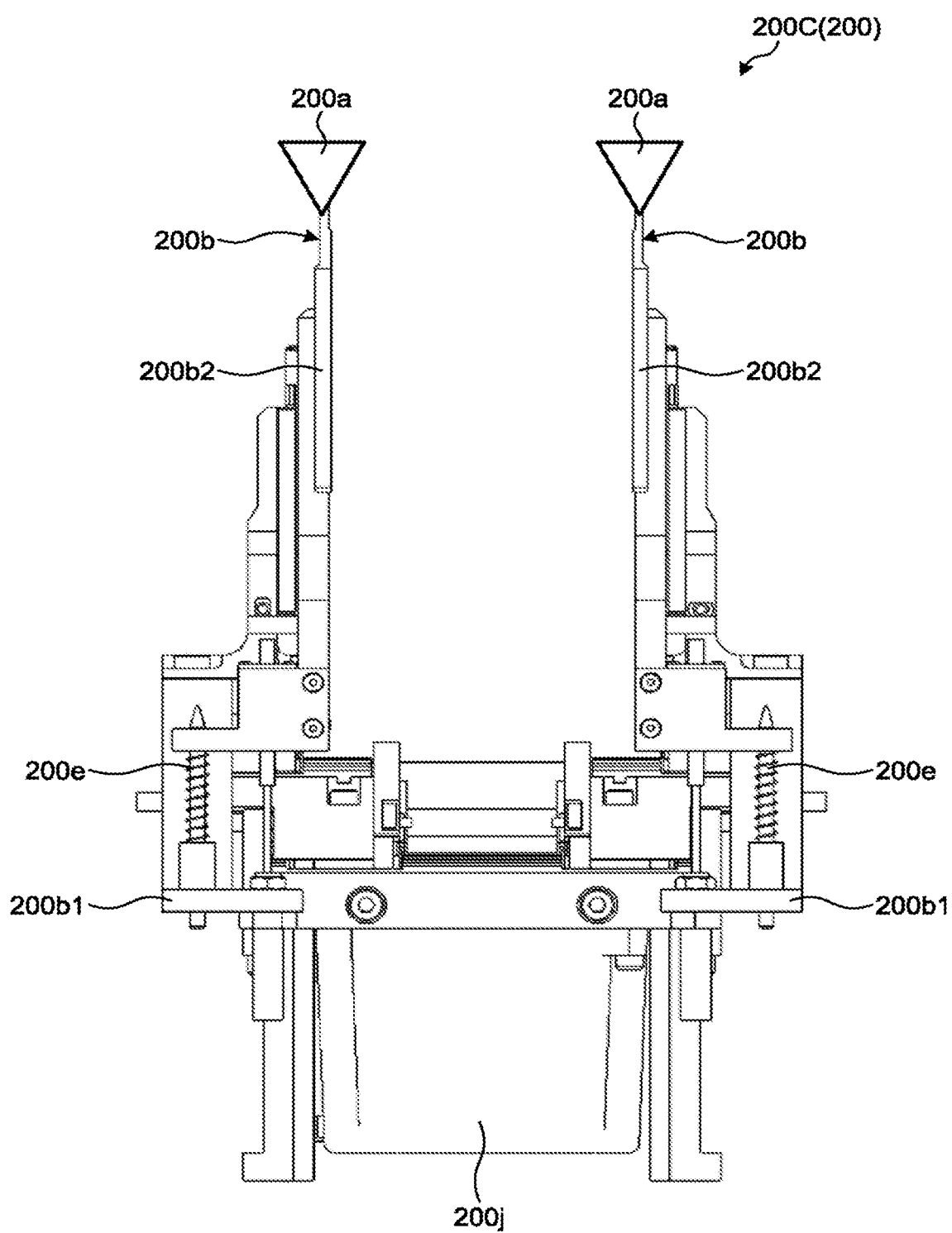
FIG. 8 is a schematic and exemplary side view of another hand according to the embodiment.

FIG. 8 is a perspective view illustrating a configuration example of a hand 200C (200). As illustrated in FIG. 8, in the hand 200C, the suction pad 200a is arranged at the distal end of the finger 200b. In this case, the hand control unit 140 can select which of the suction pad 200a and the finger 200b is used to grasp the object P depending on the object P or depending on another situation. In this case, the suction pad

200a is preferably arranged on the finger 200b in a rotatable manner via the posture variable mechanism 200d like the hand 200A in FIG. 3B.

First Basic Operation of System (Supply of Component to Workbench)

Figure 9:
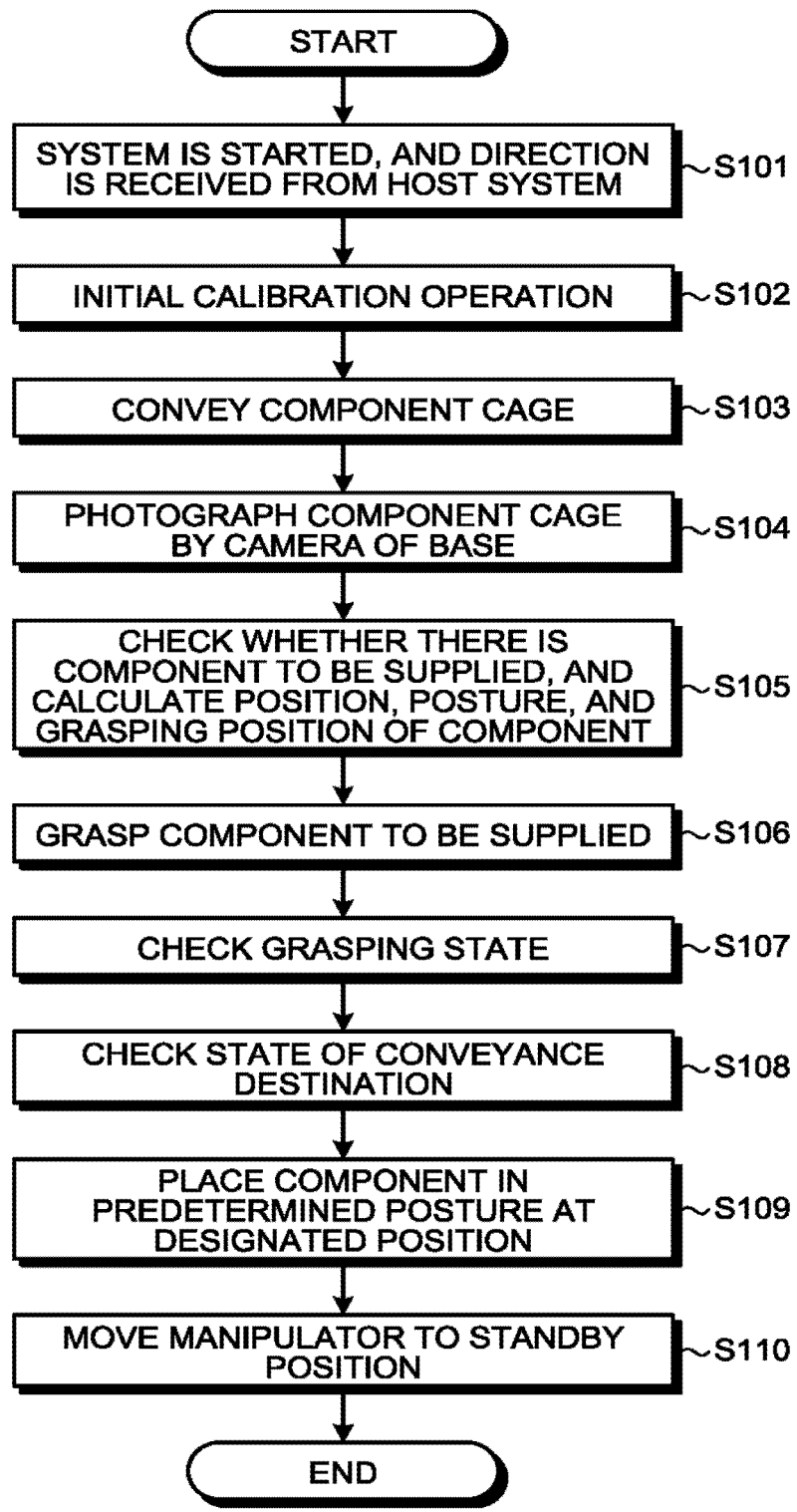
FIG. 9 is a flowchart illustrating an example of a basic operation of a system including the object handling device according to the embodiment.

FIG. 9 is a flowchart illustrating an example of a basic operation of the system. Exemplified herein is a case in which the conveying mechanism 40 acquires (carries) a component as the object P housed in a component cage as the case B in the object handling device 1 including the component cage, and the manipulator 20 carries out the component to the workbench 70.

First, when the system is started or reset and the controller 100 receives an operation direction from a host system (S101), the controller 100 first executes an initial calibration operation (S102). In this case, if there is no problem, the controller 100 notifies the host system that there is no problem. Accordingly, the host system instructs the controller 100 to supply the component to the workbench 70, or control is started based on the operation direction (supply direction) that has been received at the beginning. The initial calibration operation will be described later in detail.

Next, the controller 100 controls the conveying mechanism 40 so that the component cage housing the component (component to be supplied) is conveyed from a predetermined position outside the object handling device 1, for example, a component shelf, to a predetermined position inside the object handling device 1 (S103).

Next, the controller 100 controls the camera 33 (FIG. 1) arranged on a pillar 32 of the base 30 to photograph the component cage (S104).

Next, based on the image photographed by the camera 33, the controller 100 checks whether there is the component to be supplied in the component cage, and calculates a position, a posture, and a grasping position of the component in the component cage (S105).

Next, the controller 100 controls the manipulator 20 to grasp the component to be supplied in the component cage (S106).

Next, the controller 100 checks a grasping state of the component to be supplied by the hand 200 based on the image photographed by the cameras 21 and 33, detection results obtained by various sensors, and the like (S107).

Next, the controller 100 checks whether the workbench 70 (conveyance destination) is in a state in which the component can be supplied thereto, based on the image photographed by the cameras 21 and 33, for example (S108).

Next, the controller 100 controls the manipulator 20 to place the component grasped by the hand 200 at a designated position of the workbench 70 in a predetermined posture (S109).

After a series of work is ended, the controller 100 controls the manipulator 20 to move to a standby position (S110).

Second Basic Operation of System (Removal of Component from Workbench)

Figure 10:
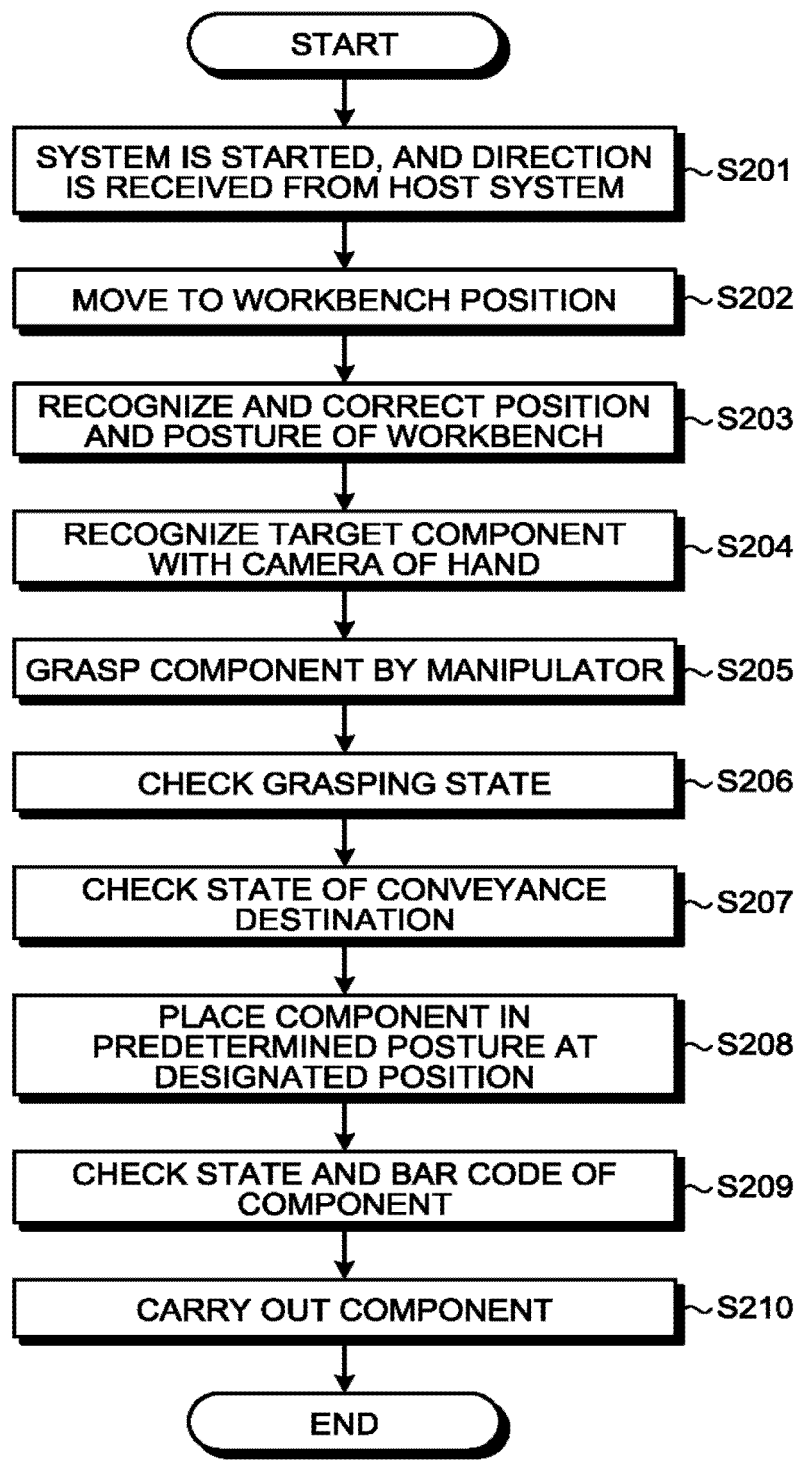
FIG. 10 is a flowchart illustrating another example of the basic operation of the system including the object handling device according to the embodiment.

FIG. 10 is a flowchart illustrating another example of the basic operation of the system. Exemplified herein is a case in which the manipulator 20 acquires (carries) the component as the object P in the object handling device 1 from the workbench 70, and the conveying mechanism 40 carries the component out of the object handling device 1.

When the system is started or reset and the controller 100 receives the operation direction from the host system (S201), the controller 100 first controls the manipulator 20 so that the hand 200 is moved to a predetermined position in the vicinity of the workbench 70 (S202).

Next, the controller 100 recognizes the position and the posture of the workbench 70 based on the image of the mark 71 photographed by the camera 21 of the hand 200, for example, and corrects position data of the workbench 70 in a virtual work space (arithmetic space) based on the recognized result (S203).

Next, the controller 100 controls the camera 21 of the hand 200 to photograph the component (component to be removed) present in the workbench 70, and recognizes the component through image processing and the like on the photographed image (S204).

Next, the controller 100 controls the manipulator 20 to grasp the component to be removed present in the workbench 70 (S205).

Next, the controller 100 checks the grasping state of the component to be removed by the hand 200 based on the image photographed by the cameras 21 and 33, detection results obtained by various sensors, and the like (S206).

Next, the controller 100 checks the state of the conveyance destination based on the image photographed by the cameras 21 and 33, detection results obtained by various sensors, and the like (S207).

Next, the controller 100 controls the manipulator 20 to place the component grasped by the hand 200 at a designated position of the object handling device 1 in a predetermined posture (S208). In this case, the designated position is on the conveying mechanism 40, for example.

Next, the controller 100 checks the state, a bar code, and the like of the component to be removed. The controller 100 then updates the object database 102a (S209).

Next, the controller 100 controls the conveying mechanism 40 so that the component cage housing the component (component to be supplied) is conveyed from a predetermined position inside the object handling device 1 to a predetermined position outside the object handling device 1, for example, the component shelf (S210).

Configuration of Information Acquisition System

Figure 11:
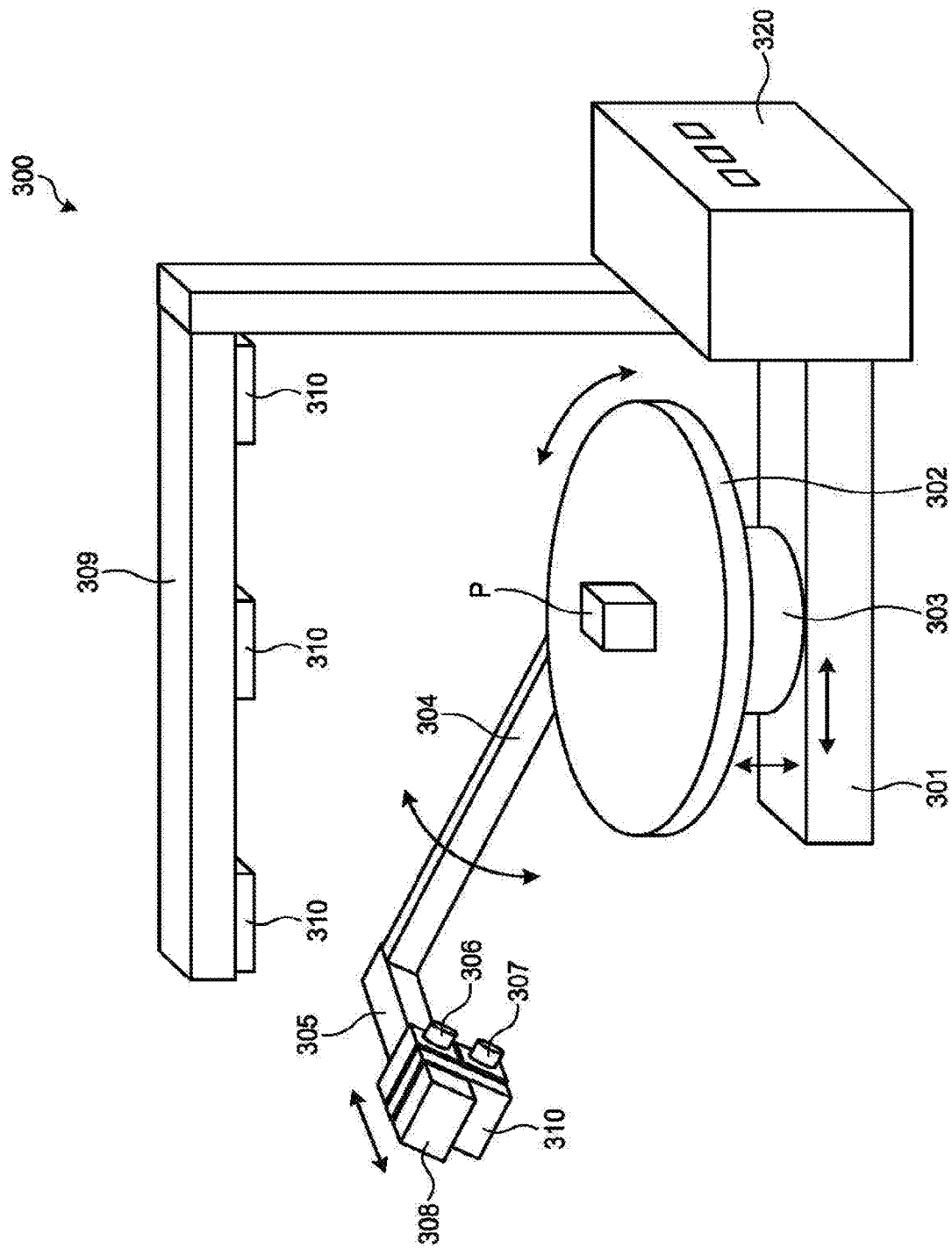
FIG. 11 is a schematic and exemplary perspective view of an information acquisition system according to the embodiment.

FIG. 11 is a perspective view of an information acquisition system 300. The information acquisition system 300 illustrated in FIG. 11 includes a slide stage 301, a rotary stage 302, a position adjusting mechanism 303, a sensor arm 304, a slide mechanism 305, an RGB camera 306, a distance image camera 307, a laser sensor 308, an illumination arm 309, an illumination lamp 310, a controller 320, and the like.

The controller 320 controls each component so that the RGB camera 306 photographs the object P from various directions, and the distance image camera 307 photographs a distance image of the object P from various directions. The object P is placed on the rotary stage 302. The position adjusting mechanism 303 varies a position in a height direction of the rotary stage 302, and the slide stage 301 varies a position in a horizontal direction of the rotary stage 302. The sensor arm 304 is supported by the position adjusting mechanism 303 in a rotatable manner. With such a configuration, when the controller 320 sets or adjusts a horizontal position of the slide stage 301, an angle of the rotary stage 302, an expansion/contraction degree of the position adjusting mechanism 303, and an angle of the sensor arm 304, a photographing direction and a photographing distance of the object P by the RGB camera 306 and the distance image camera 307 can be changed. In the following description, the slide stage 301, the rotary stage 302, the position adjusting mechanism 303, and the sensor arm 304 may be referred to as a movable mechanism. A measurement result of the distance obtained by the laser sensor 308 can be used for calibration of a measured distance obtained by the distance image camera 307. The controller 320 can adjust an illumination condition of the illumination lamp 310.

The controller 320 generates object information of the object P based on the photographed image and the detection result obtained by the sensor. The generated object information is stored in the object database 102a. The controller 320 can generate grasp information for grasping the object P based on the object information of the object P. The generated grasp information is stored in the grasp database 102b. The controller 320 can add, to the grasp information, a grasp score indicating a position and a posture in which the object P can be grasped, ease of grasp, and the like, a pressable amount in grasping, a threshold for grasp determination, and the like to be stored, based on the input, received information, or the like.

The information acquisition system 300 includes a user interface (not illustrated) for inputting an operation by the operator. The information acquisition system 300 includes a weight sensor and another sensor (not illustrated). The information acquisition system 300 may be configured such that a cover (not illustrated) for covering the entire system can be mounted thereon.

Object Database and Grasp Database

Figure 12:
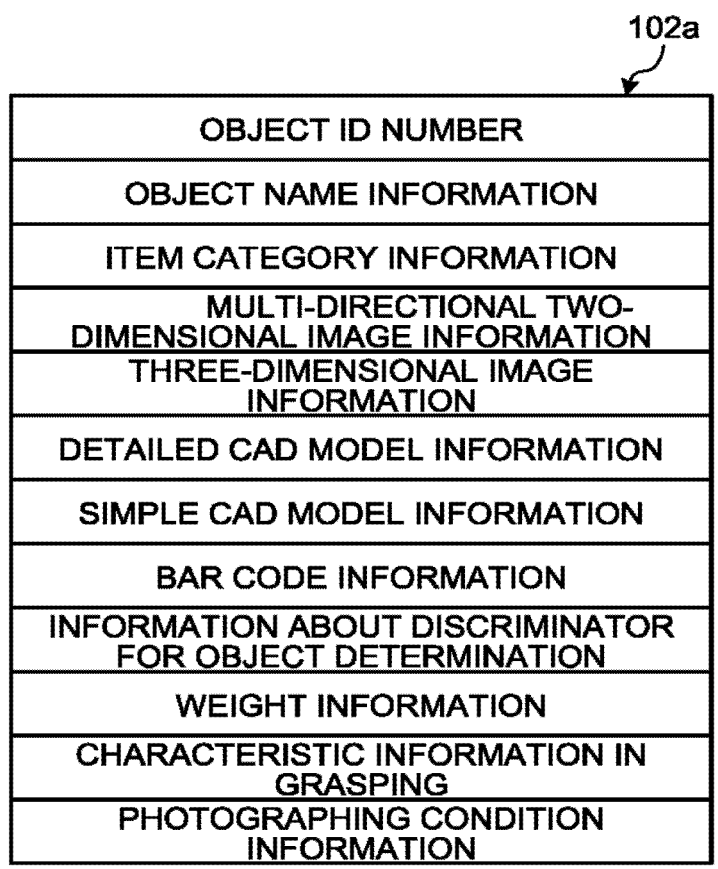
FIG. 12 is a table illustrating object information stored in an object database according to the embodiment.

FIG. 12 is a table illustrating the object information stored in the object database 102a. The object information stored in the object database 102a may include, for example, an object ID number, object name information, item category information, multi-directional two-dimensional image information, three-dimensional image information, detailed CAD model information, simple CAD model information, bar code information, information about discriminator for object determination, weight information, characteristic information in grasping (for example, soft, fragile, and deformable), photographing condition information, and the like. The information about discriminator for object determination is, for example, information about a classifier and a discriminator used for discriminating the object, a dictionary for pattern matching, and the like. The photographing condition information is information indicating photographing date and time, an environment, photographic equipment, and the like.

Figure 13:
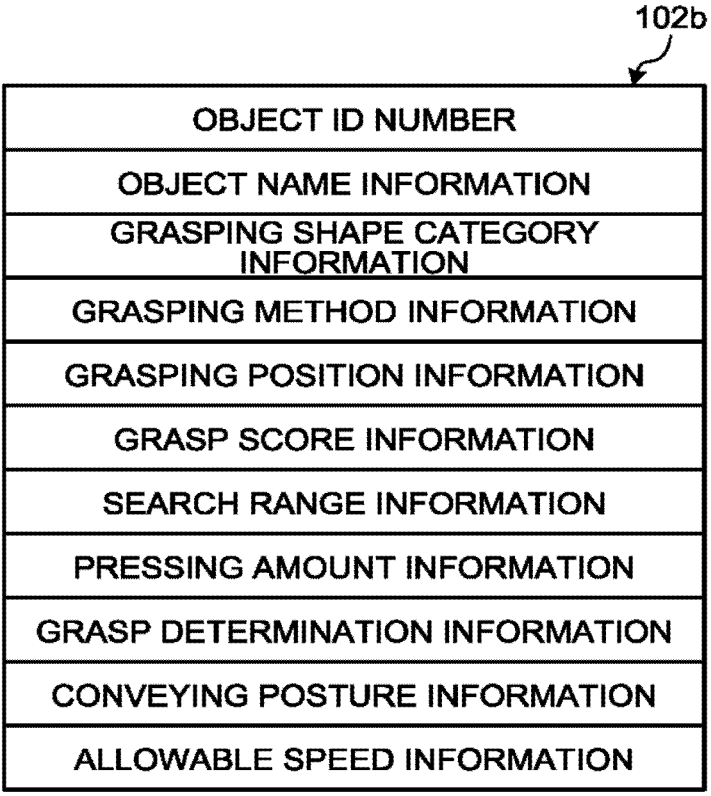
FIG. 13 is a table illustrating grasp information stored in a grasp database according to the embodiment.

FIG. 13 is a table illustrating the grasp information stored in the grasp database 102b. The grasp information stored in the grasp database 102b may include, for example, an object ID number, object name information, grasping shape category information, grasping method information, grasping position information, grasp score information, search range information, pressing amount information, grasp determination information, conveying posture information, allowable speed information, and the like. In the grasp database 102b, the grasping position information, the grasp score information, the search range information, the pressing amount information, the grasp determination information, the conveying posture information, the allowable speed information, and the like are set for each grasping method. As is clear from FIGS. 12 and 13, the object information stored in the object database 102a and the grasp information stored in the grasp database 102b are associated with each other through the object ID number and the object name information.

Figure 14:
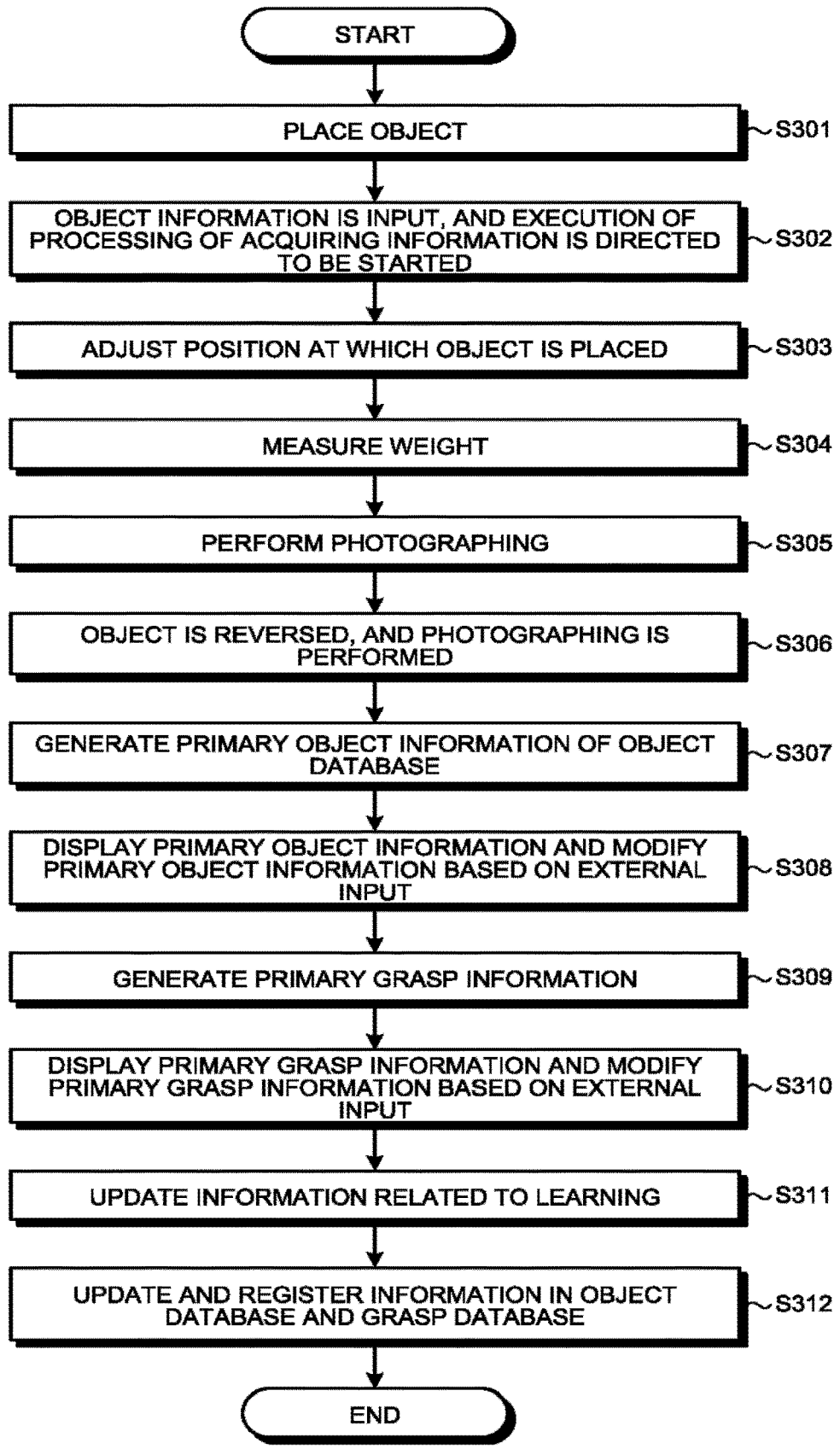
FIG. 14 is an exemplary flowchart illustrating a procedure of acquiring object information performed by the information acquisition system.

Procedure of Acquiring Object Information Performed by Information Acquisition System FIG. 14 is a flowchart illustrating a procedure of acquiring the object information performed by the information acquisition system 300. When the cover is opened, the object P is placed on the rotary stage 302 (S301), and the object ID number or the object name information is input through the user interface and the like, the controller 320 outputs a direction to start execution of processing of acquiring the object information to each component of the information acquisition system 300 (S302).

Next, a position at which the object P is placed is adjusted (S303). At S303, for example, the controller 320 causes the movable mechanism to operate to adjust the position of the object P based on a temporary photographed image of the object P taken by the RGB camera 306 or the distance image camera 307, and causes a centroid assumed position of the object P to match with a photographing center.

Next, the controller 320 acquires a detection result of the weight of the object P obtained by the weight sensor, and measures the weight of the object P based on the detection result (S304).

Next, the controller 320 causes the position (angle) of the movable mechanism, for example, the rotary stage 302 and the sensor arm 304 to vary in a stepwise manner, and controls the RGB camera 306 and the distance image camera 307 to perform photographing at each position (angle) (S305). At this point, the controller 320 acquires the measurement result of the distance obtained by the laser sensor 308 at each step.

Next, the controller 320 performs photographing similarly to Step S305 as needed in a state in which the object P is reversed. The object P may be reversed by the operator, or by the controller 320 by using the manipulator 20 or other devices such as the robot 8 if they can be used (S306).

When the photographing is completed, the controller 320 automatically generates primary object information to be registered in the object database 102a (S307). The primary object information is, for example, the item category information, the multi-directional two-dimensional image information, the three-dimensional image information, the detailed CAD model information, the simple CAD model information, the bar code information, the information about discriminator for object determination, and the like of the object P. Automatic generation of the primary object information will be described later in detail.

Next, the controller 320 displays the automatically generated primary object information on an output unit (a display and the like) of the user interface, and modifies the primary object information based on a modification direction from the operator and input data through an input unit (a keyboard and the like) of the user interface (S308).

Next, the controller 320 automatically generates primary grasp information based on the modified primary object information (S309). The primary grasp information is, for example, the grasping shape category information, the grasping method information, the grasping position information, the grasp score information, the search range information, the pressing amount information, the grasp determination information, the conveying posture information, and the allowable speed information related to grasp of the object P. Automatic generation of the primary grasp information will be described later in detail.

Next, the controller 320 displays the automatically generated primary grasp information on the output unit (a display and the like) of the user interface, and modifies the primary grasp information based on a modification direction from the operator and input data through the input unit (a keyboard and the like) of the user interface (S310).

Next, the controller 320 updates processing related to learning of discriminator information for determining an article and the like (S311).

Next, the controller 320 updates and registers the modified primary object information in the object database 102a, and updates and registers the modified primary grasp information in the grasp database 102b (S312).

Automatic Generation of Object Information by Information Acquisition System

Among pieces of primary object information, for example, the detailed CAD model information can be acquired by converting the obtained multi-directional two-dimensional image information and three-dimensional point group information such as point cloud data into three-dimensional plane information or point group information such as STL or STEP, the three-dimensional point group information being obtained from the three-dimensional image information obtained by reconstructing the multi-directional two-dimensional image information, distance image information, and the like.

A centroid of the obtained detailed CAD model information and standard coordinates of the centroid are defined. The standard coordinates may be based on, for example, a posture of the object P placed on the information acquisition system 300. Specifically, for example, a rule may be applied such that a reverse direction of a normal direction of a maximum face of a circumscribed rectangle of the object P is assumed to be the Z-axis, a direction along a long side of the maximum face is assumed to be the Y-axis, and a direction along a short side thereof is assumed to be the X-axis.

The simple CAD model information may be acquired, for example, as information having reduced data size by reducing apex information of the obtained detailed CAD model, or applying the three-dimensional point group information to a small number of basic forms such as a cube and a cylinder.

Regarding the bar code information, information such as an ID and the like of a target item can be obtained by extracting a bar code region from the obtained multi-directional two-dimensional image information through image processing and analyzing the bar code information. In this case, the bar code information is stored in the object database 102a associated with or including information indicating a presence position and a presence direction of the bar code region in the object P, and information indicating a presence position and a presence direction of the bar code region in the detailed CAD model information or the simple CAD model information.

The item category information indicates a classification representing a type of a component such as a screw, a nut, a fastening component, and a protection component at a manufacturing site, and indicates a classification representing a type of an article such as clothing, stationery, and an electronic device at a distribution site of finished goods. The item category information can be determined using a category recognition technology based on the image information and the CAD model information.

Identification information for determining an object, that is, information about a classifier, a discriminator, a dictionary for pattern matching, and the like used for determining the object can be generated, for example, using a method of using a feature amount of a two-dimensional image such as SIFT, HOG, and Haar-like or a feature amount using a three-dimensional shape data such as SHOT, or using a method of using a neural network such as deep learning based on the obtained multi-directional two-dimensional image information, the three-dimensional image information, the object name information, and the like.

Automatic Generation of Grasp Information by Information Acquisition System

Figure 15:
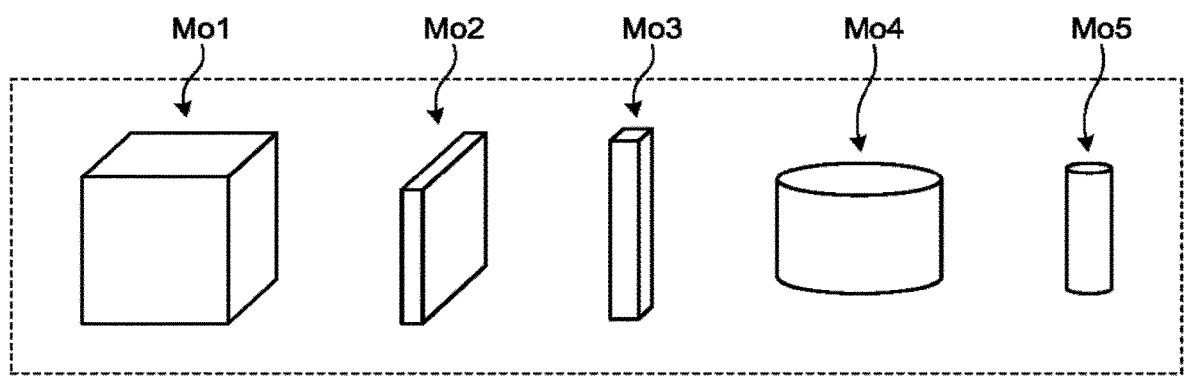
FIG. 15 is a schematic diagram of a grasp basic system model according to the embodiment.
Figure 16:
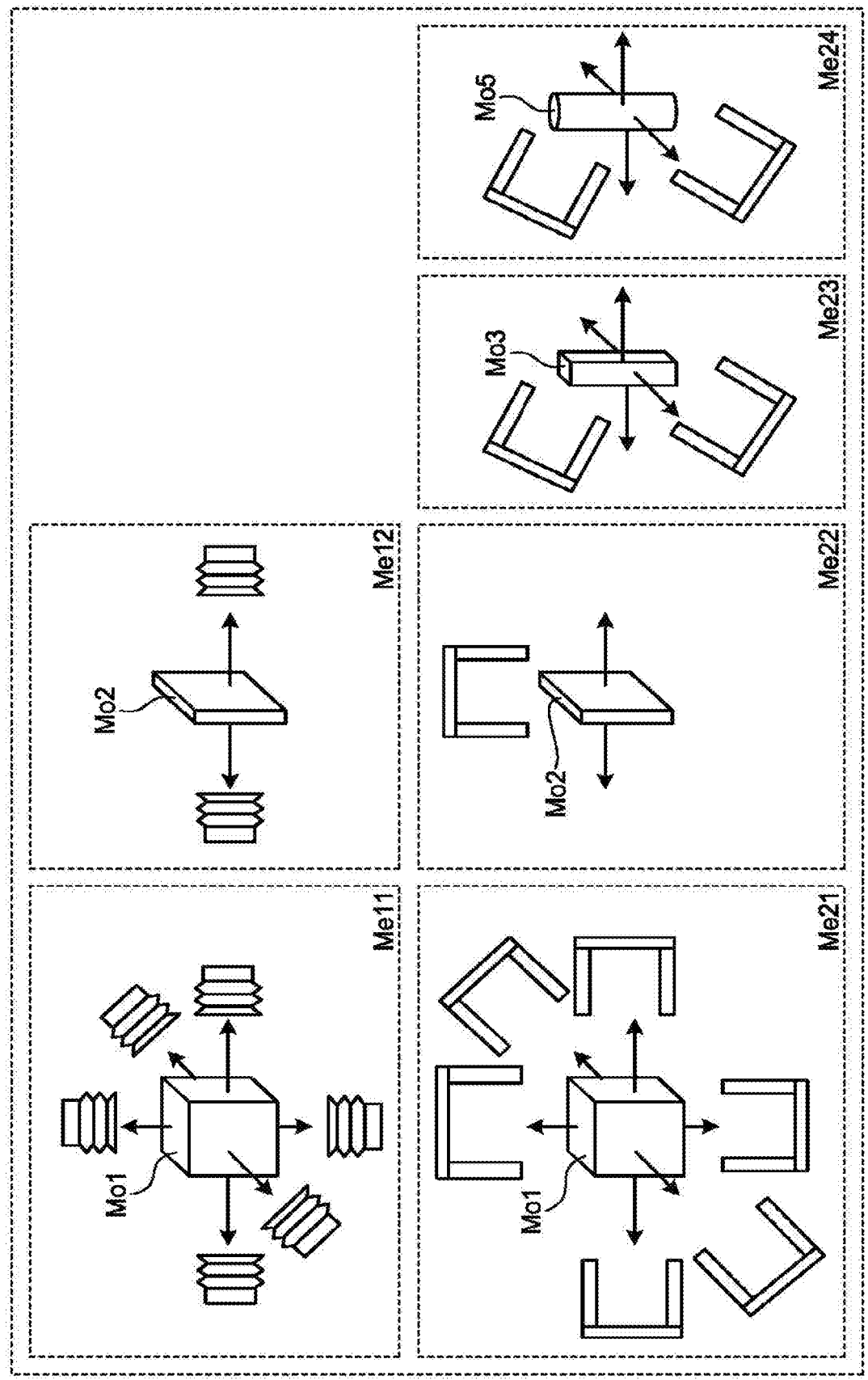
FIG. 16 is a schematic diagram of grasping method basic data according to the embodiment.

FIG. 15 is a schematic diagram of a grasp basic system model. FIG. 16 is a schematic diagram of a grasping method basic data. FIG. 17 is a schematic diagram illustrating part of a procedure of automatically generating the grasp information performed by the information acquisition system 300.

The controller 320 (database information generation unit) includes, for generating the grasp information, the grasp basic system model exemplified in FIG. 15 as a basic system of an object model and grasping method basic system data exemplified in FIG. 16 in which a basic grasping method for the grasp basic system model is defined. The grasp basic system model and the grasping method basic system data may be described in a computer program or registered as a database in an auxiliary storage unit and the like.

As illustrated in FIG. 15, the grasp basic system model is, for example, shape data such as a rectangular parallelepiped Mo1, a flat plate Mo2, a square bar Mo3, a circular cylinder Mo4, and a round bar Mo5. In the grasping method basic data, a grasping method is defined for grasping each face or a feature point of the grasp basic system model such as sucking Me11 to Me12, pinching Me22 to Me24, and gripping by the hand 200. The example of FIG. 16 defines that sucking Me11 using a suction pad method with respect to each face of the rectangular parallelepiped Mo1 and pinching Me21 for pinching opposed faces can be performed on the rectangular parallelepiped Mo1. FIGS. 15 and 16 are merely an example, and a grasp basic system model other than that in FIG. 15 and grasping method basic data other than that illustrated in FIG. 16 can be naturally defined.

As illustrated in FIG. 17, for example, grasp category information is a classification based on a shape (for example, a rectangular parallelepiped shape, a flat plate shape, and a composite shape) and a structure and material (for example, hardness, fragility, flexibility, and porosity). The shape of the grasp category can be determined by performing matching processing between the CAD model information of the object information and the grasp basic system model, and applying the closest grasp basic system model. Structure and material information of the grasp category can be determined by category recognition base on RGBD image information of the object information or reclassification based on the item category information.

As illustrated in FIG. 17, for example, the grasping method information can be determined by referring to the grasping method basic data based on shape information of the grasp category. In a case in which a direction defined in the grasping method basic data is hidden by combining shapes, the case is excluded from the grasping method.

The grasping position information can be determined by calculating coordinate values of the grasping position and a grasp posture in performing grasping using each grasping method defined in the grasping method basic data with respect to a basic posture of the target object defined in the shape information of the grasp category similarly to the grasping method information.

The grasp score information can be calculated in accordance with a rule specified by combining each grasping method with the shape of the grasping position. For example, the rule is such that the score is increased when an area of a flat plane on which sucking is performed is large in a case of sucking using a suction pad, the score is decreased when there are minute projections and depressions on a flat plane of the CAD model, the score is increased when the structure and material information indicates a plastic through which air does not pass, and the score is decreased when the structure and material information indicates porosity for passing the air through. The grasp score can be determined through the discriminator using these pieces of information as learning data. The grasp score may be considered as an indicator of success probability in grasping.

The search range information is information used for re-searching the target object when grasp failure determination is generated during grasp work. The search range is set to be smaller as the size of the object P determined based on the shape of the grasp category is smaller, and the search range is set to be larger as the size is larger.

The pressing amount information defines a pressing amount of the hand 200 in grasp determination. Based on the structure and material information of the grasp category, the pressing amount is set to be smaller as the material is harder, and the pressing amount is set to be larger as the material is softer.

The grasp determination information is a threshold for performing grasp determination. For example, in performing sucking, in a case in which a negative pressure (pressure) in sucking is used for grasp determination and a leakage flow rate at the grasping position is estimated to be low based on the shape information and the structure and material information, a larger negative pressure is maintained, so that an absolute value of the negative pressure as a determination criterion for sucking is increased. When the leakage flow rate is estimated to be present, the pressure is hardly lowered, so that the absolute value of the negative pressure as the determination criterion for sucking is reduced. Even in this case, the object P can be grasped if a flow rate for sucking is sufficiently secured. In a case of pinching, for example, a reaction force to the finger 200b in pinching is set to be high when the material is hard, and the reaction force to the finger 200b is set to be low when the material is soft. In this way, by varying the determination value of the grasping state depending on characteristics of the object P, more types of objects P can be stably grasped.

The processing described above performed by the controller 320 of the information acquisition system 300 can be performed by the database information generating and updating unit 101i of the object handling device 1. That is, the object handling device 1 is also an example of the information acquisition system 300. In this case, the object P placed on the processing unit 50 is photographed by the camera 21 of the hand 200 (manipulator 20) from a plurality of directions and a plurality of distances. In this case, the posture of the object P on the processing unit 50 may be varied using the manipulator 20. The arithmetic processing unit 101 then performs the same processing as the processing described above performed by the controller 320.

Characteristic Function of Object Handling Device

The object handling device 1 has characteristic functions in the following (1) to (5). The following describes these functions in order.

Figure 18B:
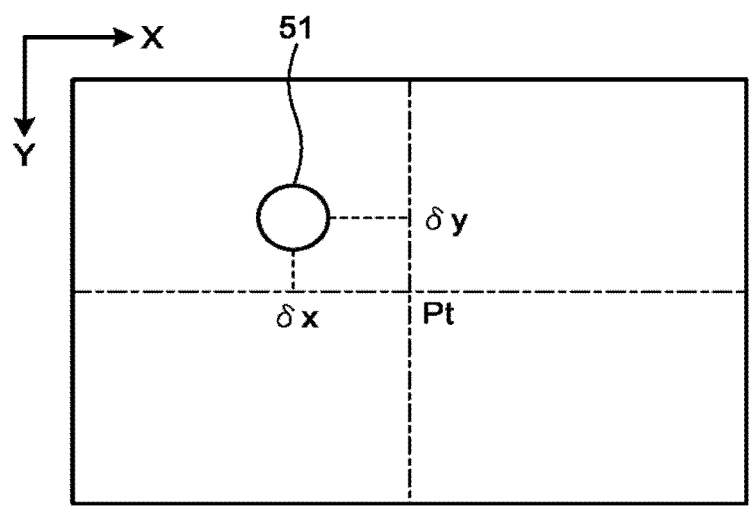
FIG. 18B is an explanatory diagram of a plane error between a base coordinate system and a manipulator coordinate system according to the embodiment.
Figure 18C:
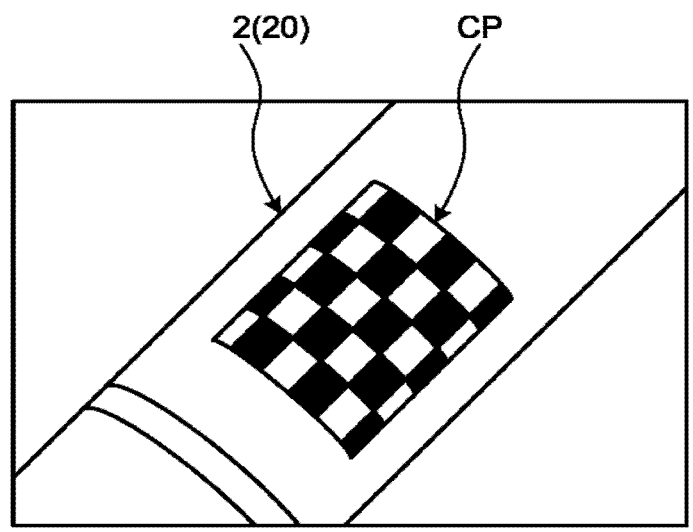
FIG. 18C is a schematic diagram illustrating an image of a manipulator on which a calibration pattern photographed by a camera according to the embodiment is arranged.

(1) Automatic calibration function for minimizing manual calibration (2) Grasp function for implementing flexible handling of object based on object database and grasp database by hand including elastic articulation (3) Model-based real-time visual feedback control function for successively performing trajectory modification on target depending on error in mechanism or sensing and change in environment to securely catch target object (4) Error recovery function for selecting optimum work procedure and executing error recovery by monitoring work state all the time (5) Learning control function for adapting to use environment through parameter learning during work (1) Automatic calibration FIG. 18A is a flowchart illustrating a procedure of automatic calibration performed by the object handling device 1. FIG. 18B is an explanatory diagram of a plane error between a base coordinate system S1 and a manipulator coordinate system S2, and FIG. 18C is a schematic diagram illustrating an image of the manipulator 20 on which a calibration pattern CP photographed by the camera 21 is arranged.

Automatic calibration is executed by the automatic calibration unit 101j of the arithmetic processing unit 101. The automatic calibration unit 101j automatically recognizes deviations among the base coordinate system S1, the manipulator coordinate system S2, and a coordinate system S3 outside the device illustrated in FIG. 1, and executes calibration for obtaining a detection result and a control result with a small error. The position of the mark 51 of the processing unit 50 is assumed to be already known in the base coordinate system S1 as design information. A position of an origin and a direction of a coordinate axis in each of the coordinate systems S1, S2, and S3 are not limited to those illustrated in FIG. 1.

The automatic calibration unit 101j first detects a plane error between the processing unit 50 and the manipulator 20 based on a photographed image taken by the camera 21 arranged on the hand 200. Specifically, the automatic calibration unit 101j controls the manipulator 20 so that a designed position of the mark 51 of the processing unit 50 becomes a center point of a visual field of the camera 21 of the hand 200, or becomes a position and a posture assumed to be overlapped with a predetermined assumed point. In this case, the posture is such that an optical axis of the camera 21 is orthogonal to the mark 51. As illustrated in FIG. 18B, deviations δx, δy (plane error) on the XY-plane (the direction X and the direction Y) between the center point or the predetermined assumed point Pt and the mark 51 are measured based on the image of the mark 51 photographed by the camera 21. Each of the direction X and the direction Y is an example of a first direction. When the camera 21 is a distance image camera, not only an XY-plane position but also a Z-direction position of the mark 51 can be acquired. By acquiring the Z-direction position, a search range for a depth position error searched by the manipulator 20 can be narrowed at the next step (S502). Regarding the information of the distance image camera, position accuracy is different depending on a direction thereof. Typically, accuracy is low in a depth direction, so that sufficient accuracy is hardly obtained only with the information of the distance image camera. Each of the deviations δx and δy is an example of a first error (S501).

Next, the automatic calibration unit 101j detects the depth position error between the processing unit 50 and the manipulator 20 based on detection results obtained by the contact sensor 200g, the force sensor 200h, the displacement sensor 200i, and the like. Specifically, the automatic calibration unit 101j first controls the manipulator 20 so that the distal end of the hand 200 or a probe (not illustrated) arranged on the hand 200 moves from a position that is moved from a designed position of the mark 51 in a direction and by a distance to reduce the deviation δ1 obtained at S501 on the XY-plane to a position deviated therefrom by a predetermined amount in the direction Z orthogonal to the XY-plane. Next, the automatic calibration unit 101j controls the manipulator 20 so that the distal end or the probe of the hand 200 moves to a position to be brought into contact with the mark 51. Contact with the mark 51 can be recognized through the detection results obtained by the contact sensor 200g, the force sensor 200h, the displacement sensor 200i, and the like. The automatic calibration unit 101j stops the manipulator 20 at a position where the distal end or the probe of the hand 200 is brought into contact with the mark 51, and acquires a position (a depth position, a Z-direction position) in the manipulator coordinate system S2 at the stopped position. The automatic calibration unit 101j performs the above processing on a plurality of marks 51 to acquire the Z-direction position in the manipulator coordinate system S2, and calculates a deviation δz (depth error) from a designed Z-direction position of each mark 51. The direction Z is an example of a second direction. The deviation δz is an example of a second error (S502).

Next, the automatic calibration unit 101j calibrates the manipulator coordinate system S2 in the base coordinate system S1. Specifically, the automatic calibration unit 101j obtains a first correction matrix by which the deviations δx, δy, and δz of the marks 51 become minimum, that is, the first correction matrix for calculating an operation value for obtaining an actual position and posture of a representative part closest to an order value of a position and a posture of the representative part of the manipulator 20 (hand 200) in the base coordinate system S1. Herein, obtaining the first correction matrix is an example of calibration of the manipulator coordinate system S2 in the base coordinate system S1. The first correction matrix is an example of a directed calibration value (first directed calibration value) (S503).

Next, the automatic calibration unit 101j calibrates the position and the posture of the camera 33 of the base 30 in the base coordinate system S1. In this processing, it is important that the manipulator coordinate system S2 has been already calibrated with respect to the base coordinate system S1. Specifically, the automatic calibration unit 101j first controls the manipulator 20 so that the calibration pattern CP arranged on the manipulator 20 (the arm 2 or the hand 200) as illustrated in FIG. 18C is included in a visual field of the camera 33. The automatic calibration unit 101j then controls the manipulator 20 so that the calibration pattern CP moves to a plurality of predetermined positions set in the visual field, and controls the camera 33 to photograph the calibration pattern CP at each position. Next, the automatic calibration unit 101j calculates an origin and a posture of a coordinate system of an internal optical system of the camera 33 in the base coordinate system S1 based on a position and a posture obtained from a photographic result of the calibration pattern CP by the camera 33 and a position and a posture that should be obtained from a photographic result of the calibration pattern CP by the camera 33 in design. The coordinate system of the internal optical system of the camera is referred to as a camera coordinate system, and the origin and the posture are typically called external parameters, which can be calculated by using a method of estimating a perspective projection matrix and the like. In this case, by using the known method, a second correction matrix is obtained for obtaining an actual position and posture of the camera 33 in the base coordinate system S1. In this way, by calibrating the position and the posture of the camera 33 in the base coordinate system S1, a position and a posture of the object to be photographed can be correctly calculated after this, based on the photographic result by the camera 33. The second correction matrix is an example of an image calibration value (S504).

Next, the automatic calibration unit 101j calibrates the position and the posture of the workbench 70 (outside the device) in the base coordinate system S1 through the procedures at S505 and S506 described below (S507). Also in this processing, it is important that the manipulator coordinate system S2 has been already calibrated with respect to the base coordinate system S1. Specifically, the automatic calibration unit 101j first detects a plane error between the workbench 70 and the manipulator 20 based on a photographed image taken by the camera 21 arranged on the hand 200. Specifically, the automatic calibration unit 101j controls the manipulator 20 so that the mark 71 of the workbench 70 is included in the visual field of the camera 21. The automatic calibration unit 101j then calculates a rough position and posture of the workbench 70 from feature point information of the mark 71 and a peripheral part thereof obtained by the camera 21. Next, the automatic calibration unit 101j controls the manipulator 20 so that a designed position of the mark 71 becomes a position and a posture assumed to be overlapped with the center point of the visual field of the camera 21 of the hand 200 or overlapped with a predetermined assumed point. In this case, the posture is such that an optical axis of the camera 21 is orthogonal to the mark 71. The automatic calibration unit 101j measures a deviation (plane error) on the XY-plane between the center point or the predetermined assumed point and the mark 71 based on the photographed image of the mark 71 taken by the camera 21 (S505). Although the camera 21 photographs the image of the mark 71 in the present embodiment, the camera 33 may photograph the image of the mark 71. When the camera 33 is used, it is important that the position and the posture of the camera 33 have been calibrated in the base coordinate system S1.

Next, the automatic calibration unit 101j detects a depth position error between the processing unit 50 and the manipulator 20 based on detection results obtained by the contact sensor 200g, the force sensor 200h, the displacement sensor 200i, and the like. Specifically, the automatic calibration unit 101j first controls the manipulator 20 so that the distal end of the hand 200 or the probe (not illustrated) arranged on the hand 200 moves to a position deviated from the designed position of the mark 71 by a predetermined amount in the Z-direction orthogonal to the XY-plane. The automatic calibration unit 101j then controls the manipulator 20 so that the distal end or the probe of the hand 200 moves to a position to be brought into contact with the mark 71. Contact with the mark 71 can be recognized from detection results obtained by the contact sensor 200g, the force sensor 200h, the displacement sensor 200i, and the like. The automatic calibration unit 101j stops the manipulator 20 at a position where the distal end or the probe of the hand 200 is brought into contact with the mark 71, and acquires a position (the depth position, the Z-direction position) in the base coordinate system S1 at the stopped position. The automatic calibration unit 101j performs the above processing on a plurality of marks 71 to acquire the Z-direction position in the base coordinate system S1, and calculates the deviation from a designed Z-direction position of each mark 71 (S506).

Next, the automatic calibration unit 101j calibrates the position and the posture of the workbench 70 in the base coordinate system S1. Specifically, the automatic calibration unit 101j obtains a third correction matrix by which the deviation in the plane direction and the deviation in the depth direction of the marks 71 become minimum, that is, the third correction matrix for calculating an operation value for obtaining an actual position and posture of a representative part closest to an order value of a position and a posture of the representative part of the workbench 70 in the base coordinate system S1. Herein, obtaining the third correction matrix is an example of calibration of the position and the posture of the workbench 70 in the base coordinate system S1. The third correction matrix is an example of the directed calibration value (second directed calibration value) (S507).

According to the present embodiment, the automatic calibration unit 101*j* can acquire the directed calibration value (the first directed calibration value, the second directed calibration value) relatively easily or more accurately based on the order value, the image photographed by the camera 21, and the detection result by the sensor, so that an error with respect to the order value can be reduced. Additionally, the automatic calibration unit 101*j* can acquire the image calibration value relatively easily or more accurately based on a plurality of order values and a plurality of images photographed by the camera 33 in accordance with the respective order values, so that an error in the position obtained from the images can be reduced. It is preferable that calibration processing is automatically performed, by the automatic calibration unit 101*j*, for example, at the time of activation of the object handling device 1, at predetermined time, or at predetermined time intervals. Such automatic calibration is beneficial to the object handling device 1 in which an elastic part or an elastic articulation such as the elastic mechanism 200*e* is arranged on the arm 2 and the hand 200. In the present embodiment, in calibrating the coordinate system using a camera image and a plurality of sensors such as the force sensor 200*h*, information in a direction with higher accuracy is utilized more preferentially. Accordingly, the coordinate system can be calibrated more precisely. In the present embodiment, described is a case in which a direction of error calculation based on the camera image and a direction of error calculation by the force sensor 200*h* are orthogonal to each other. However, these directions are usable in a case where they are not completely orthogonal to each other so long as there is an orthogonal component.

(2) Flexible Handling Based on Database

Figure 19B:
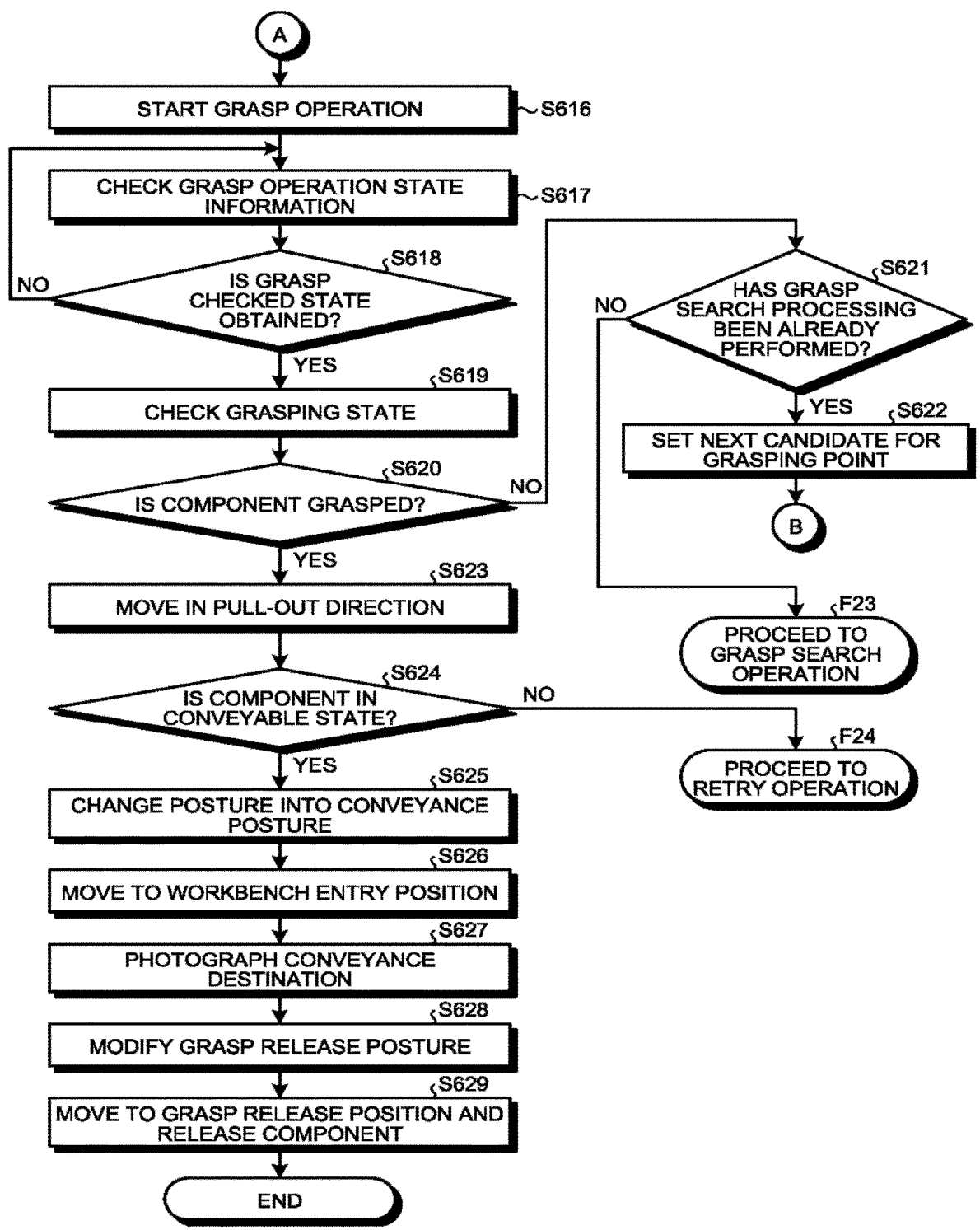
FIG. 19B is an exemplary flowchart subsequent to FIG. 19A, illustrating a procedure of handling by the hand based on the object database and the grasp database according to the embodiment.
Figure 20A:
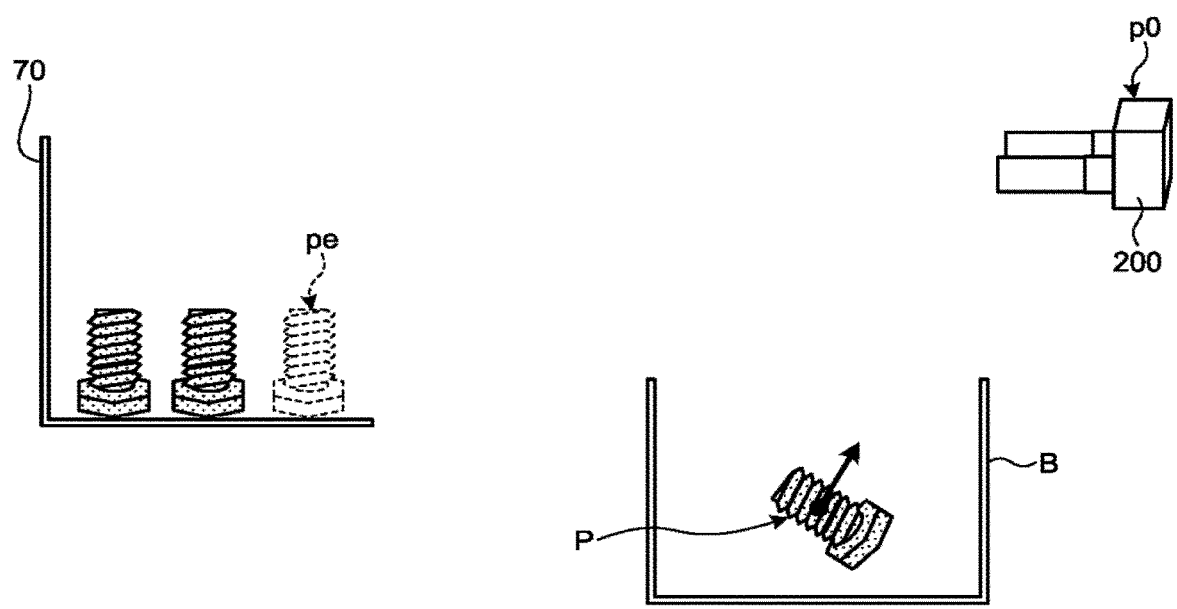
FIG. 20A is a schematic and exemplary diagram illustrating operation through points according to the embodiment, and illustrating an initial position, a target object, and a conveyance target position.
Figure 20B:
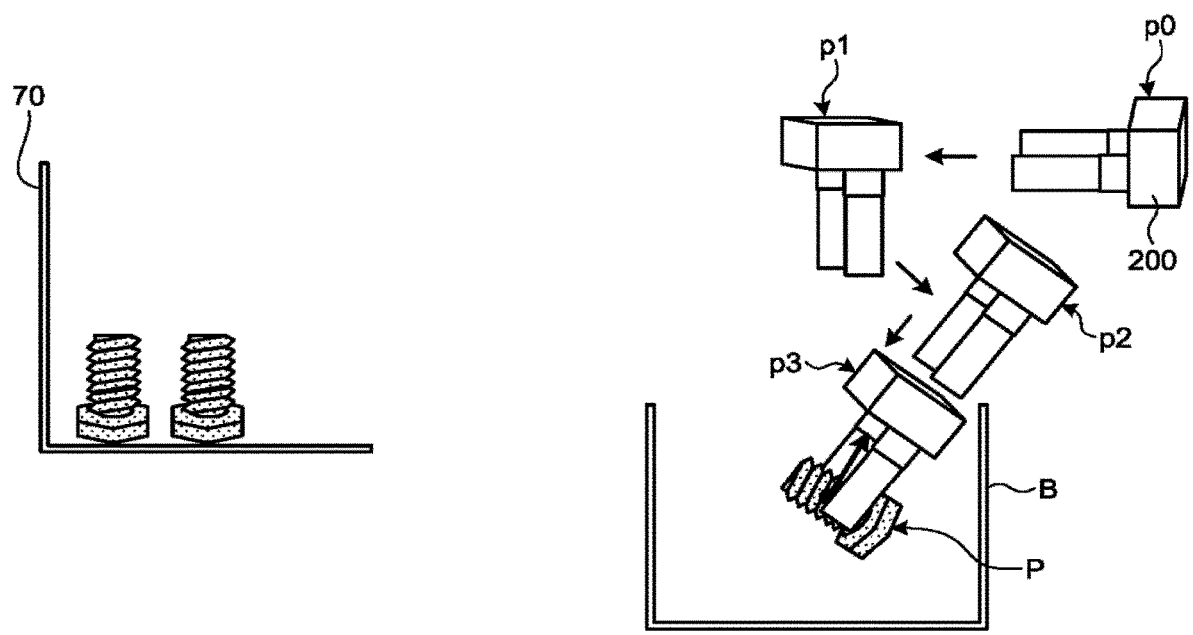
FIG. 20B is a schematic and exemplary diagram illustrating operation through points according to the embodiment, and illustrating operation through points from the initial position to a grasp target position.
Figure 20C:
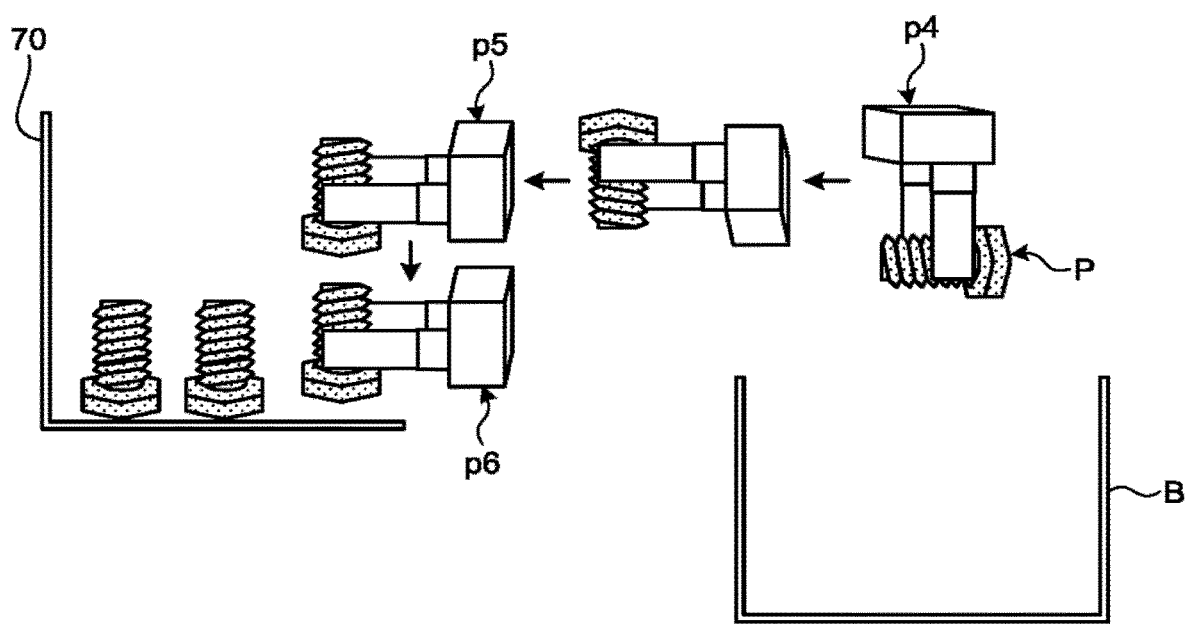
FIG. 20C is a schematic and exemplary diagram illustrating operation through points according to the embodiment, and illustrating operation through points from a pulling-up position to a grasp release position.

FIGS. 19A and 19B are flowcharts illustrating a procedure of flexible handling by the hand 200 based on the object database and the grasp database. FIGS. 20A to 20C are diagrams illustrating operation through points. FIG. 20A is a diagram illustrating an initial position p0, a target object (a component, an object), and a conveyance target position pe, FIG. 20B is a diagram illustrating operation through points from the initial position p0 to a grasp target position p3, and FIG. 20C is a diagram illustrating operation through points from a pulling-up position p4 to a grasp release position p6. Herein, exemplified is a procedure in which the arithmetic processing unit 101 (FIG. 2) controls each component to remove a component as the object P from the component cage as the case B.

The arithmetic processing unit 101 controls the camera 21 and the manipulator 20 so that the camera 21 photographs the surroundings of the component (object P). In this case, images of a plurality of components may be photographed (S601).

Next, the object recognition unit 101*h* compares the image of the component photographed by the camera 21 with the object information in the object database 102*a* to specify the photographed component. The object recognition unit 101*h* acquires the object ID number of the component from the object database 102*a* (S602).

Next, the arithmetic processing unit 101 compares the object ID number of the component as a target object directed by the host with the object ID number of the component specified at S602, and determines whether the target object is included in the recognized component (S603).

If the recognized component does not include the target object (No at S603), any photographing condition such as an illumination condition, a photographing posture of the camera 21 of the hand 200, or the like is changed, photographing is performed again by the camera 33 of the base 30 or the camera 21 of the hand 200 (S604), and the process returns to S602.

If the recognized component includes the target object (Yes at S603), the object recognition unit 101*h* matches photographed three-dimensional information with the CAD model information in the object database 102*a*, and calculates a posture of the recognized article. At this point, a posture of the component cage or a posture of a component other than the target object may be calculated, for example (S605).

Next, the grasp/operation plan generation unit 101*d* refers to the grasp information stored in the grasp database 102*b*, and calculates a grasping method for the recognized component and a candidate for a grasping point. The grasp database 102*b* includes a plurality of grasping methods, a plurality of grasping points, grasp scores thereof, and the like for the component. The grasp/operation plan generation unit 101*d* recalculates the grasp score and selects the grasping point, for example, based on position and posture information of the recognized component and position and posture information of the component cage. Specifically, among the grasping points arranged on each face of the recognized component, the score of the grasping point facing in an opening direction of the component cage is increased, for example (S606).

Next, the grasp/operation plan generation unit 101*d* calculates the operation through points illustrated in FIGS. 20A to 20C from the initial position p0 of the hand 200 to the conveyance target position pe. Examples of the operation through point include an insertion preparing position p1 for causing the hand 200 to be inserted in the component cage (case B), a position immediately before grasping p2 that is a position immediately before the hand 200 grasps the component (object P), a grasp target position p3 for performing grasp operation of the component, a pulling-up position p4 for pulling up the grasped component from the component cage, a workbench entry position p5 for inserting the hand 200 into a space of the workbench 70, and a grasp release position p6 for placing the object at a predetermined position of the workbench 70. The insertion preparing position p1 is calculated considering the position of the hand 200 at which the camera 21 of the hand 200 can easily check the component cage and a position at which the hand 200 can easily move to the grasp target position p3 based on a recognition result of the position and posture of the component cage. The position immediately before grasping p2 is, for example, a position slightly separated from the grasp target position p3 in a normal direction, which is calculated considering that the hand 200 can reach the grasp target position p3 with substantially a linear operation. The workbench entry position p5 is calculated considering the position of the hand 200 at which the camera 21 of the hand 200 can easily check the workbench 70 and a position at which the hand 200 can easily move to the grasp release position p6 based on a recognition result of the position and posture of the workbench 70. The grasp release position p6 is calculated so that the component is placed at a predetermined position when grasp of the component is released (S607).

Next, the fingertip trajectory generation unit 121 generates a fingertip trajectory in which the hand 200 passes through desired operation through points while avoiding interference using operation through point information, the shape of the object handling device 1, and information indicating a state of external environment of the component cage, the component, and the like. Specifically, the fingertip trajectory can be calculated using a method such as RRT or PRM (S608).

If an effective trajectory cannot be calculated (No at S609), the arithmetic processing unit 101 checks whether the next candidate for the grasping point is present. If the next candidate for the grasping point is not present (No at S610), the process proceeds to a state change operation F22 (FIG. 22A and FIG. 22B, described later in detail). If the next candidate for the grasping point is present (Yes at S610), the arithmetic processing unit 101 sets the next candidate for the grasping point, and performs processing at S607.

If the effective trajectory is calculated at S608 (Yes at S609), the manipulator control unit 110 moves the hand 200 from the initial position to the insertion preparing position p1. The hand 200 may be moved along a trajectory determined in advance, or moved while modifying the trajectory using a visual feedback servo (described later) based on a position posture of the component cage obtained by a hand camera, the camera 21 of the hand 200, and the like (S612).

Next, the manipulator control unit 110 moves the hand 200 from the insertion preparing position p1 to the position immediately before grasping p2. At this point, the hand 200 may be moved while modifying the trajectory using the visual feedback servo (described later) based on feature point information of the component obtained by the camera 21 of the hand 200, the camera 33 of the base 30, and the like (S613).

Next, when an error in the position and the posture with respect to the grasp target position p3 is calculated based on observation information about the component and the hand 200 obtained by the camera 21 of the hand 200, the camera 33 of the base 30, and the like, the arithmetic processing unit 101 modifies the grasp target position p3 and the posture at this position (S614).

Next, the manipulator control unit 110 moves the hand 200 from the position immediately before grasping p2 to the grasp target position p3 (S615).

Next, the hand control unit 140 starts grasp operation. Specifically, when grasp is performed using a sucking method, an electromagnetic valve and the like are scanned to generate sucking force. In a case of pinching with two-finger or multi-finger hand, an operation of closing fingers is started (S616).

Next, the signal processing unit 101b performs processing of various pieces of sensor information in a grasp operation state, and the plan generation unit 101c monitors grasp operation state information. Specifically, the grasp operation state information includes a vacuum pressure and a flow rate at the time of sucking, a sensor value of the contact sensor, a displacement sensor value of an elastic articulation part, torque of a grasp mechanism driving unit, grasp operation processing time, and the like. To check the grasp operation state, the grasp determination information stored in the grasp database 102b is used. To continue the grasp operation beyond the grasp target position p3, the pressing amount information in the grasp database 102b is used (S617).

Next, the state monitoring unit 101e determines whether a grasp checked state is obtained based on the grasp operation state information. Specifically, the grasp checked state is a state in which the vacuum pressure becomes a predetermined value at the time of sucking, a state in which contact is checked by the contact sensor, and a state in which a value of the displacement sensor or a torque value becomes a desired value. As a threshold for determination herein, the grasp determination information registered in the grasp database 102b is used (S618).

If the grasp checked state is detected (Yes at S618), the state monitoring unit 101e determines a result of the grasping state. Specifically, determination can be made with a vacuum pressure at the time of sucking, with a gap between two fingers in a case of the two-finger hand, for example (S619).

In determining the result of the grasping state, if it is determined that the component is not grasped (No at S620), the process proceeds to S621. At S621, it is checked whether search processing in the vicinity of the grasping point has been already performed on the current grasping point. If search processing has been already performed (Yes at S621), the next candidate for the grasping point is set (S622). If search processing has not been performed (No at S621), a grasp search operation F23 (FIG. 23, described later in detail) is performed.

In a case of Yes at S620, the manipulator control unit 110 moves the hand 200 in a pull-out direction (S623).

Figure 24:
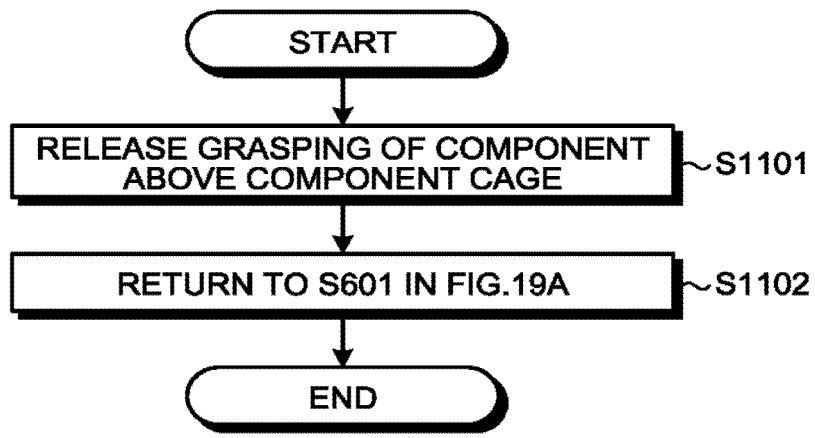
FIG. 24 is an exemplary flowchart illustrating a procedure of a retry operation illustrated in FIG. 19B.

Next, the arithmetic processing unit 101 checks the grasping state again. If the grasping state is unstable or the component is not grasped, that is, the component is not in a conveyable state (No at S624), the process proceeds to a retry operation F24 (FIG. 24, described later in detail). The threshold for checking the grasping state is different depending on the target object, the grasping method, and the like, so that the grasp determination information in the grasp database 102b is used.

In the determination at S624, if the component is in a conveyable state (Yes at S624), the manipulator control unit 110 converts the posture of the hand 200 into a conveyance posture. In this case, the posture and the grasping state suitable for conveyance are different depending on components, so that the posture and the grasping state are determined with reference to the conveying posture information in the grasp database 102b. Specifically, in a case of sucking, the posture designated in the grasp database 102b is a posture by which a moment is hardly applied to the component and the suction pad 200a such that the suction pad 200a faces downward. In a case of pinching, the posture is such that part of the multi-finger supports a lower part of the component. In any case, to suppress vibration during conveyance, the elastic mechanism 200e can be fixed to be in a non-elastic state by controlling the clutch 200f (S625).

Next, the manipulator control unit 110 moves to the workbench entry position p5 while keeping the conveyance posture. There is a risk of dropping the grasped component in movement in a grasping state, so that the allowable speed information in the grasp database 102b is used to suppress a conveyance speed to be equal to or smaller than the allowable speed. Thus, stable conveyance can be implemented while reducing conveyance time as much as possible. The conveyance speed herein can be changed depending on the grasping state. The conveyance speed can be changed by setting a plurality of levels in the grasp determination information in the grasp database 102b, and setting a plurality of conveyance allowable speeds corresponding to the respective levels. For example, in a case of a sucking method, a suction pressure can be used as the grasp determination information. By way of example, for a certain component, the component is sufficiently sucked and grasped when the suction pressure is equal to or smaller than −40 kPa, so that the conveyance allowable speed is set to be 500 mm/sec. When the suction pressure is in a range from −40 kPa to −30 kPa, the conveyance speed is set to be 200 mm/sec. When the suction pressure is in a range from −30 kPa to −15 kPa, the conveyance allowable speed is set to be 200 mm/sec (S626). An allowable value in the conveyance state is not necessarily set in accordance with only the speed. The allowable value may be set in accordance with acceleration or a rate of change in acceleration (jerk). When the suction pressure is larger than −15 kPa, a sufficient sucking and grasping state is not obtained, so that it is determined that the component is not conveyable at S624 (No at S624), and the process proceeds to a retry operation and the like.

The arithmetic processing unit 101 controls the camera 21 of the hand 200 to photograph the surroundings of a conveyance destination position of the workbench 70 (S627). Subsequently, the arithmetic processing unit 101 modifies the grasp release position p6 of the component based on a direction from the host and the photographic result (S628). Next, the manipulator control unit 110 moves the hand 200 to the grasp release position p6, and the hand control unit 140 releases grasp of the component to place the component at the conveyance target position pe directed by the host (S629). Accordingly, a series of processing is ended.

(3) Real-Time Visual Feedback Control

Figure 21A:
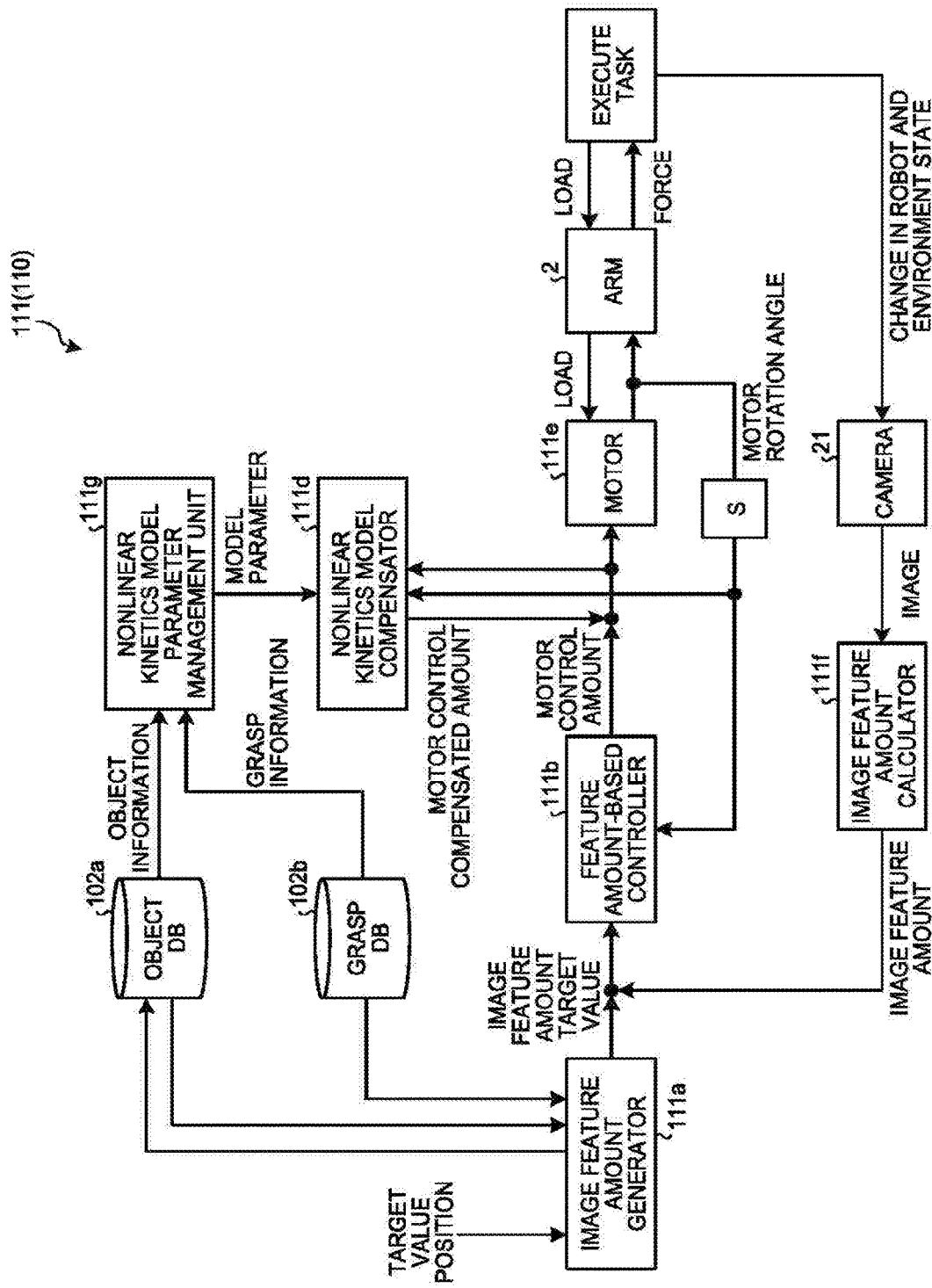
FIG. 21A is a schematic and exemplary block diagram of a manipulator control unit according to the embodiment.
Figure 21B:
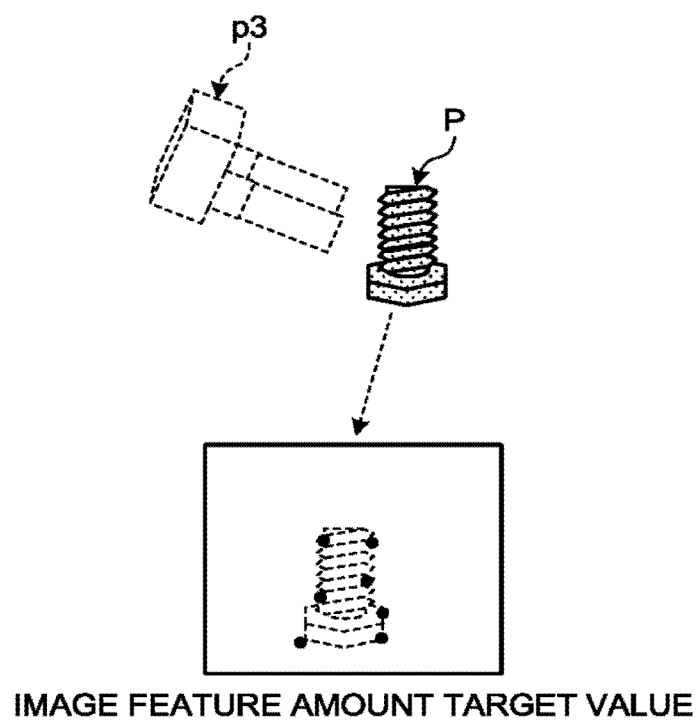
FIG. 21B is a schematic and exemplary explanatory diagram of an image feature amount target value according to the embodiment.

FIG. 21A is a block diagram of a manipulator control unit 111 (110). FIG. 21B is an explanatory diagram of an image feature amount target value. The manipulator control unit 111 includes both or any of a feedback system for correcting a control amount of a motor 111e using a nonlinear kinetics model and a feature amount-based controller using an image feature amount.

In the manipulator control unit 111, when positional information as a movement target of the hand 200 such as a grasping position of the component (object P) is given from the plan generation unit 101c, an image feature amount generator 111a generates an image feature amount target value for achieving movement to the grasp target position p3 by using the object information in the object database 102a and the like. Specifically, as illustrated in FIG. 21B, the image feature amount target value is placement information of feature points and the like of a component image that is obtained by a camera sensor of the camera 21 and the like of the hand 200 when the hand 200 reaches the grasp target position p3. Although FIG. 21B illustrates a feature amount image for clarification, the information may actually be information represented by a numerical value such as coordinates of the feature point and a distance between the feature points. The information can be generated by extracting information about a required face from an image of each face of the component and the feature amount information stored in the object database 102a, or performing viewpoint conversion on information generated or extracted from the CAD model information.

The feature amount-based controller 111b uses, as an input, an error between the image feature amount target value and the image feature amount obtained by the camera sensor of the camera 21 and the like of the hand 200 to calculate a control amount of the motor ille. The feature amount-based controller 111b can be configured by using an image Jacobian and using a typical PI control system.

The calculated value of the control amount of the motor 111e is compensated by a nonlinear kinetics model compensator 111d of the object handling device 1. Details about a method of compensating the control amount using the nonlinear kinetics model will be described later. The nonlinear kinetics model includes not only information about the object handling device 1 but also information about a model of the grasped component such as weight or about the grasping state such as a grasping position of the component.

The motor 111e is driven in accordance with the compensated control amount, moves the arm 2, and executes a task such as moving the hand 200 to a predetermined position. An image feature amount calculator 111f calculates an image feature amount with respect to a target using an output image from the camera sensor of the camera 21 and the like of the hand 200.

In the manipulator control unit 111 in FIG. 21A, the manipulator 20 operates so that an image observed by the camera 21 of the hand 200 is matched with the grasp target position p3. Accordingly, if there are some errors in a mechanism parameter and a camera parameter of the manipulator 20, the errors are finally suppressed, and the hand 200 can be moved to an accurate position. Even when the component is moving, the hand 200 can be caused to follow the movement of the component. The manipulator control unit 111 further includes the nonlinear kinetics model compensator 111d. Accordingly, bending and vibration of the arm 2 can be compensated, and the hand 200 can follow the component more accurately. In a control system using a camera image, image information is largely shaken when the arm 2 vibrates, so that stable control is hardly implemented. However, in the present system, stable control can be implemented due to vibration suppression by the nonlinear kinetics model compensator 111d.

Additionally, in the manipulator control unit 111 in FIG. 21A, a nonlinear kinetics model used by the nonlinear kinetics model compensator 111d can be switched by a nonlinear kinetics model parameter management unit 111g depending on the grasping state of the component (object P). Typically, in a model-based control system using the nonlinear kinetics model, when the hand 200 grasps or releases the object and a load on the arm 2 is varied, a difference between the model and a real object becomes large, and the control system becomes unstable. However, in the manipulator control unit 111, by switching the nonlinear kinetics model based on the recognized object information and the information about the grasping state, stable control can be implemented in any step of grasp and conveyance work. In this case, the feature point of the component is used as the information indicating the grasp target position p3. Alternatively, feature points of the workbench 70, the mark 51 of the processing unit 50, and the component cage (case B) can be used as the information indicating the grasp target position p3.

Figure 21C:
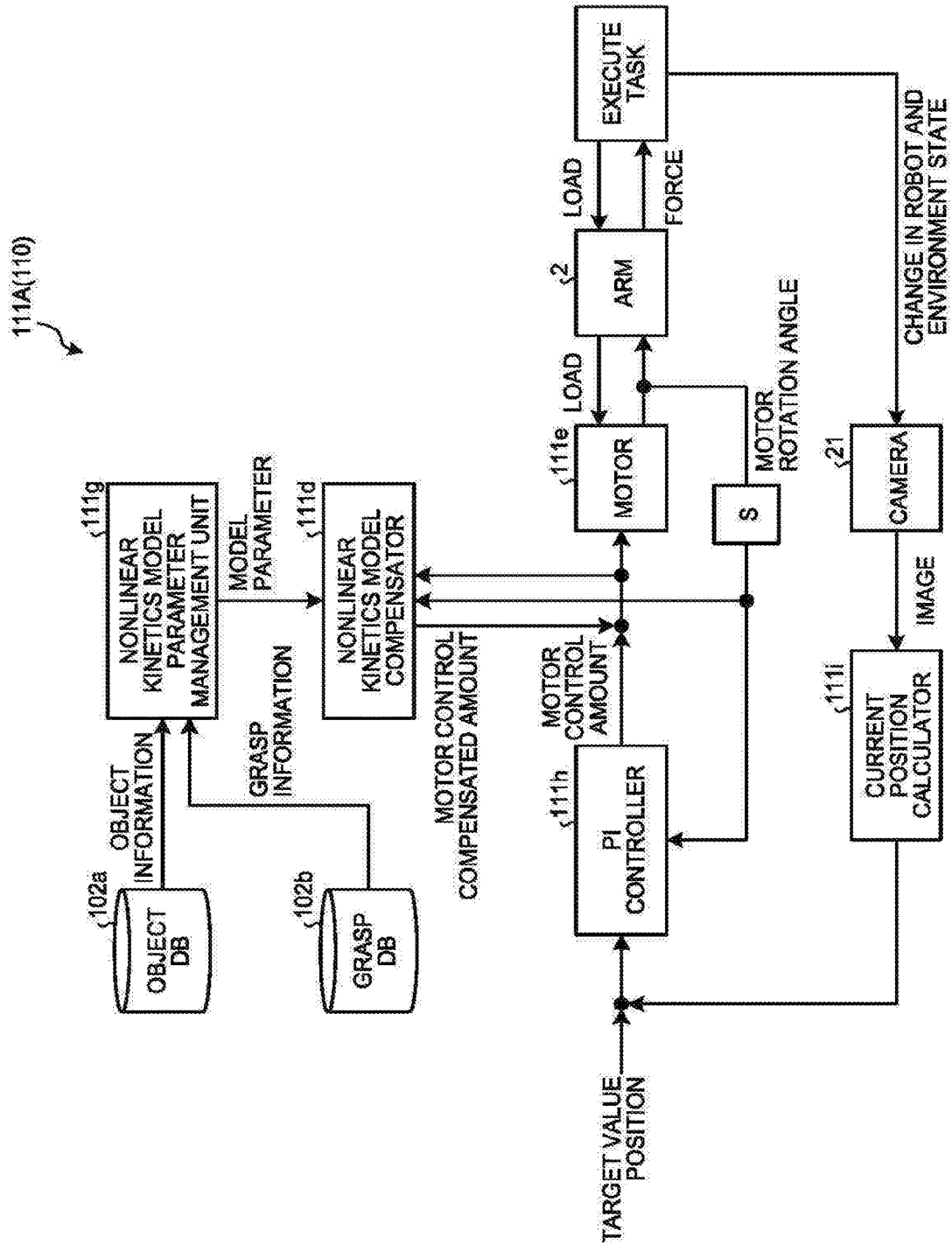
FIG. 21C is a schematic and exemplary block diagram of another example of the manipulator control unit according to the embodiment.

FIG. 21C is a block diagram illustrating another example of a manipulator control unit 111A (110). When a target image or a feature point is not obtained, a PI controller 111h of a normal PI control system as illustrated in FIG. 21C is used in place of the feature amount-based controller 111b in FIG. 21A. A current position calculator 111i calculates a current position of the object P from an output image of the camera 21 of the hand 200. Even with a control system such as the manipulator control unit 111A, a relatively stable operation can be performed with sufficient calibration, and more accurate control can be implemented with the nonlinear kinetics model compensator 111d.

Figure 21D:
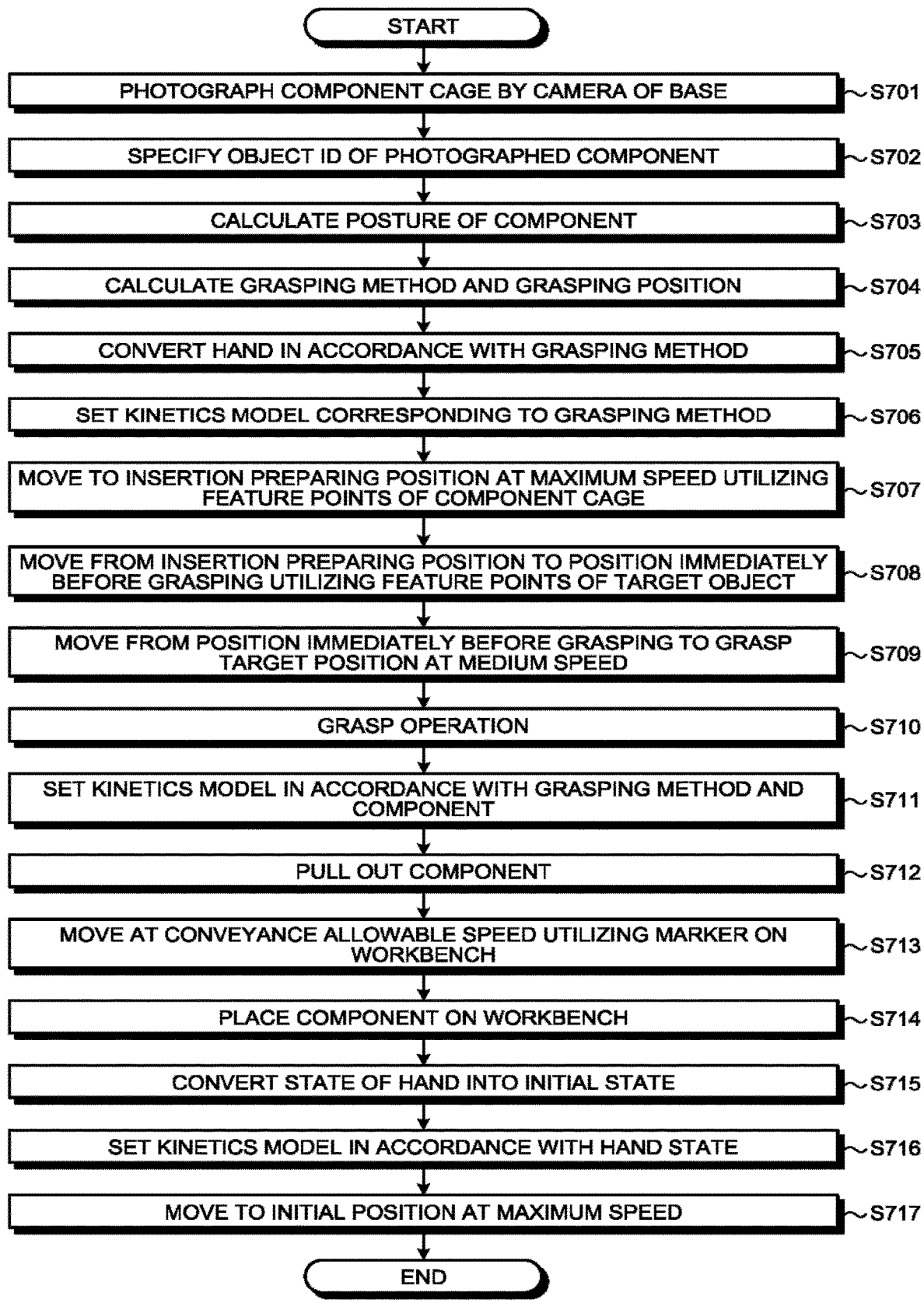
FIG. 21D is a flowchart illustrating a procedure of changing a parameter performed by the manipulator control unit according to the embodiment.

FIG. 21D is a flowchart illustrating a procedure of changing a parameter performed by the manipulator control unit 111. Herein, illustrated is a procedure of grasping and conveying the component as the object P from the component cage to the workbench 70.

The arithmetic processing unit 101 controls the camera 33 of the base 30 to photograph the surroundings of the component (S701).

Next, by using the image photographed by the camera 33 of the base 30 and the object information in the object database 102a, the object recognition unit 101h specifies the object ID information of the photographed component (S702).

Next, the object recognition unit 101h matches the photographed three-dimensional information with the CAD model information in the object database 102a, and calculates the posture of the recognized component. At this point, a posture of the component cage and a posture of an object other than the component are calculated (S703).

Next, the grasp/operation plan generation unit 101d refers to the grasp database 102b, and calculates the grasping method and the grasping position for the recognized component (S704).

Next, the manipulator control unit 111 (110) performs operation of converting the state of the hand 200 in accordance with the calculated grasping method. Specifically, the operation is such that the suction pad 200a is projected when a sucking method is calculated, and the suction pad 200a is stored when a pinching method by the finger 200b is calculated (S705).

Next, the nonlinear kinetics model parameter management unit 111g sets a model parameter of a kinetics model used by the nonlinear kinetics model compensator 111d in accordance with the state of the hand 200 set at S705. As the model parameter to be set, used is a parameter determined through pre-learning. If pre-learning is not performed, a random signal and the like may be applied to the control system at this timing to perform parameter learning (S706).

Next, the manipulator control unit 111 controls the manipulator 20 so that the hand 200 is moved to the insertion preparing position p1 using the set model parameter. In this case, an optimum model is set, so that a stable operation can be performed even when the manipulator 20 is moved at the maximum speed. Additionally, by performing control based on the feature amount utilizing the feature point of the component cage, the component cage can be moved to the insertion preparing position p1 more accurately (S707).

Next, the manipulator control unit 111 controls the manipulator 20 so that the hand 200 is moved from the insertion preparing position p1 to the position immediately before grasping p2. By performing control based on the feature amount utilizing the feature point information of the component, the hand 200 can be moved to the position immediately before grasping p2 more accurately (S708).

Next, the manipulator control unit 111 controls the manipulator 20 so that the hand 200 is moved from the position immediately before grasping p2 to the grasp target position p3 at a medium speed. At this point, even when the hand 200 is brought into contact with a target object P or a peripheral object P due to influence of deviation in recognition of the component, the elastic part absorbs impact and the object P is not damaged because the hand 200 includes the elastic part. While the elastic part absorbs impact or pressing force, as the displacement sensor 200i or the contact sensor 200g determines contact and stops the operation of the manipulator 20 or moves the manipulator 20 in a direction of releasing force, the object P and the hand 200 can be prevented from being broken (S709).

Next, the hand control unit 140 controls the hand 200 to grasp the component. In this case, a contact state can be accurately detected, so that the component can be stably grasped (S710).

Next, the nonlinear kinetics model parameter management unit 111g sets the kinetics model in accordance with the grasping method, the grasping position, and a characteristic of the component. The grasping method, the grasping position, and the characteristic of the object to be grasped can be calculated from the object database 102a and the grasp database 102b, and the grasping position may be corrected to be accurate based on information of the sensor that has actually performed grasp operation. The nonlinear kinetics model parameter management unit 111g includes model parameters that are learned in advance under a condition based on weight of a plurality of tip loads, an offset center of gravity, and the like. The nonlinear kinetics model parameter management unit 111g selects an optimum model parameter based on the designated grasping method, grasping position, and the characteristic of the object to be grasped, or determines an optimum parameter through interpolation using a plurality of model parameters having relatively close conditions (S711).

Next, the manipulator control unit 111 controls the manipulator 20 to pull out the grasped component from the component cage (S712).

Next, the manipulator control unit 111 refers to the grasp database 102b, and controls the manipulator 20 to convey the component at a conveyance allowable speed based on conveyance allowable value information. At this point, a more accurate feature point amount can be obtained by utilizing, as the feature point, the mark 71 arranged on the workbench 70 as a conveyance destination, so that stable control based on the feature amount can be implemented (S713).

Next, the manipulator control unit 111 places the component at the conveyance target position pe of the workbench 70 (S714).

Next, the hand control unit 140 converts the state of the hand 200 to be an initial state (S715).

Next, the nonlinear kinetics model parameter management unit 111g sets the model parameter in accordance with the state of the hand 200 (S716).

Next, the manipulator control unit 111 controls the manipulator 20 so that the hand 200 is moved to the initial position p0 at the maximum speed (S717).

(4) Error Recovery

Figure 22A:
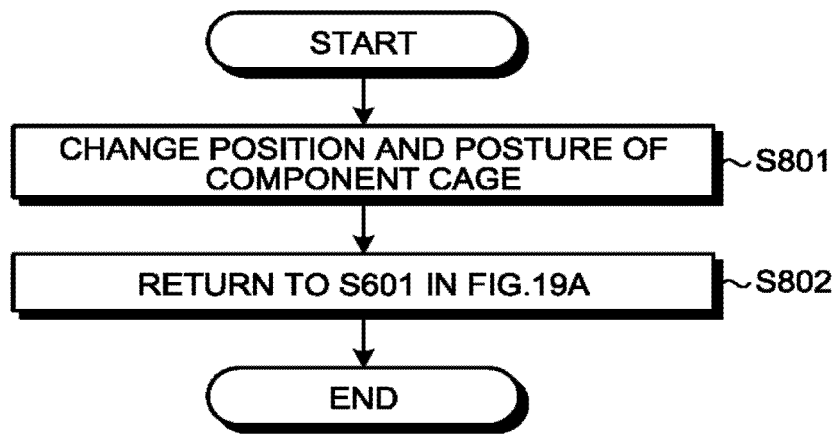
FIG. 22A is a flowchart illustrating a procedure of a state change operation illustrated in FIG. 19A.

FIG. 22A is a flowchart illustrating a procedure of the state change operation F22 in FIG. 19A. Regarding the state change operation F22 in FIG. 19A, the arithmetic processing unit 101 first controls the manipulator 20 and the conveying mechanism 40 so that the position and the posture of the component cage (case B) are varied (S801). Subsequently, the process returns to S601 in FIG. 19A (S802). Through such recovery of the state change, a positional relation between the object handling device 1 and the component (object P) to be grasped is varied, so that a probability that a route to grasp the component can be set, that is, a probability that the component can be grasped tends to be increased.

Figure 22B:
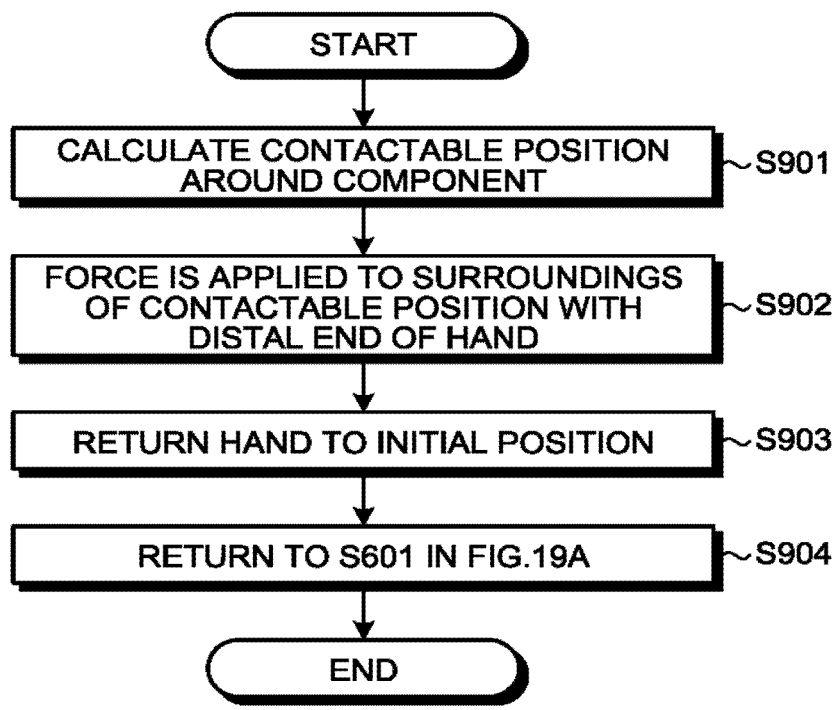
FIG. 22B is an exemplary flowchart illustrating a procedure different from that of FIG. 22A of the state change operation illustrated in FIG. 19A.

FIG. 22B is a flowchart illustrating a procedure different from that in FIG. 22A of the state change operation F22 in FIG. 19A. Regarding the state change operation F22 in FIG. 19A, in this example, the arithmetic processing unit 101 first calculates a contactable position with which the hand 200 can be brought into contact among positions around the component, for example, positions distant from the center on an image of the component or the component cage or an assumed center of gravity calculated from the image. The contactable position can be obtained by calculating an outer shape position of the component (object P) from information of the distance image camera such as a three-dimensional point group, and calculating a route thereto (S901). Next, the manipulator control unit 110 controls the manipulator 20 so that the distal end of the hand 200 applies a predetermined force to the contactable position. In this case, the hand 200 includes the elastic mechanism 200e and a force sensor 200h, and the manipulator control unit 110 can control magnitude of the force to be applied, acceleration, and the like, so that the predetermined force can be applied without damaging the component (S902). Next, the manipulator control unit 110 returns the hand 200 to the initial position p0 (S903). The process then returns to S601 in FIG. 19A (S904). In this procedure, a placement state of the article is varied when the force is applied to the component or the surroundings thereof at S902. Also through such recovery of the state change, the positional relation between the object handling device 1 and the article to be grasped is varied, so that the route to the article grasping position may be generated with high possibility.

Figure 23:
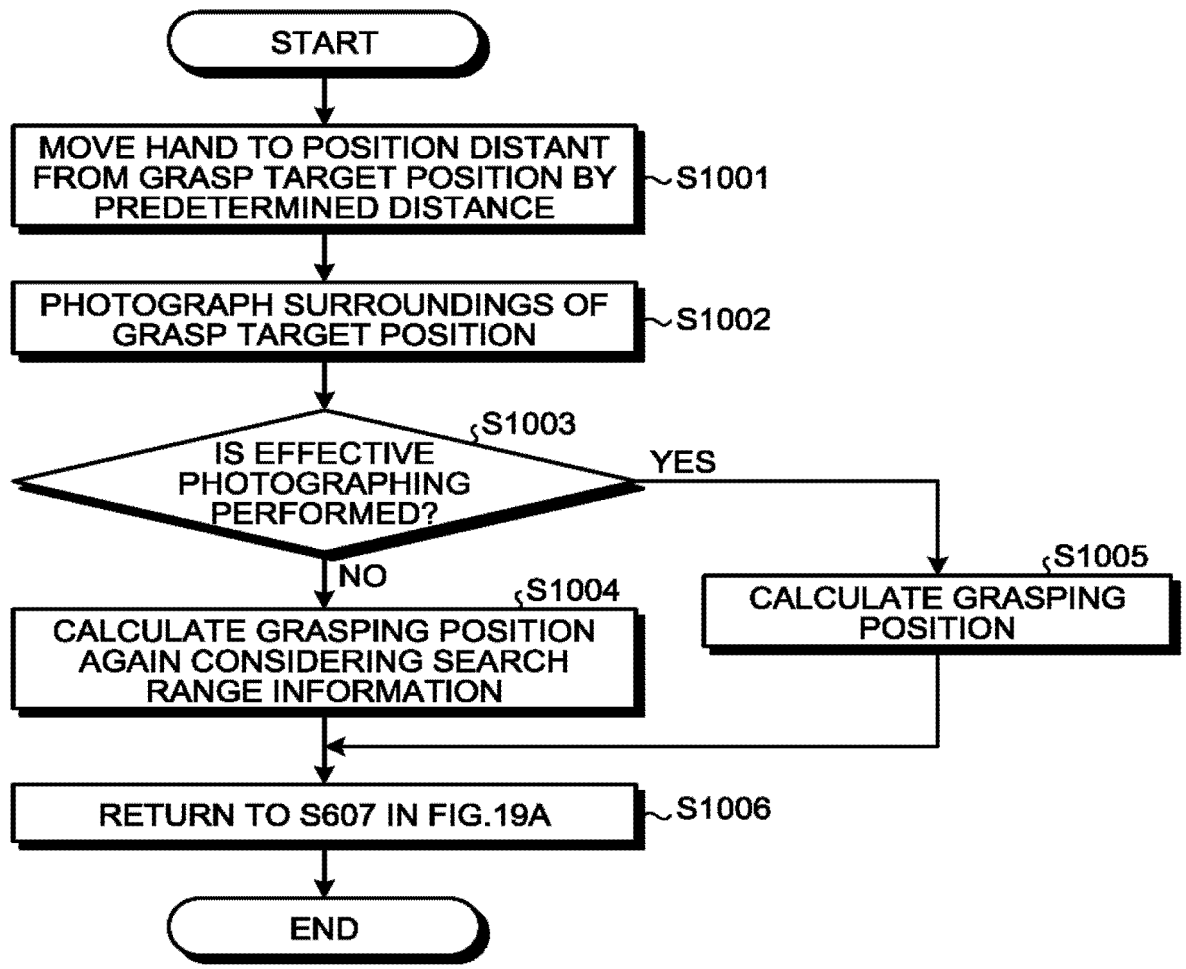
FIG. 23 is an exemplary flowchart illustrating a procedure of a grasp search operation illustrated in FIG. 19B.

FIG. 23 is a flowchart illustrating a procedure of a grasp search operation F23 in FIG. 19B. After S621 in FIG. 19B, the manipulator control unit 110 controls the manipulator 20 so that the hand 200 is temporarily moved to a position distant from the grasp target position p3 by a predetermined distance (S1001). The arithmetic processing unit 101 photographs the surroundings of the grasp target position p3 (S1002). If it is determined that effective photographing is performed while satisfying a predetermined condition such that an image of the component (object P) to be grasped is included based on the photographic result (Yes at S1003), the arithmetic processing unit 101 calculates the grasp target position p3 (S1005). On the other hand, if it is not determined that effective photographing is performed while satisfying the predetermined condition at S1003 (No at S1003), the arithmetic processing unit 101 uses the search range information included in the grasp database 102b to set, as a new grasp target position p3, a position deviated from the already calculated grasp target position p3 by a predetermined distance within a range designated by the search range information (S1004). After S1004 or S1005, the process returns to S607 in FIG. 19A. At S607, the operation through point is calculated for the new grasp target position p3 set at S1004 or S1005 (S1006). In the search range information, an efficient search range is designated corresponding to the component (object P). Specifically, for example, as the component (object P) is smaller, the search range is set to be narrower, and an offset distance (step distance) from the grasp target position p3 in the search range is also set to be smaller. In other words, as the component is larger, the search range is set to be wider, and the offset distance (step distance) from the grasp target position p3 in the search range is also set to be larger. Such grasp and search recovery tends to increase a probability that the route to grasp a processing component can be set, that is, a probability that the component can be grasped.

FIG. 24 is a flowchart illustrating a procedure of the retry operation F24 in FIG. 19B. If it is determined that the component is not in a conveyable state at S624 in FIG. 19B, the manipulator control unit 110 controls the manipulator 20 to move the hand 200 to the component cage (case B) by a predetermined distance, and to cause the hand 200 to release grasp of the component (object P) above the component cage. Accordingly, the component can be returned to the component cage (S1101). The process returns to S601 in FIG. 19A (S1102).

(5) Parameter Learning Control During Work

Figure 25A:
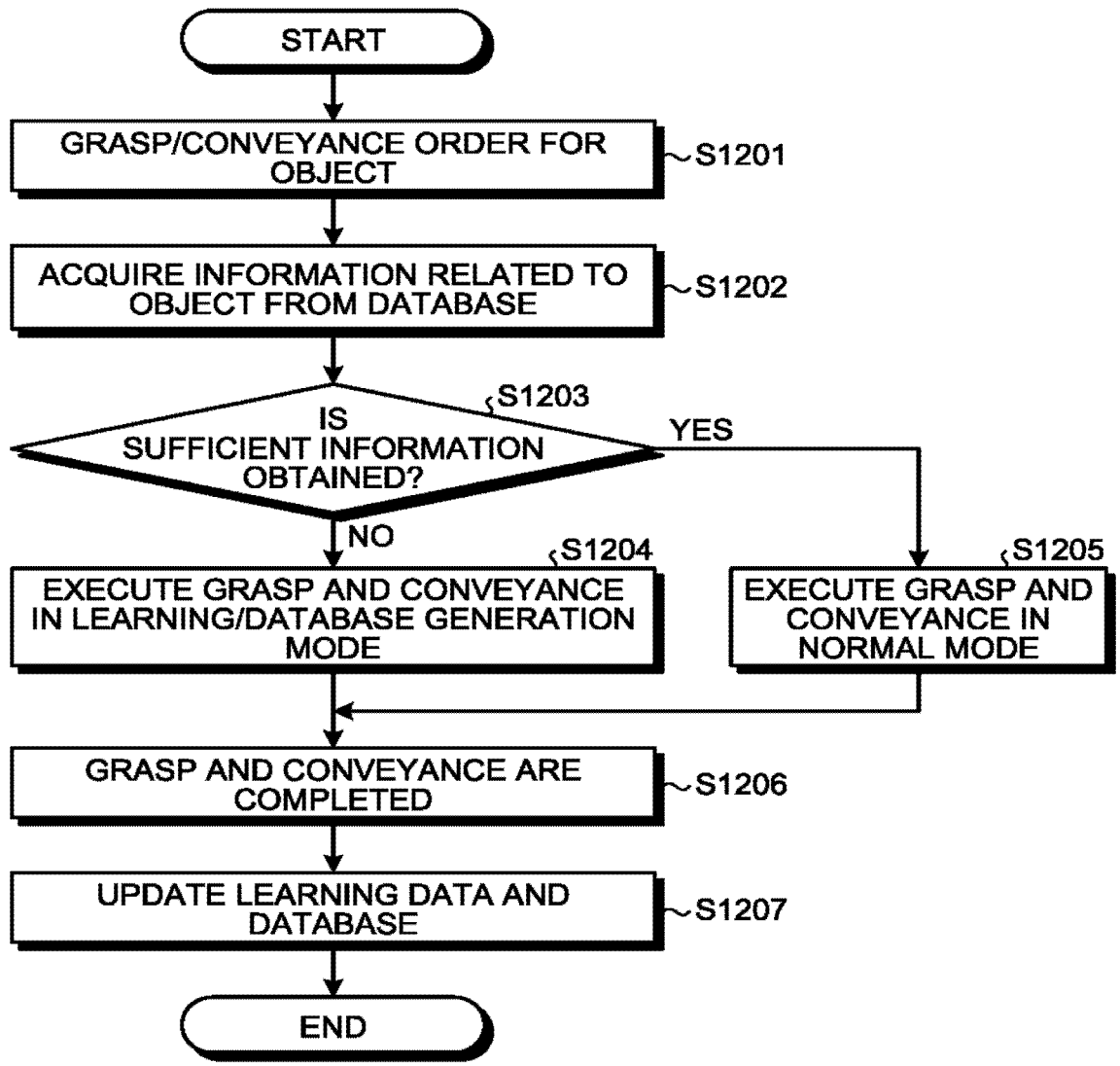
FIG. 25A is an exemplary flowchart illustrating a procedure of executing a learning operation and generation of a database according to the embodiment.

FIG. 25A is a flowchart illustrating a procedure of executing a learning operation and generation of a database. The object handling device 1 includes databases such as the object database 102a and the grasp database 102b, and the object recognition unit 101h using learning results to utilize learning data prepared in advance. However, in various cases of handling various objects, the object handling device 1 may handle an object having insufficient learning data or no learning data. In such a case, the procedure illustrated in FIG. 25A is effective.

First, the arithmetic processing unit 101 receives a grasp/conveyance order for a specific object from the host system (S1201). Subsequently, the learning control unit 101g (FIG. 2) acquires the object information related to the object from the object database 102a based on the object ID number of the object, and acquires the grasp information related to the object from the grasp database 102b (S1202).

Next, the learning control unit 101g determines whether the object information or the grasp information related to the object is sufficient (S1203). If it is determined that the information is sufficient (Yes at S1203), the manipulator control unit 110 executes grasp and conveyance of the object in a normal mode as illustrated in FIGS. 19A and 19B (S1205). On the other hand, if it is determined that the information is insufficient at S1203 (No at S1203), the arithmetic processing unit 101 controls each unit to execute grasp and conveyance in a learning/database generation mode. Grasp and conveyance in the learning/database generation mode will be described later in detail (S1204).

When the processing of grasp and conveyance is completed (S1206), the learning control unit 101g updates the learning data, the object database 102a, and the grasp database 102b for both of a case in which grasp and conveyance are executed in the learning/database generation mode and a case in which grasp and conveyance are executed in the normal mode. The update processing herein is, for example, processing of updating score information associated with the selected grasping position or grasping method assuming a result such as success or failure in grasping and success or failure in generation of the through point as reward information even when grasp and conveyance are executed in the normal mode (S1207).

Figure 25B:
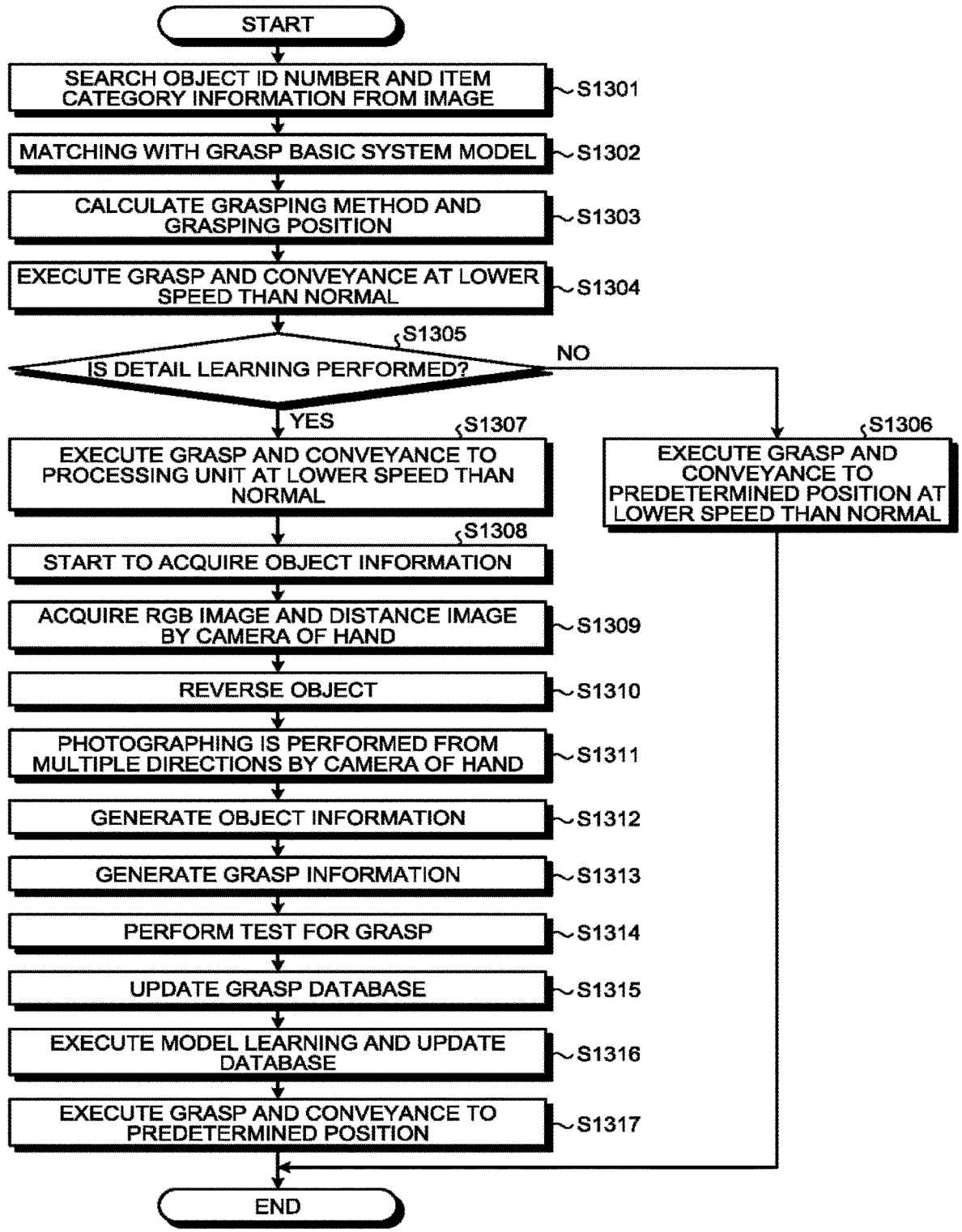
FIG. 25B is an exemplary flowchart illustrating a procedure of grasp and conveyance in a learning/database generation mode according to the embodiment.

FIG. 25B is a flowchart illustrating a procedure of grasp and conveyance in the learning/database generation mode. First, the image processing unit 101a acquires the object ID number and the item category information from the image of the component cage photographed by the camera 33 of the base 30, and the object recognition unit 101h examines whether the object database 102a includes an object matching with the object ID number and the item category information (S1301). If the object database 102a includes a matching object, the object is caused to be a processing target of grasp and conveyance. Next, the arithmetic processing unit 101 matches three-dimensional image information around the object stored in the object database 102a with the grasp basic system model, and selects the most matching grasp basic system model (S1302). The grasp/operation plan generation unit 101d then refers to the grasping method basic data from the grasp basic system model, and calculates the grasping method and the grasping position in the base coordinate system S1 (S1303). Next, the manipulator control unit 110 controls the manipulator 20 to execute grasp and conveyance at a lower speed than that in a normal grasp mode (S1304).

The learning control unit 101g is assumed to perform detail learning when processing in the learning/database generation mode is directed by the host device or when there is sufficient time until completion time of the processing designated by the host device, and the process proceeds to S1307 (Yes at S1305).

In a case of No at S1305, grasp and conveyance to a predetermined position are executed while keeping a low speed (S1306).

Processes after S1307 are in a detail learning mode. At S1307, the manipulator control unit 110 conveys the object P to the processing unit 50 at a lower speed than normal, and places the object P on the processing unit 50 (S1307). The arithmetic processing unit 101 then acquires object information about the object P placed on the processing unit 50 through a procedure similar to that illustrated in FIG. 14 (S1308). The arithmetic processing unit 101 acquires an RGB image and a distance image of the object P with the camera 21 arranged on the hand 200 (S1309). Subsequently, the manipulator control unit 110 controls the manipulator 20 so that the posture of the object is reversed (S1310). The arithmetic processing unit 101 then controls each unit so that the camera 21 arranged on the hand 200 photographs the object P from multiple directions to obtain the RGB image and the distance image (S1311). Next, the database information generating and updating unit 101i generates object information such as the three-dimensional image information, the detailed CAD model information, and the simple CAD model information from the photographed image information (S1312). The database information generating and updating unit 101i generates grasp information from the simple CAD model information or the photographed multi-directional image (S1313).

Next, the arithmetic processing unit 101 performs a test for grasp. Specifically, for example, the arithmetic processing unit 101 executes a plurality of grasping methods as a test to check success or failure in grasp, and deletes data of a failed grasping method. The arithmetic processing unit 101 generates grasp determination information using vacuum pressure at the time of sucking when grasp succeeded (S1314).

Next, the database information generating and updating unit 101i writes the grasp information generated at S1314 into the grasp database 102b to update the grasp database 102b (S1315).

Subsequently, the manipulator control unit 110 controls the hand 200 to grasp the object P based on the grasp information in the updated grasp database 102b, and the learning control unit 101g performs processing of supplying a test signal for nonlinear kinetics model learning to the manipulator control unit 110 in a state in which the hand 200 grasps the object P. Based on the execution result, the object database 102a and the grasp database 102b are updated (S1316). The manipulator control unit 110 controls the manipulator 20 to grasp and convey the object P to a predetermined position (S1317).

Figure 26:
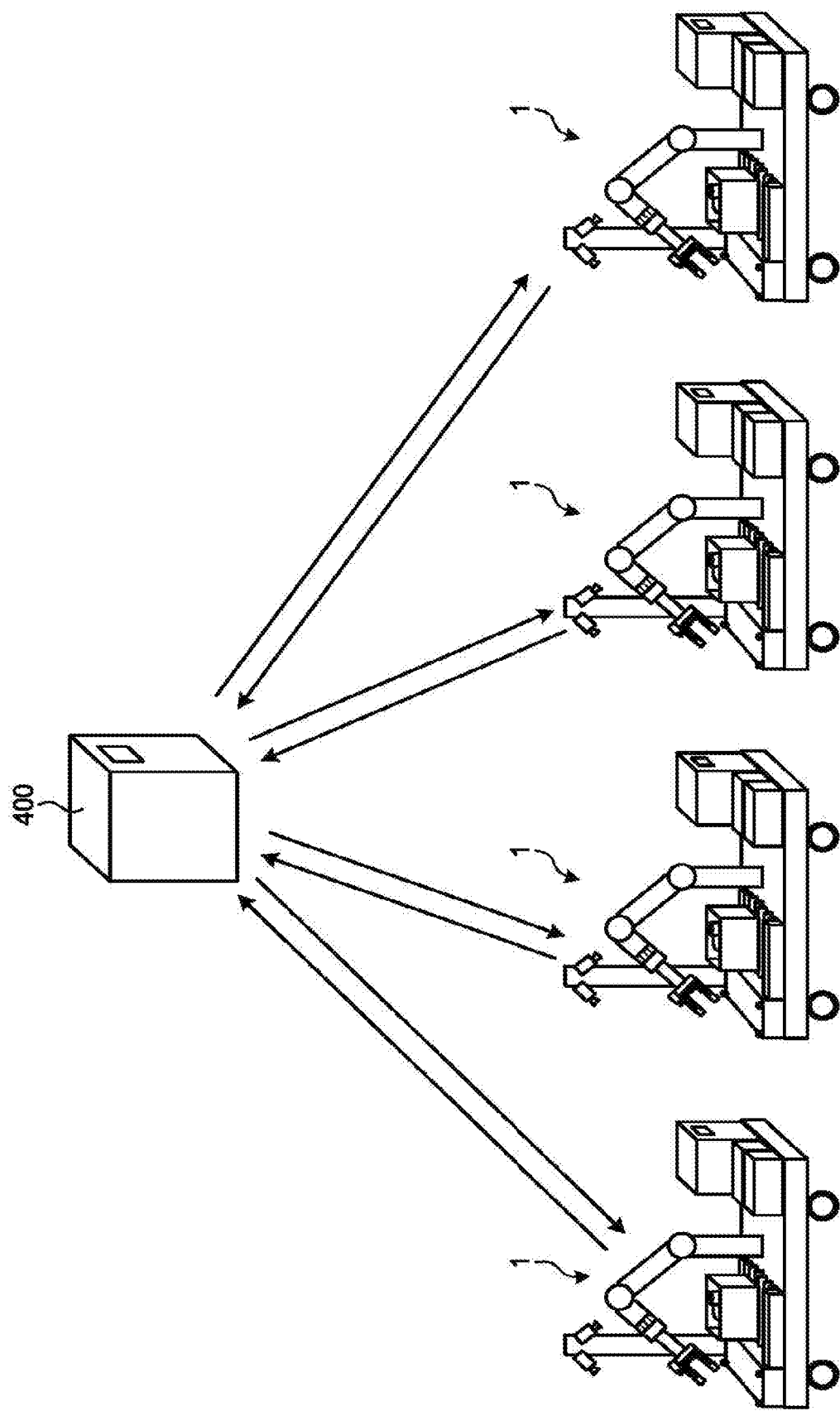
FIG. 26 is an exemplary schematic configuration diagram of a learning system in which a plurality of object handling devices according to the embodiment share learning data.

FIG. 26 is a schematic configuration diagram of a learning system 400 in which a plurality of object handling devices 1 share learning data. In the learning operation described above, learned is not only data for object recognition but also data for grasp and data for conveyance, so that many combination conditions are present, and more pieces of learning data are required. From this view point, as illustrated in FIG. 26, when a plurality of object handling devices 1 share the learning data, learning can be performed at a higher speed. In the learning system 400, learning data for operation of the manipulator 20 (robot) is also generated, so that grasp and conveyance can be implemented more quickly and more stably utilizing the learning data not only in a case in which a new object becomes a grasp/conveyance target but also in a case in which a new robot is introduced.

Figure 27:
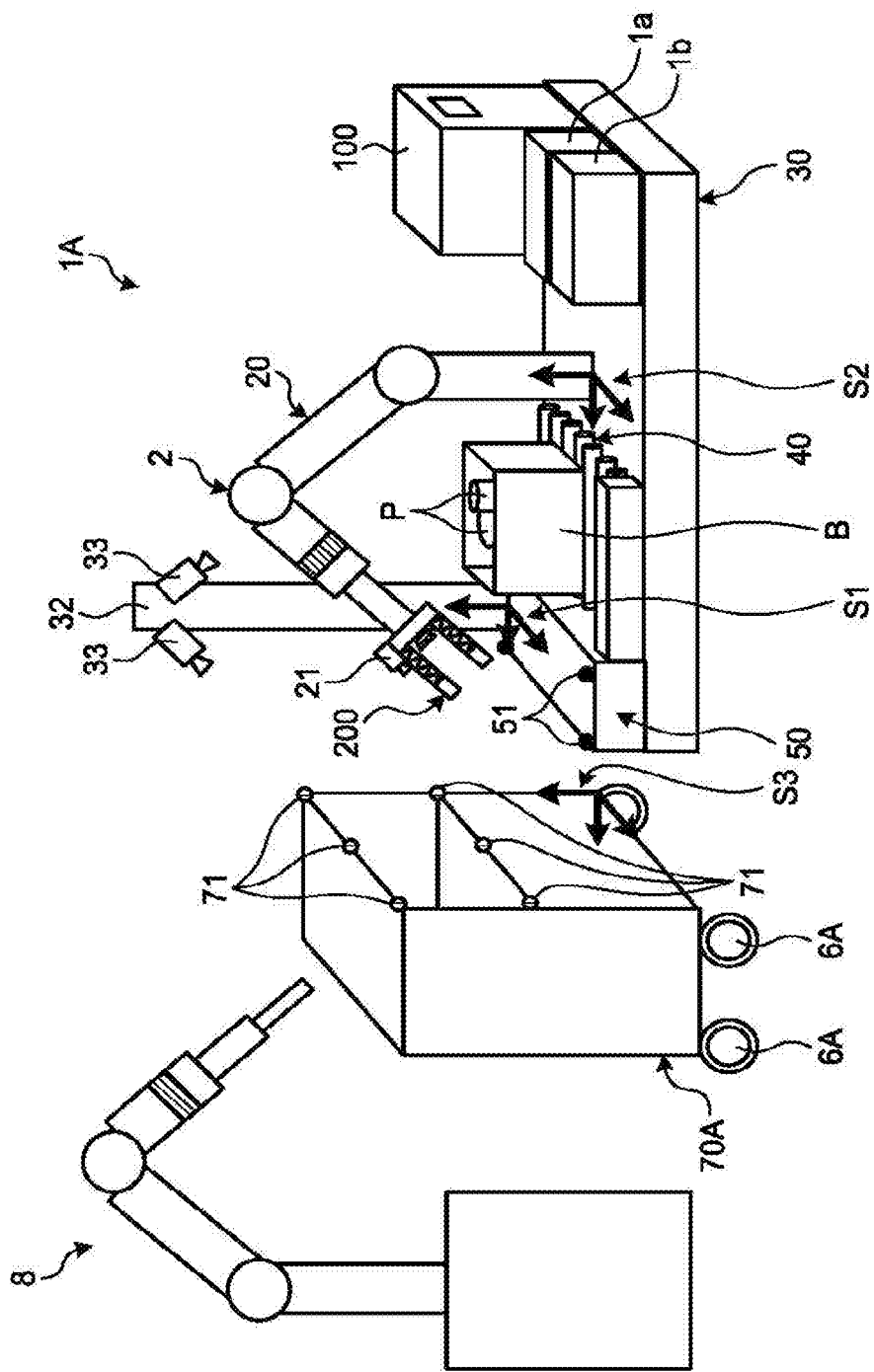
FIG. 27 is a schematic and exemplary configuration diagram illustrating a system according to an embodiment different from that of the object handling system of FIG. 1.

FIG. 27 is a configuration diagram illustrating a system different from the object handling system in FIG. 1. In the system of FIG. 27, an object handling device 1A is fixedly installed without including the moving mechanism 6, and a workbench 70A includes a moving mechanism 6A. Also in this system, the object handling device 1A can execute automatic calibration similar to that described above, and can also execute other processing in a similar manner.

Learning of Nonlinear Kinetics Model and Vibration Suppression

Figure 28:
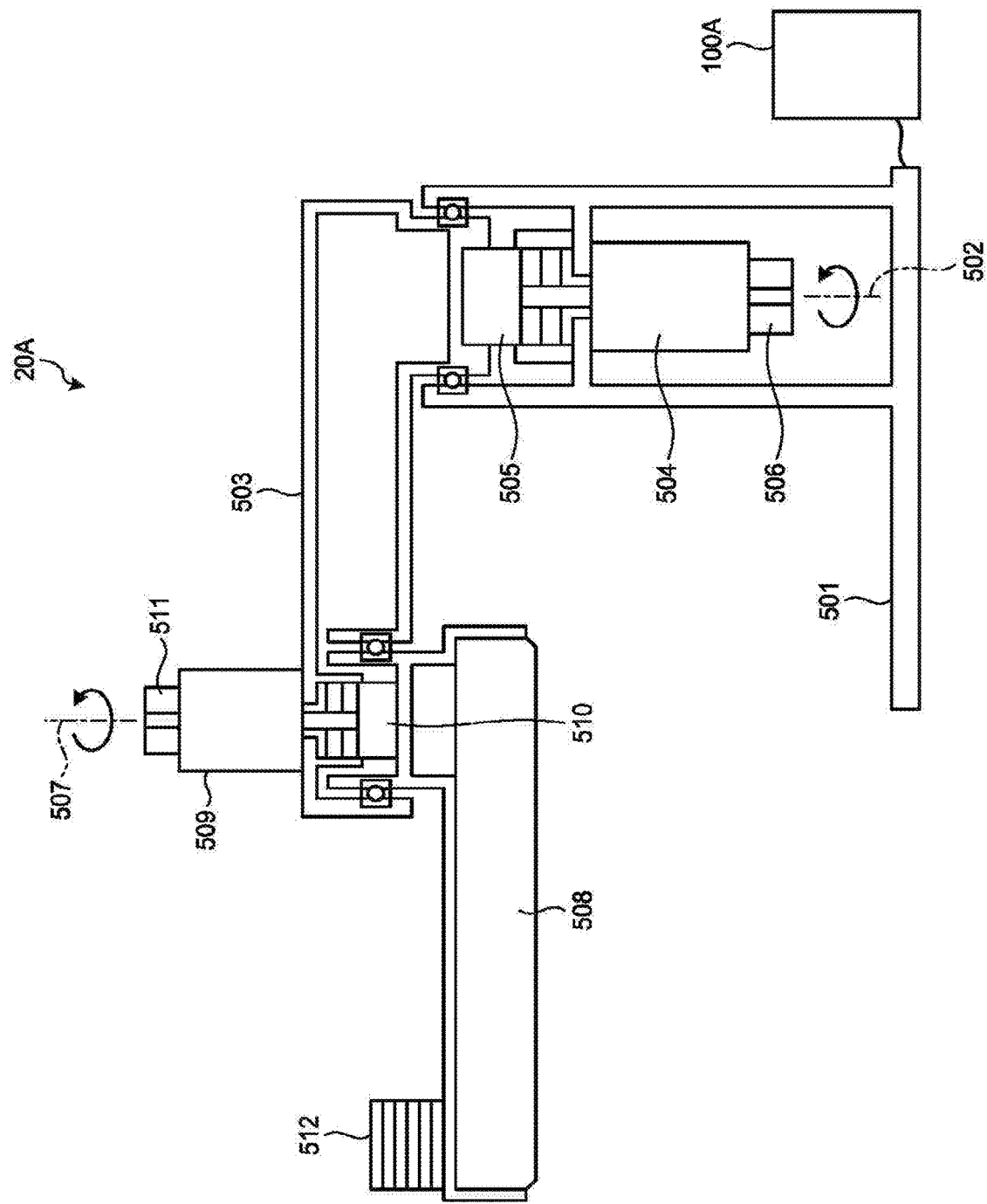
FIG. 28 is a schematic and exemplary cross-sectional view of the manipulator according to the embodiment.

FIG. 28 is a cross-sectional view of a manipulator 20A. The manipulator 20A includes a stand 501, a first link 503, a first motor 504, a first decelerator 505, a first encoder 506, a second link 508, a second motor 509, a second decelerator 510, and a second encoder 511. One end of the first link 503 is attached to an upper part of the stand 501, and the second link 508 is attached to the other end of the first link 503. A load 512 is added to a distal end of the second link 508. Herein, the load 512 is the hand 200 of the object handling device 1 or a combination of the hand 200 and the grasped object.

A controller 100A causes the first link 503 to horizontally rotate with respect to the stand 501 around a first axis 502 by combining the first motor 504, the first encoder 506, and the first decelerator 505 having a spring characteristic. The controller 100A causes the second link 508 to horizontally rotate with respect to the first link 503 around a second axis 507 by combining the second motor 509, the second encoder 511, and the second decelerator 510 having the spring characteristic.

Figure 29:
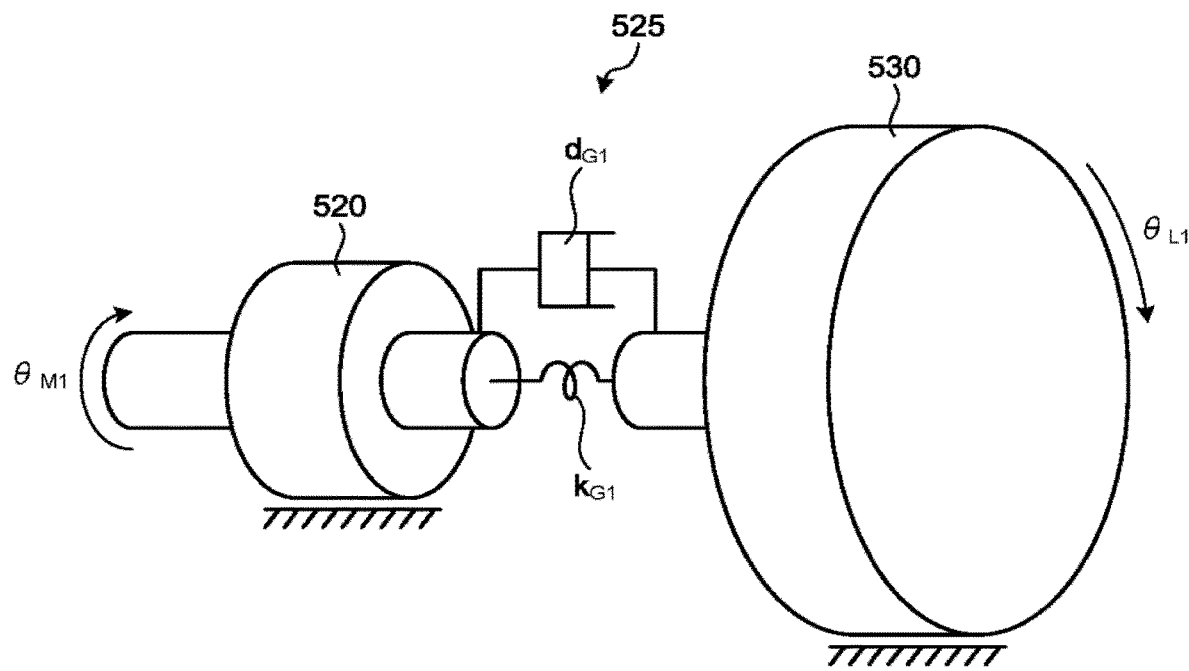
FIG. 29 is a schematic diagram illustrating a part corresponding to one link of the manipulator of FIG. 28.

FIG. 29 is a schematic diagram illustrating a part corresponding to one link of the manipulator. This is called a two-inertial system. With reference to FIGS. 28 and 29, this manipulator can be caused to be a nonlinear kinetics model as a serial two-link arm having an elastic articulation (elastic mechanism, elastic part). FIG. 29 illustrates a physical parameter required for describing a nonlinear kinetics model corresponding to one link, moment of inertia, a friction coefficient, a spring coefficient, and the like using the first axis as a representative. In FIG. 29, a link 530 is driven and controlled by a motor 520 via a decelerator 525. As physical parameters for the first axis, a torque input of the motor 520 is represented by $u_1$, a moment of inertia of the motor 520 is represented by $m_{M1}$, a rotation angle of the motor 520, that is, an output detected by an encoder is represented by $\theta_{M1}$ a viscous friction coefficient of the motor 520 is represented by $d_{M1}$, a Coulomb dynamic friction coefficient of the motor 520 is represented by $f_{M1}$, an attenuation coefficient of the decelerator 525 is represented by $d_{G1}$, a spring coefficient of the decelerator 525 is represented by $k_{G1}$, a moment of inertia of the link 530 is represented by $m_{L1}$, a viscous friction coefficient of the link 530 is represented by $d_{L1}$, and a rotation angle of the link 530 is represented by $\theta_{L1}$.

Regarding the nonlinear kinetics model of the serial two-link arm having the elastic articulation, a motor side is given by the expression (1), and a link side is given by the expression (2) as follows.

$$M_M \ddot{\theta}_M + D_M \dot{\theta}_M + f_M \mathrm{sgn}(\dot{\theta}_M) = \\ E_u - N_G[K_G(N_G\theta_M - \theta_L) + D_G(N_G\dot{\theta}_M - \dot{\theta}_L)] \quad (1)$$

-continued $$M_L(\theta_L)\ddot{\theta}_L + c_L(\dot{\theta}_L, \theta_L) + D_L\dot{\theta}_L = K_G(N_G\theta_M - \theta_L) + D_G(N_G\dot{\theta}_M - \dot{\theta}_L) \quad (2)$$

In these expressions, $\dot{\theta}_M = [\dot{\theta}_{M1}, \dot{\theta}_{M2}]^T$: rotational speed of motor (each of suffixes 1 and 2 represents an axis number)

$\dot{\theta}_L = [\dot{\theta}_{L1}, \dot{\theta}_{L2}]^T$: rotational speed of link $\alpha = [\alpha_1, \alpha_2]^T$: translational acceleration of link $M_L(\theta_L) \in R^{2 \times 2}$: link inertia matrix $c_L(d\theta_L/dt, \theta_L) \in R^{2 \times 1}$: centrifugal force and coriolis force vector $M_M = \text{diag}(m_{M1}, m_{M2})$: motor and decelerator high-speed stage inertia $D_M = \text{diag}(d_{M1}, d_{M2})$: motor shaft viscous friction coefficient $D_L = \text{diag}(d_{L1}, d_{L2})$: link shaft viscous friction coefficient $K_G = \text{diag}(k_{G1}, k_{G2})$: decelerator spring coefficient $D_G = \text{diag}(d_{G1}, d_{G2})$: decelerator attenuation coefficient $N_G = \text{diag}(n_{G1}, n_{G2})$: reduction gear ratio ($n_{G1}, n_{G2} \le 1$)

$f_M = [f_{M1}, f_{M2}]^T$: Coulomb dynamic friction torque of motor shaft $E = \text{diag}(e_1, e_2)$: torque/voltage (current order value) constant, and $u = [u_1, u_2]^T$: input voltage (order value for electric current control system of motor). In this case, sgn(a) in the expression (1) represents a sign function, and sgn(a) takes values of 1, −1, and 0 corresponding to values of a, that is, a positive value, a negative value, and zero. Herein, diag(a,b) represents a diagonal matrix including a and b as diagonal elements.

Assuming that α, β, γ are base parameters configured of a length, a gravity center position, mass, and inertia of the link, an inertia matrix of the link is represented by the expression (3).

$$M_L(\theta_L) = \begin{bmatrix} \alpha + \beta + 2\gamma\cos(\theta_{L2}) & \beta + \gamma\cos(\theta_{L2}) \\ \beta + \gamma\cos(\theta_{L2}) & \beta \end{bmatrix} \quad (3)$$

Details about the base parameters are represented by the following expressions (4).

$\alpha = m_1 l_{g1}^2 + I_{z1} + m_2 l_1^2$ $\beta = m_2 l_{g2}^2 + I_{z2}$ $\gamma = m_2 l_1 l_{g1} \quad (4)$ In this expression, $l_i$: length of each link (i is the axis number)

$m_i$: mass of each link $l_{gi}$: gravity center position of each link (the link is bilateral symmetric in a longitudinal direction), and $I_{zi}$: moment of inertia around center of gravity of each link. When the load 512 at the distal end is varied, mass $m_2$ of the link to which the load 512 at the distal end is added is varied, and the base parameters α, β, and γ are all changed.

A centrifugal force and a coriolis force vector are represented by the expression (5).

$$c_L(\dot{\theta}_L, \theta_L) = \begin{bmatrix} -\gamma(2\dot{\theta}_{L1}\dot{\theta}_{L2} + \dot{\theta}_{L2}^2)\sin(\theta_{L2}) \\ \gamma\dot{\theta}_{L2}^2\sin(\theta_{L2}) \end{bmatrix} \quad (5)$$

A motor angular speed control system is assumed to have a basic configuration represented by the expression (6) in which two-degree-of-freedom PI control is achieved by causing a PI (proportional and integral) control to be FF-I-P (feedforward-integral-proportional) control.

$$u_i = k_{FVi}\dot{\theta}_{MRi} + k_{IVi}\int(\dot{\theta}_{MRi} - \dot{\theta}_{Mi})dt - k_{PVi}\dot{\theta}_{Mi} \quad (6)$$

$(i = 1, 2)$

In this expression, $d\theta_{MRi}/dt$: angular speed target value of motor (i is an axis number)

$d\theta_{Mi}/dt$: angular speed of motor $k_{FVi}$: angular speed target value feedforward control gain of motor $k_{IVi}$: angular speed deviation integration feedback control gain of motor $k_{PVi}$: angular speed proportion feedback control gain of motor, and $u_i$: input voltage (order value for electric current control system of motor (torque input)).

Figure 30:
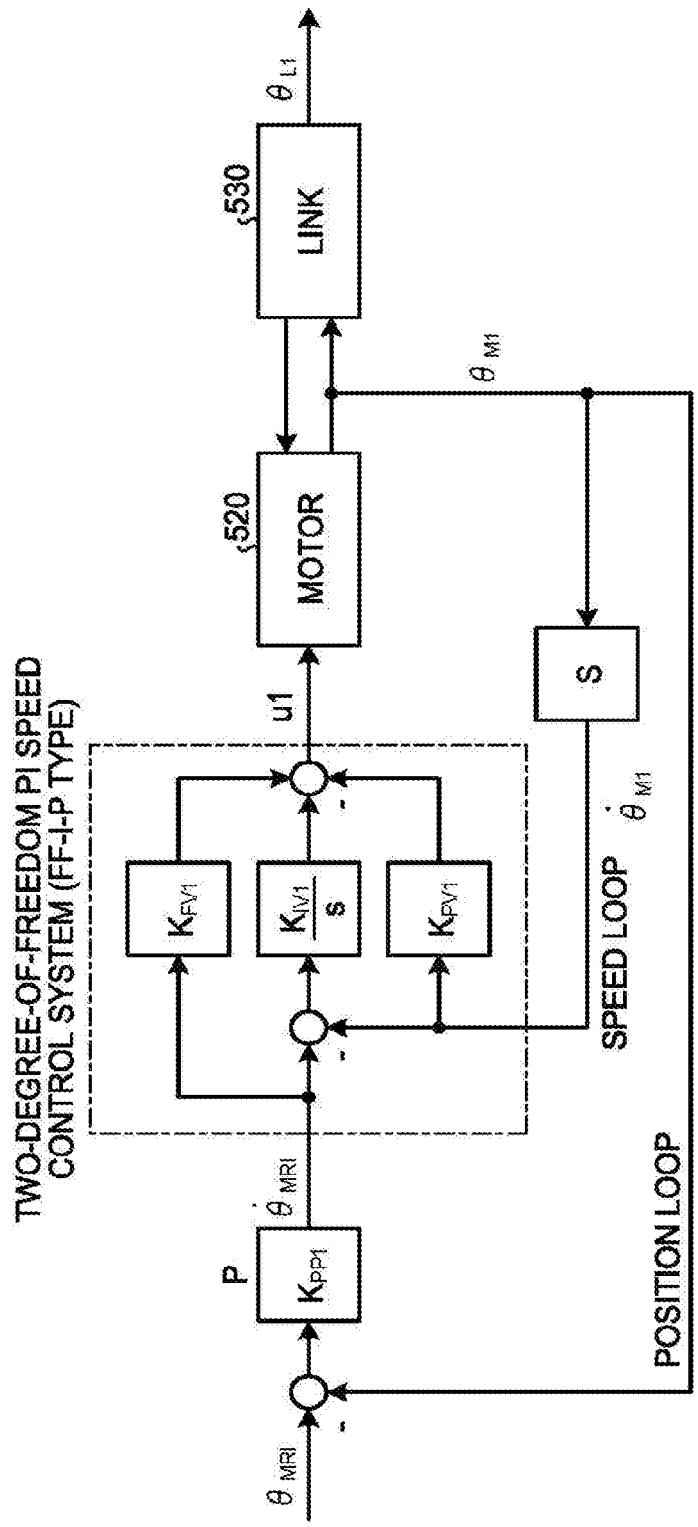
FIG. 30 is a block diagram of a typical speed control system.

FIG. 30 is a block diagram of a typical speed control system. As illustrated in FIG. 30, the two-degree-of-freedom PI speed control system is configured as a control system cascade-connected to the inside of a position control system (P control). FIG. 30 illustrates a two-degree-of-freedom PI speed control system related to the first axis.

In the following description, focusing on an angular speed control system of the motor excluding the position control system, a control cycle is assumed to be sufficiently short, and an angle control system of the motor is assumed to be a continuous system.

First, the load 512 at the distal end of the two-link arm illustrated in FIG. 28 is assumed to be 5 kg, for example, and physical parameters (including the base parameters α, β, and γ hereinafter) present in the expression (1) are estimated using a known method of identification. As the method of identification, for example, used is a method of identification disclosed in Japanese Patent Application Laid-Open No. 2003-533162 considering rigidity of articulation of a robot model.

Next, these estimated physical parameters are substituted, together with a motor speed control gain, into the expression (1) representing the kinetics model and the expression (6) representing a speed feedback control rule. Accordingly, a time response simulator of the speed control system for the serial two-link arm is established to check whether a time response is well matched with a time response of an actual robot device.

If the physical parameters are accurately estimated through the method of identification described above, these time responses should be well matched with each other. If the time responses are slightly deviated from each other, the physical parameters are fine-tuned through optimization calculation by a nonlinear least squares method (Levenberg-Marquardt method, for example) using the time response simulator described above. FIG. 31 is a diagram illustrating an effect caused by fine-tuning of the physical parameters. For example, an upper part of FIG. 31 illustrates an angular speed step response before optimization, and a lower part of FIG. 31 illustrates the angular speed step response after optimization. In FIG. 31, a horizontal axis indicates time, a vertical axis indicates an angular speed, a solid line indicates a response of the actual robot device, and a dashed line indicates a response result obtained by the simulator. As is clear from the lower graph after optimization, the angular speed step responses can be well matched between the simulator and the actual robot device by optimizing the physical parameters.

Thus, in the present embodiment, an observer is configured for estimating the angular speed of the link from the angular speed of the motor measured by the encoder described above, and not only a measured value of the angular speed of the motor but also an estimation value of the angular speed of the link are fed back to cause the manipulator to operate with high accuracy while suppressing vibration of the distal end of the manipulator. In the following embodiments, focusing on the fact that the time response of the speed-controlled actual robot device is well matched with the simulated time response, an observer is configured utilizing high accuracy in estimating the physical parameters. The following describes observers according to respective embodiments.

Manipulator Control Unit (1) Based on Nonlinear Kinetics Model

Figure 32:
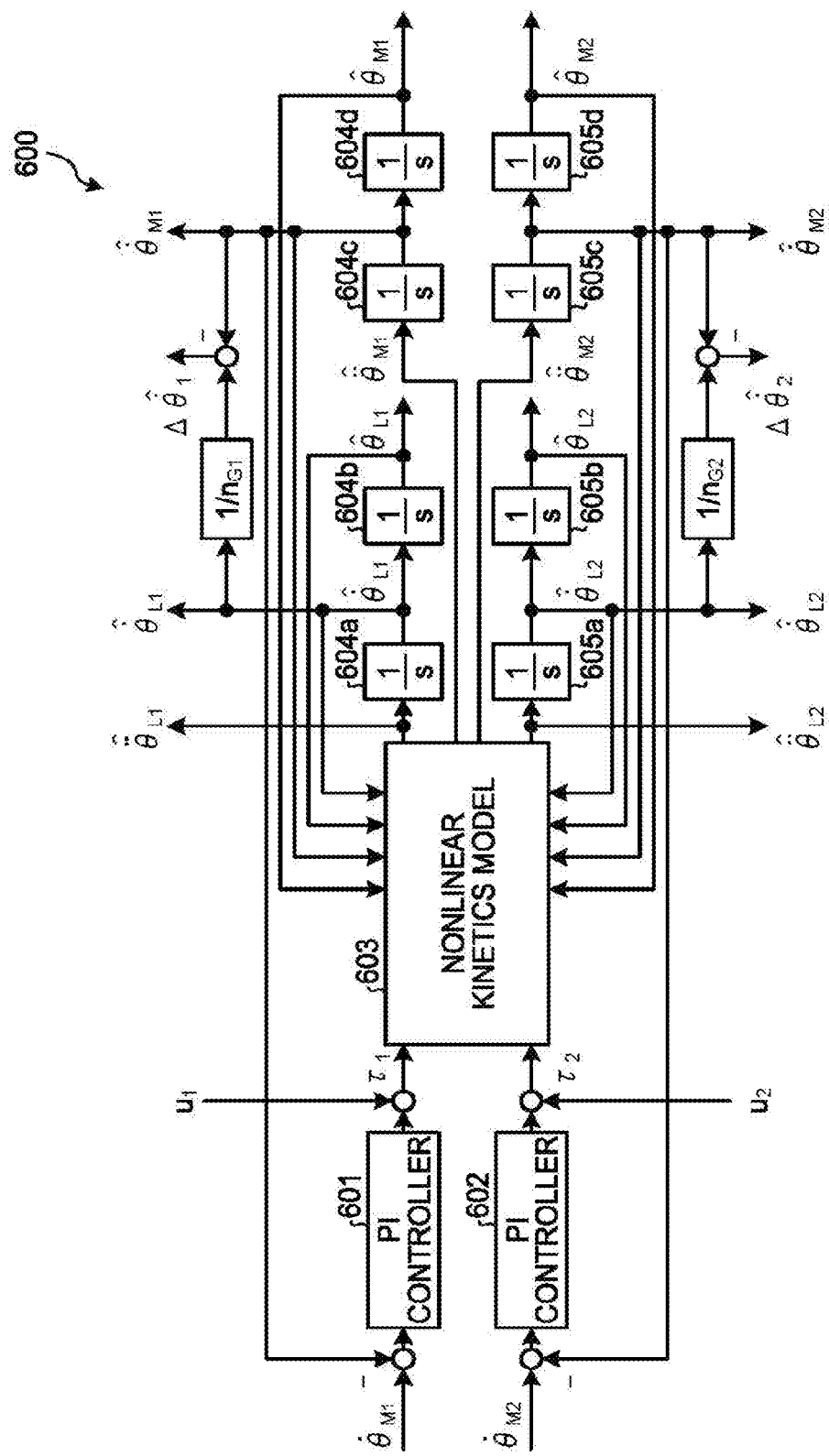
FIG. 32 is an exemplary block diagram of an observer of the manipulator control unit according to the embodiment.

FIG. 32 is a block diagram of an observer 600 of a manipulator control unit 112. The observer 600 according to the present embodiment includes PI controllers 601 and 602 for the first and second axes, a nonlinear kinetics model 603 of the two-link arm, and integrators 604a, 604b, 604c, 604d, 605a, 605b, 605c, and 605d for integrating an output of the nonlinear kinetics model 603. The PI controller 601 performs PI control based on a deviation between a speed $d\theta_{M1}/dt$ of the motor that drives the first axis and an estimation value of a rotational speed of the motor that drives the first axis. The PI controller 602 performs PI control based on a deviation between a speed $d\theta_{M2}/dt$ of the motor that drives the second axis and an estimation value of a rotational speed of the motor that drives the second axis. Based on a first input $\tau_1$ as the sum of an output of the PI controller 601 and an operation amount $u_1$ of the first axis, and a second input $\tau_2$ as the sum of an output of the PI controller 602 and an operation amount $u_2$ of the second axis, the nonlinear kinetics model 603 of the two-link arm estimates angular acceleration of the first and second links based on the nonlinear kinetics model 603, estimates angular acceleration of motors that drive the first and second links respectively, and outputs the estimated angular acceleration.

The integrator 604a integrates an estimation value of the angular acceleration of the first link output from the nonlinear kinetics model 603, and outputs an estimation value of the angular speed. The integrator 604b integrates an output of the integrator 604a, and outputs an estimation value of the rotation angle of the first link. The integrator 604c integrates an estimation value of the angular acceleration of the motor that drives the first link output from the nonlinear kinetics model 603, and outputs an estimation value of the angular speed of the motor described above. The integrator 604d integrates an output of the integrator 604c, and outputs an estimation value of the rotation angle of the motor that drives the first link.

The integrator 605a integrates an estimation value of the angular acceleration of the second link output from the nonlinear kinetics model 603, and outputs an estimation value of the angular speed. The integrator 605b integrates an output of the integrator 605a, and outputs an estimation value of the rotation angle of the second link. The integrator 605c integrates an estimation value of the angular acceleration of the motor that drives the second link output from the nonlinear kinetics model 603, and outputs an estimation value of the angular speed of the motor described above. The integrator 605d integrates an output of the integrator 605c, and outputs an estimation value of the rotation angle of the motor that drives the second link.

Each of the estimation values of the angular acceleration of the first and second links, the estimation values of the angular speed of the first and second links, the estimation values of the angular speed of the motor that drives the first and second links, and the estimation value of the rotation angle of the motor is output from the observer 600.

Based on the estimation value of the angular speed of the first link, a reduction gear ratio $n_{G1}$ of the decelerator arranged between the first link and the motor that drives the first link, and the estimation value of the angular speed of the motor that drives the first link, the observer 600 calculates an estimation value of torsional angular speed of the first link, and outputs the estimation value. Similarly, based on the estimation value of the angular speed of the second link, a reduction gear ratio $n_{G2}$ of the decelerator arranged between the second link and the motor that drives the second link, and the estimation value of the angular speed of the motor that drives the second link, the observer 600 calculates an estimation value of torsional angular speed of the second link and outputs the estimation value.

The observer 600 according to the present embodiment is a simulator itself that incorporates the whole nonlinear kinetics model 603 of the manipulator, the simulator in which a PI control gain of an existing speed control system of each axis of the manipulator is directly used as an observer gain of the PI controllers 601 and 602. That is, the observer gain of the PI controllers 601 and 602 is an observer gain equivalent to speed control. Integral control is included, so that the observer 600 also incorporates a function of causing a steady-state deviation of an output estimation value to be zero. There is no engineering cost taken for approximation in implementing the observer, and for gain adjustment.

A PI-controlled observer based on the nonlinear kinetics model 603 is represented by a second-order differential form represented by the expression (7), which is a variation of the expression (1). In the expression (7), a sign "^" represents an estimation value.

$$\hat{\ddot{\theta}}_M = M_M^{-1}\{-D_M\hat{\dot{\theta}}_M - f_M\text{sgn}(\hat{\dot{\theta}}_M) + \qquad (7)$$
$$E_\tau - N_G[K_G(N_G\hat{\theta}_M - \hat{\theta}_L) + D_G(N_G\hat{\dot{\theta}}_M - \hat{\dot{\theta}}_L)]\}$$
$$\hat{\ddot{\theta}} = M_L(\hat{\theta}_L)^{-1}[-c_L(\hat{\dot{\theta}}_L, \hat{\theta}_L) - D_L\hat{\dot{\theta}} + K_G(N_G\hat{\theta}_M - \hat{\theta}_L) +$$
$$D_G(N_G\hat{\dot{\theta}}_M - \hat{\dot{\theta}}_L)]$$
$$\tau = K_{PV}(\dot{\theta}_M - \hat{\dot{\theta}}_M) + K_{IV}\int(\dot{\theta}_M - \hat{\dot{\theta}}_M)dt + u$$

In this expression, $d\theta_M/dt = [d\theta_{M1}/dt, d\theta_{M2}/dt]^T$: motor angular speed input to observer $u = [u_1, u_2]^T$: input to observer (motor current order value)

$K_{PV} = \text{diag}(k_{PV1}, k_{PV2})$: speed deviation proportional control gain $K_{IV} = \text{diag}(k_{IV1}, k_{IV2})$: speed deviation integral control gain, and $\tau = [\tau_1, \tau_2]^T$: input to observer (motor current order value).

As the observer gains of the PI controllers 601 and 602, selected are the same gains as gains of P and I of FF-I-P control (two-degree-of-freedom PI control) for a speed loop of the actual robot device. In this case, only one degree of freedom of a following performance of the observer should be considered, so that PI control is set such that FF=P, that is, a feedforward system is a proportional system. This system is a kind of a nonlinear observer having a fixed gain. A steady-state deviation of the output estimation value is caused to be zero due to integral control, so that the system also incorporates a function as a disturbance removing observer.

The state can be estimated by mounting a state observer represented by the expression (7) on the controller 100A, and performing integration two times using the integrator illustrated in FIG. 32 in real time. Actual integration is performed as numerical integration.

In angular speed control of the two-inertial system, an arbitrary pole can be arranged when three quantities of state including the angular speed of the motor, the angular speed of the link, and a shaft torsional angular speed of the motor and the link are fed back, and quick responsiveness (speed of following a target value of a control system) and an attenuation factor can be freely set. However, shifting is hardly performed because an existing PI control system should be adjusted again. As an input to the PI control system, first, only an estimation value of the shaft torsional angular speed (a difference between a link angular speed and a motor angular speed) output from the observer 600 is fed back as state feedback. In this feedback of the shaft torsional angular speed, expected is an effect of increasing only the attenuation factor without changing a gain crossover frequency of PI control. Thus, manual adjustment can be easily performed at a job site, so that it can be easily introduced especially into a control device of an industrial robot.

Figure 33:
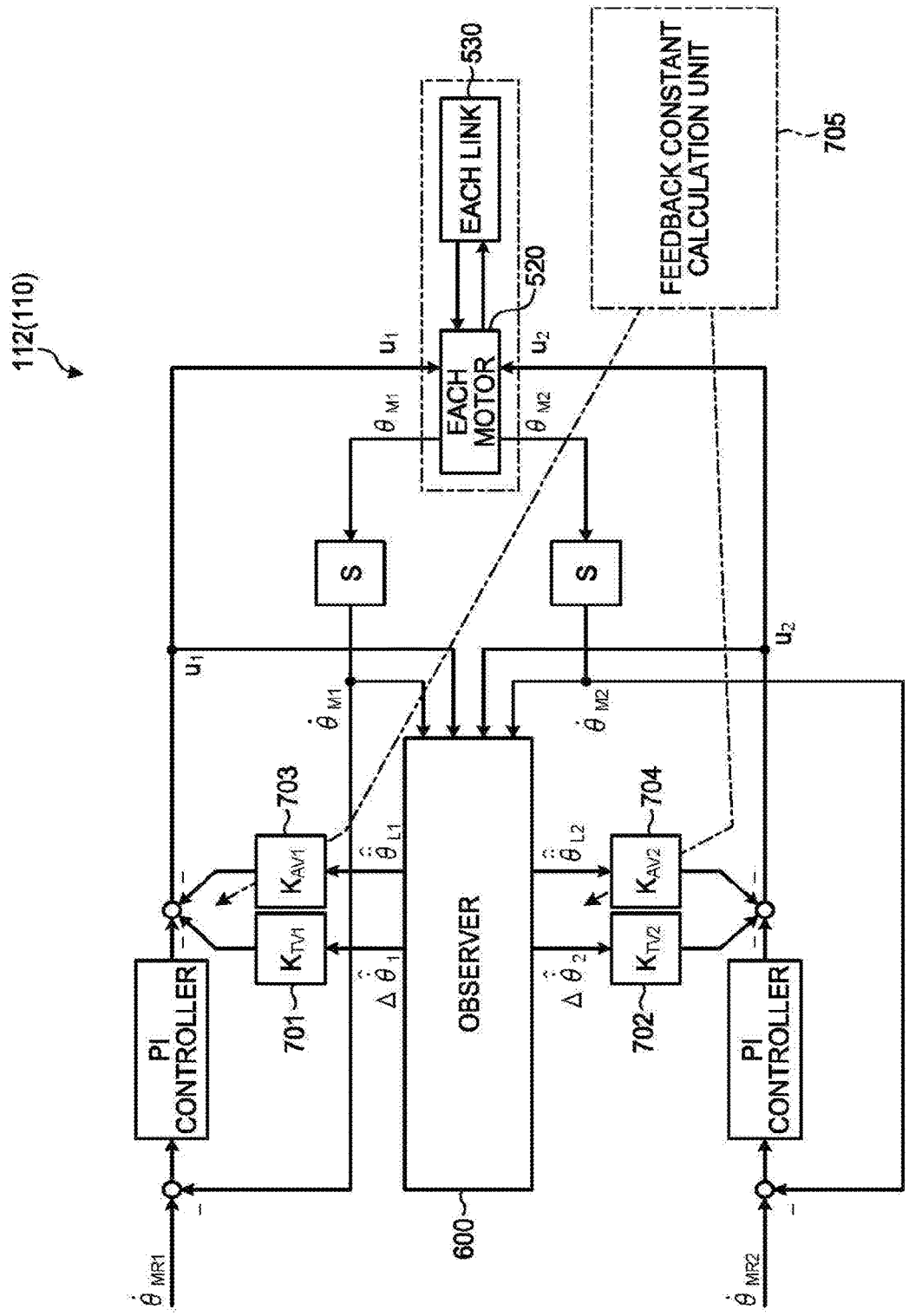
FIG. 33 is a block diagram of the manipulator control unit including the observer illustrated in FIG. 32.

FIG. 33 is a block diagram of the manipulator control unit 112 (110) including the observer 600 illustrated in FIG. 32. A motor angular speed (encoder difference) and an input voltage (current order value) to a motor driver are input to the observer 600. State feedback units 701, 702, 703, and 704 for the estimation value of the shaft torsional angular speed related to the first and second links based on the PI-controlled observer 600 can be implemented being plugged into two-degree-of-freedom PI control (FF-I-P control) represented by the expression (7), and a control rule represented by the expression (8) is obtained.

$$u_i = k_{FVi}\dot{\theta}_{MRi} + k_{IVi} \int (\dot{\theta}_{MRi} - \dot{\theta}_{Mi})dt - k_{PVi}\dot{\theta}_{Mi} - k_{TVi}(\hat{\dot{\theta}}_{Li}/n_{Gi} - \hat{\dot{\theta}}_{Mi}) \quad (8)$$

$$(i = 1, 2)$$

A user can easily manually adjust a state feedback control gain $k_{TVi}$ (i=1, 2) of the estimation value of the shaft torsional angular speed while viewing a time response waveform. Used is the observer based on the accurate nonlinear kinetics model of the manipulator having an elastic articulation, so that a sufficient effect is obtained only with the state feedback of only the first axis in vibration suppression control of the manipulator including a serial link. FIG. 33 illustrates a feedback constant calculation unit 705 for link angular acceleration for increasing inertia. The function of the feedback constant calculation unit 705 will be described later.

The present embodiment describes control for increasing inertia for representing inertia on a link side to be large when a fingertip load is light. A control rule thereof is obtained by adding negative feedback of the estimation value of link angular acceleration to the expression (8) (the state feedback units 703 and 704 in FIG. 33), and represented by the expression (9).

$$u_i = k_{FVi}\dot{\theta}_{MRi} + k_{IVi} \int (\dot{\theta}_{MRi} - \dot{\theta}_{Mi})dt - \quad (9)$$
$$k_{PVi}\dot{\theta}_{Mi} - k_{TVi}(\hat{\dot{\theta}}_{Li}/n_{Gi} - \hat{\dot{\theta}}_{Mi}) - k_{AVi}\hat{\ddot{\theta}}_{Li}$$

$$(i = 1, 2)$$

In this case, a state feedback control gain $k_{AVi}$ of the estimation value of angular acceleration has a dimension of moment of inertia of the link, and is assumed to be able to compensate an inertia variation Δm of the tip load of the manipulator. For example, a variation Δm (reduction) is caused in the inertia matrix of the expression (3), the base parameters α, β, and γ are changed into α', β', and γ', respectively, as represented in the expression (10).

$$\alpha'=\alpha-\Delta m$$

$$\beta'=\beta-\Delta m$$

$$\gamma'=\gamma-\Delta m \quad (10)$$

wherein, when α', β', and γ' after inertia variation of the tip load of the manipulator represented by the expression (10) are substituted into (1,1) component of the inertia matrix of the expression (3), and the reduction gear ratio $n_{G1}$ is considered, the expression (11) is satisfied.

$$k_{AV1}=(2+2\cos(\theta_{L2}))\Delta m \times n_{G1} \quad (11)$$

Through the expression (11), the state feedback control gain of the estimation value of angular acceleration of the first axis can be calculated. The expression (11) represents the function of the feedback constant calculation unit 705 for link angular acceleration for increasing inertia illustrated in FIG. 33.

Manipulator Control Unit (2) Based on Nonlinear Kinetics Model

Figure 34:
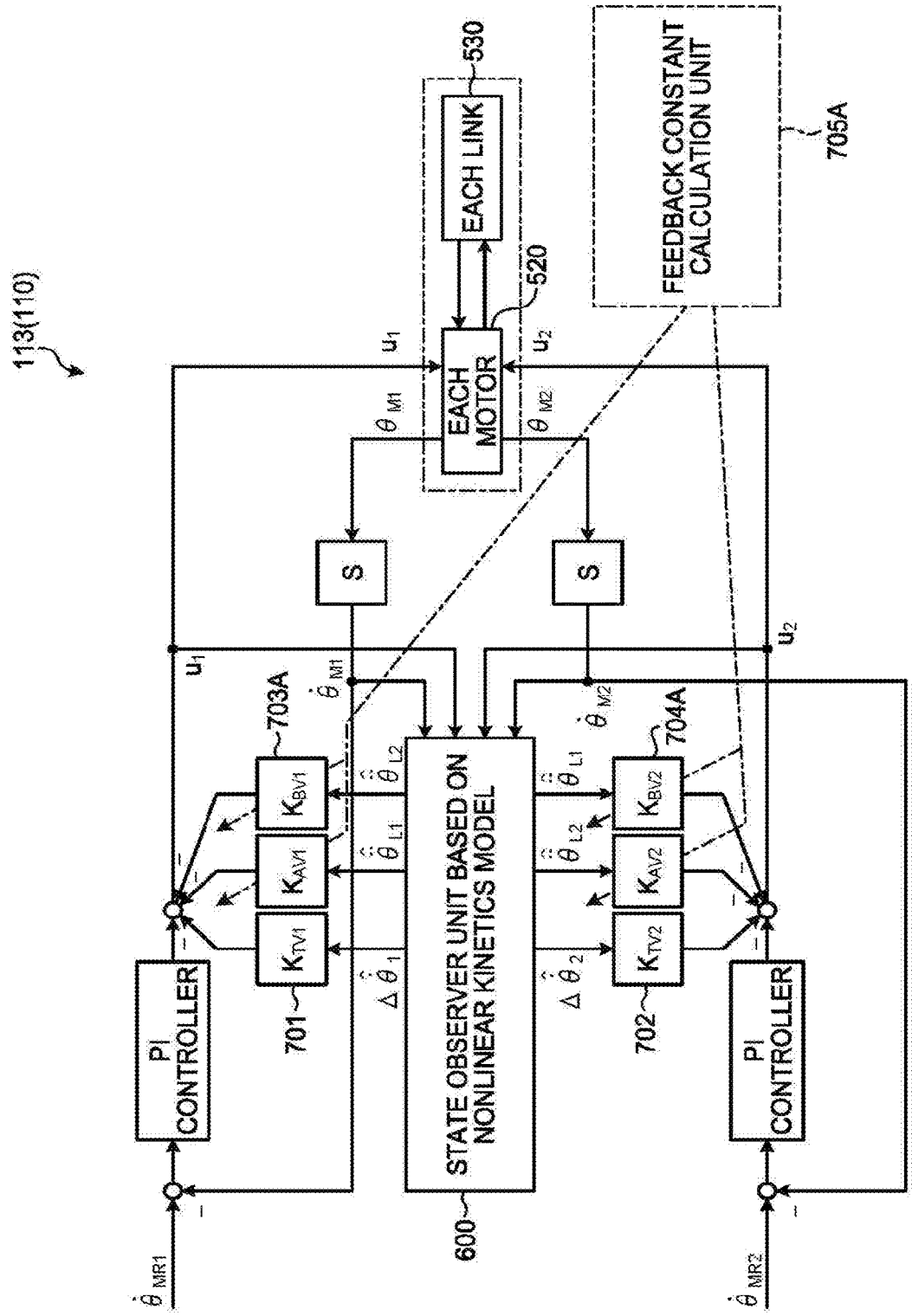
FIG. 34 is a block diagram illustrating another example of the manipulator control unit according to the embodiment.

FIG. 34 is a block diagram of a manipulator control unit 113 (110). The manipulator control unit 113 has a function of feedback control for link angular acceleration by increasing inertia and fixing inertia, and a function of calculating a gain thereof.

The reduction in inertia described above is caused not only when mass of the load on the arm tip is light but also when the posture of the manipulator is changed. In a two-link manipulator, for example, when an angle of the second axis is increased, inertia around the first axis is reduced. Thus, it is considered that the reduction in inertia caused by a posture change is compensated by feedback of link angular acceleration.

In a case of the two-link manipulator, considering inertia reduction with respect to the maximum value of the (1,1) component in the inertia matrix represented by the expression (3), the expression (12) is satisfied.

$$k_{AV1}=2\gamma(1-\cos(\theta_{L2}))n_{G1} \quad (12)$$

Through the expression (12), the feedback control gain of link angular acceleration of the first axis can be calculated. Through this feedback, inertia can be kept constant irrespective of the posture of the arm, that is, control for fixing inertia is implemented, and a vibration suppression effect equivalent to the control for increasing inertia described above can be obtained.

The control for fixing inertia and the control for increasing inertia according to the embodiment can be used at the same time. The expression (13) is obtained by combining the expression (11) with the expression (12).

$$k_{AV1}=[(2+2\cos(\theta_{2L}))\Delta m+2\gamma(1-\cos(\theta_{L2}))]n_{G1} \quad (13)$$

Through the expression (13), calculated is the feedback control gain of link angular acceleration based on the control for increasing inertia and the control for fixing inertia of the first axis. This is a function of a feedback constant calculation unit 705A for link angular acceleration based on the control for increasing inertia and the control for fixing inertia illustrated in FIG. 34.

Focusing on a nondiagonal element of the inertia matrix represented by the expression (3), also for (1,2) component and (2,1) component, feedback control gains $k_{BV1}$ and $k_{BV2}$ of link angular acceleration based on the control for increasing inertia and the control for fixing inertia can be calculated as represented by the expressions (14) and (15), respectively.

$$k_{BV1}=[(1+\cos(\theta_{2L}))\Delta m+\gamma(1-\cos(\theta_{L2}))]n_{G1} \quad (14)$$

$$k_{BV2}=[(1+\cos(\theta_{2L}))\Delta m+\gamma(1-\cos(\theta_{L2}))]n_{G1} \quad (15)$$

When the feedback of angular acceleration of the second axis is added to the first axis and the feedback of angular acceleration of the first axis is added to the second axis in the expression (9) by using these $k_{BV1}$ and $k_{BV2}$, the expression (16) is satisfied.

$$u_i = k_{FVi}\dot{\theta}_{MRi} + k_{IVi}\int (\dot{\theta}_{MRi} - \dot{\theta}_{Mi})dt - \\ k_{PVi}\theta_{Mi} - k_{TVi}(\hat{\dot{\theta}}_{Li}/n_{Gi} - \hat{\dot{\theta}}_{Mi}) - k_{AVi}\hat{\ddot{\theta}}_{Li} - k_{BVi}\hat{\ddot{\theta}}_{j} \\ (i=1,2, j=2,1) \quad (16)$$

In this way, a vibration suppression control system to which generalized control for increasing inertia and control for fixing inertia are applied is obtained. FIG. 34 is a block diagram of the entire vibration suppression control system to which control for increasing inertia and control for fixing inertia are applied.

Figure 35:
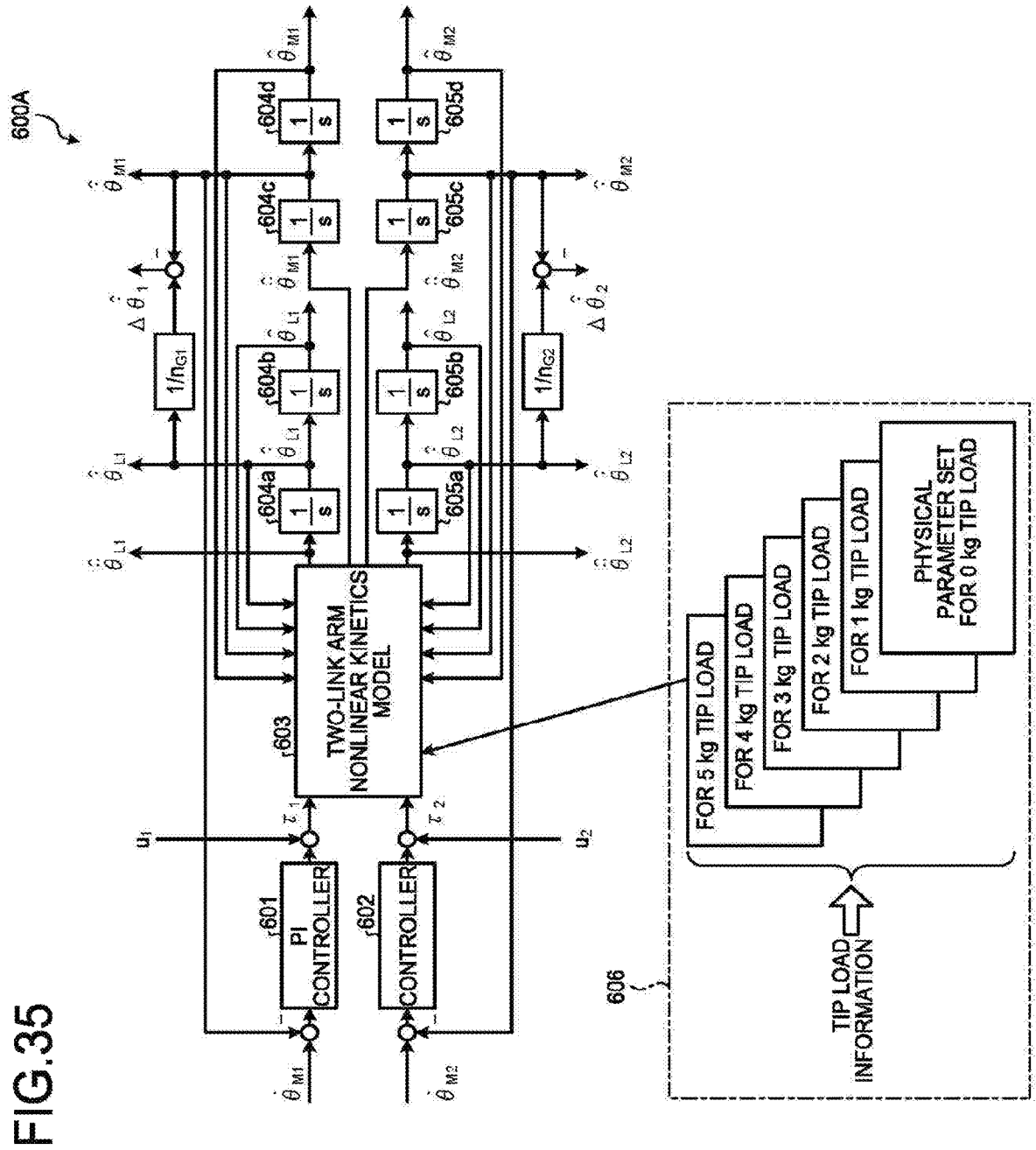
FIG. 35 is a block diagram illustrating another example of the observer according to the embodiment.

FIG. 35 is a block diagram of another observer 600A. The observer 600A according to the present embodiment has a configuration in which a physical parameter switching unit 606 is added to the observer 600 in FIG. 32. The observer 600A according to the embodiment performs switching (gain scheduling) on a physical parameter set of the nonlinear kinetics model 603 with the physical parameter switching unit 606 as illustrated in FIG. 35 for a variation in the tip load and a variation in frictional force corresponding thereto so that a vibration suppression performance becomes robust irrespective of variations in the tip load of the robot and the frictional force. To switch the physical parameter set to be positive, for example, a robot language such as "Payload (5 kg)" may be implemented to be used at the timing when the tip load is changed. Examples of the physical parameter set include mass, a moment of inertia, a friction coefficient, and a spring coefficient.

In the example illustrated in FIG. 35, the physical parameter switching unit 606 requires six kinds of physical parameter sets, that is, the tip load of 5, 4, 3, 2, 1, and 0 kg. However, if only the physical parameter set of 5 kg is accurately estimated, the physical parameter set in which the tip load is 4 kg can be generated through an optimization method using the nonlinear least squares method described above. Through the same procedure, the physical parameter set of 3 kg can be generated from the physical parameter set of 4 kg, the physical parameter set of 2 kg can be generated from the physical parameter set of 3 kg, the physical parameter set of 1 kg can be generated from the physical parameter set of 2 kg, and the physical parameter set of 0 kg can be generated from the physical parameter set of 1 kg.

Figure 36:
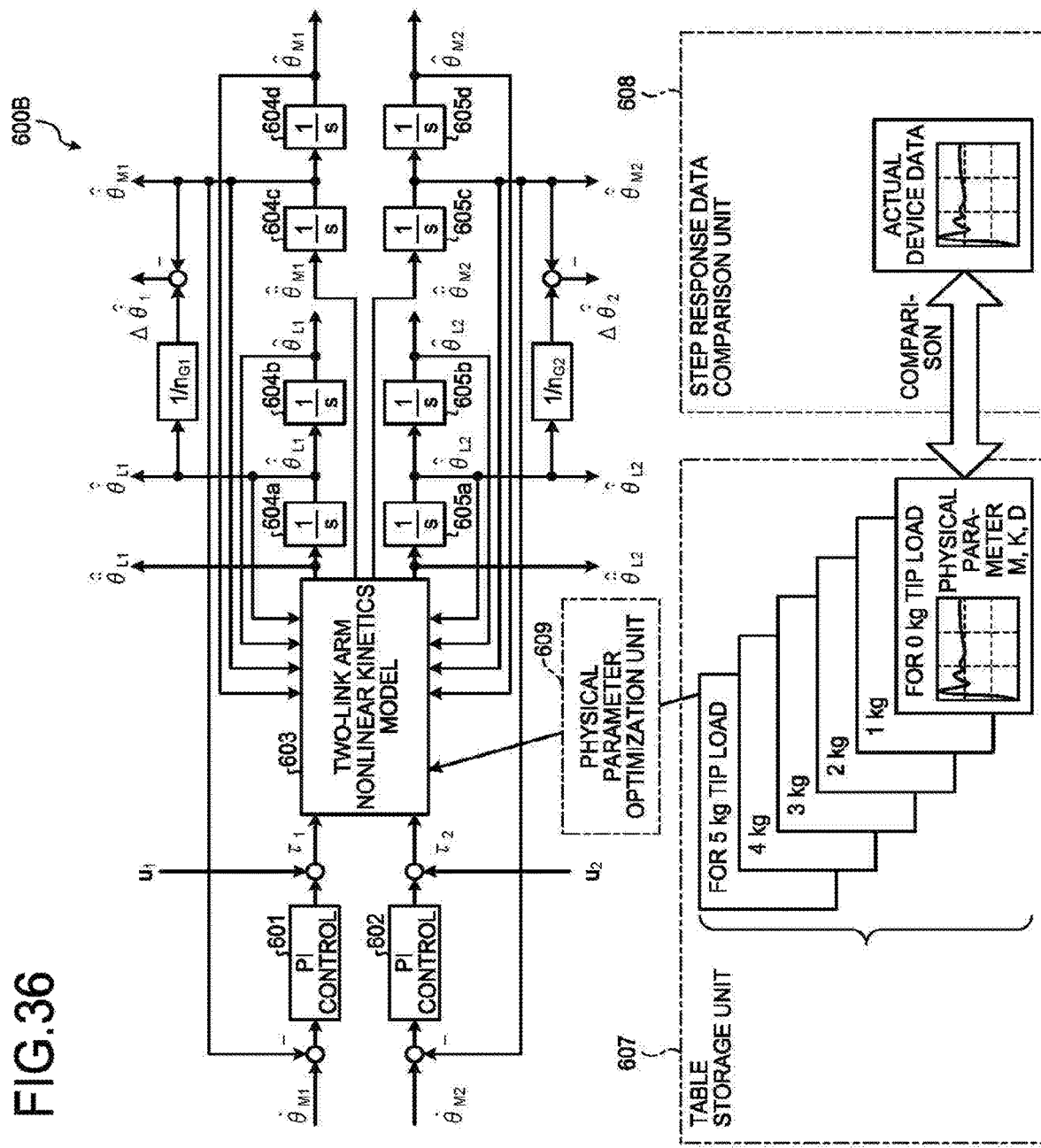
FIG. 36 is a block diagram illustrating yet another example of the observer according to the embodiment.

FIG. 36 is a block diagram of yet another observer 600B. The observer 600B according to the present embodiment has a configuration in which a table storage unit 607, a step response data comparison unit 608, and a physical parameter optimization unit 609 are added to the observer 600 according to the embodiment illustrated in FIG. 32. In the observer 600B according to the present embodiment, the tip load may be deviated from numerical values such as 5 kg, 4 kg, 3 kg, 2 kg, 1 kg, and 0 kg. In FIG. 36, prepared is the table storage unit 607 that stores therein speed step response data for each mass (5 kg, 4 kg, 3 kg, 2 kg, 1 kg, 0 kg) of the tip load acquired in advance, and the physical parameter set at the present point.

First, the speed step response data of an actual device having an unknown tip load is acquired. Next, the acquired speed step response data is compared with the speed step response data for each tip load stored in the table storage unit 607 by the step response data comparison unit 608. Based on the comparison result, a tip load closest to the tip load corresponding to the speed step response data of the actual device is selected from the tip loads stored in the table storage unit 607, for example, 5 kg, 4 kg, 3 kg, 2 kg, 1 kg, and 0 kg, and the physical parameter set corresponding to the selected tip load is selected as an initial value. As the tip load closest to the tip load corresponding to the speed step response data of the actual device, for example, the tip load is selected so that the sum of squares of a difference between the speed step response data of the actual device and the speed step response data of each tip load stored in the table storage unit 607 becomes the smallest.

Additionally, optimization calculation is performed by the physical parameter optimization unit 609 using the physical parameter set selected as the initial value. This optimization calculation is completely the same as the method using the nonlinear least squares method described above. Through the above processes, an accurate physical parameter set can be obtained for an unknown tip load, so that the observer can be established with high accuracy, and vibration suppression control can be effectively performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calibration method performed by an object handling device that comprises a base, a manipulator that is arranged on the base and includes a movable part, a first camera arranged on the manipulator, a sensor arranged on the manipulator, a second camera arranged on the base, and a processor configured to function as a calibration processing unit configured to execute calibration processing of a position of the movable part, the calibration method comprising:
   first photographing a predetermined position of the base by the first camera;
   detecting a physical quantity by the sensor; and
   executing first calibration processing by the calibration processing unit based on the predetermined position photographed by the first camera and the physical quantity detected by the sensor;
second photographing the movable part by the second camera; and
executing, by the calibration processing unit, second calibration processing of a position obtained from an image of the second camera based on a plurality of images of the movable part photographed by the second camera.

2. An object handling device comprising:
a base;
a manipulator that is arranged on the base and includes a movable part;
a first camera arranged on the manipulator;
a sensor arranged on the manipulator;
a second camera arranged on the base; and
a processor configured to function as a calibration processing unit configured to execute first calibration processing of a position of the movable part based on a photographic result of a predetermined position of the base obtained by the first camera and a detection result obtained by the sensor, wherein
the calibration processing unit executes second calibration processing of a position obtained from an image of the second camera based on a plurality of images of the movable part photographed by the second camera.

3. An object handling device comprising:
a base;
a manipulator that is arranged on the base, and includes a movable part and an effector that is arranged on the movable part and acts on an object;
a first camera arranged on the manipulator;
a sensor arranged on the manipulator;
a second camera arranged on the base; and
a processor configured to function as:
 a manipulator control unit configured to control the manipulator so that the movable part is moved to a position corresponding to a directed value; and
 a calibration processing unit configured to acquire a first error in a first direction based on an image photographed by the first camera, acquire a second error in a second direction intersecting with the first direction based on a detection result obtained by the sensor, and acquire a directed calibration value with respect to the directed value based on the first error and the second error, wherein
the calibration processing unit acquires an image calibration value with respect to a position obtained from an image of the second camera based on a plurality of images of the movable part photographed by the second camera.

4. The object handling device according to claim 3, wherein the calibration processing unit acquires the first error based on an image of a predetermined position of the base photographed by the first camera.

5. The object handling device according to claim 4, further comprising:
a first mark arranged on the base, wherein
the calibration processing unit acquires a first directed calibration value based on an image of the first mark photographed by the first camera.

6. The object handling device according to claim 5, wherein the calibration processing unit acquires the second error based on a detection result obtained by the sensor in a state in which the movable part is in contact with the first mark.

7. The object handling device according to claim 6, wherein the sensor is a contact sensor or a force sensor.

8. The object handling device according to claim 5, further comprising:
a working place on which the object is placed, wherein
the first mark is arranged on the working place or arranged to be adjacent to the working place.

9. The object handling device according to claim 1, wherein the calibration processing unit acquires a second directed calibration value based on an image of a predetermined position outside the object handling device photographed by the first camera.

10. The object handling device according to claim 9, wherein the calibration processing unit acquires the second directed calibration value based on an image of a second mark arranged on a target object to be accessed by the effector outside the object handling device photographed by the first camera.

* * * * *